(12) United States Patent
Rausch et al.

(10) Patent No.: US 10,909,460 B2
(45) Date of Patent: *Feb. 2, 2021

(54) INTELLIGENT DATA CURATION

(71) Applicant: SAS Institute Inc., Cary, NC (US)

(72) Inventors: Nancy Anne Rausch, Apex, NC (US); Roger Jay Barney, Fuquay-Varina, NC (US); John P. Trawinski, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,339

(22) Filed: Dec. 24, 2019

(65) Prior Publication Data

US 2020/0143253 A1 May 7, 2020

Related U.S. Application Data

(63) Continuation of application No. 16/503,742, filed on Jul. 5, 2019, now Pat. No. 10,552,739.

(60) Provisional application No. 62/745,544, filed on Oct. 15, 2018, provisional application No. 62/840,083, filed on Apr. 29, 2019.

(51) Int. Cl.
G06N 3/08 (2006.01)
G06N 3/04 (2006.01)
H04L 29/08 (2006.01)
G06F 9/30 (2018.01)
G06F 16/25 (2019.01)

(52) U.S. Cl.
CPC ............. *G06N 3/084* (2013.01); *G06F 9/30* (2013.01); *G06F 16/25* (2019.01); *G06N 3/04* (2013.01); *H04L 67/1097* (2013.01)

(58) Field of Classification Search
CPC .......... G06N 3/084; G06N 3/04; G06F 16/25; G06F 9/30; H04L 67/1097
See application file for complete search history.

(56) References Cited

U.S. PATENT DOCUMENTS

2017/0153914 A1* 6/2017 Rausch ............ G06F 16/24532
2017/0223097 A1* 8/2017 Zhang ................. H04L 67/1097
(Continued)

Primary Examiner — Alexey Shmatov
Assistant Examiner — Sehwan Kim
(74) Attorney, Agent, or Firm — Kacvinsky Daisak Bluni PLLC

(57) ABSTRACT

An apparatus includes a processor to: provide a set of feature routines to a set of processor cores to detect features of a data set distributed thereamong; generate metadata indicative of the detected features; generate context data indicative of contextual aspects of the data set; provide the metadata and context data to each processor core, and distribute a set of suggestion models thereamong to enable derivation of a suggested subset of data preparation operations to be suggested to be performed on the data set; transmit indications of the suggested subset to a viewing device, and receive therefrom indications of a selected subset of data preparation operations selected to be performed; compare the selected and suggested subsets; and in response to differences therebetween, re-train at least one suggestion model of the set of suggestion models based at least on the combination of the metadata, context data and selected subset.

30 Claims, 35 Drawing Sheets

(56) References Cited

U.S. PATENT DOCUMENTS

2017/0286520 A1* 10/2017 Christian .......... G06F 16/24532
2020/0005045 A1* 1/2020 Lloyd, II .......... G06K 9/00993

* cited by examiner

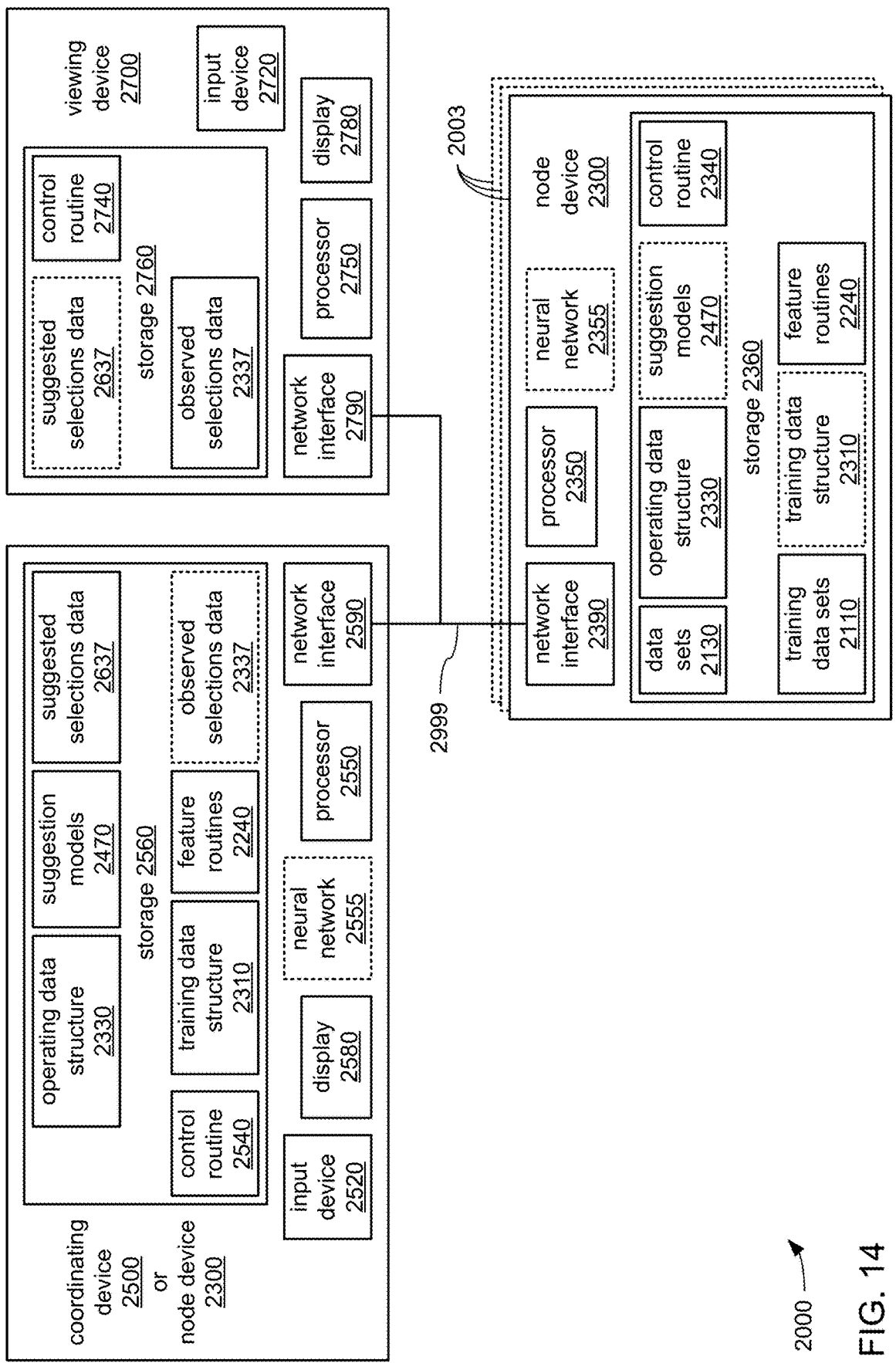

 → transmit training data structure to set of node devices 3170 → distribute to set of node devices, any new additional suggestion model(s), any replacement suggestion model(s), and any suggestion model(s) associated with any new additional or new replacement feature vector, context vector and/or action indication to be re-trained by the multiple node devices at least partially in parallel training data structure to improve system functionality 3172 → retrieve re-trained suggestion models from set of node devices 3174 → end

INTELLIGENT DATA CURATION

CROSS-REFERENCE TO RELATED APPLICATIONS

This application is a continuation of, and claims the benefit of priority under 35 U.S.C. § 120 to, U.S. patent application Ser. No. 16/503,742 filed Jul. 5, 2019, and entitled "Intelligent Data Curation"; which claims the benefit of priority under 35 U.S.C. § 119(e) to U.S. Provisional Application Ser. No. 62/745,544 filed Oct. 15, 2018, and entitled "Data Characterization and Enrichment Recommendation Engine"; and to U.S. Provisional Application Ser. No. 62/840,083 filed Apr. 29, 2019, and entitled "Intelligent Data Curation"; each of which is incorporated herein by reference in its entirety for all purposes.

BACKGROUND

In the handling of large data sets (what is frequently referred to as "big data"), the work of preparing data sets for analysis and/or for presentation in reports and/or visualizations can consume more time and/or more processing resources than the work of either of the analyses or the generation of presentations. As the size and number of data sets continues to increase, the correspondingly increasing variety of uses for data sets brings about a growing variety of data preparation operations that may need to be performed and each data preparation operation takes ever longer to perform. As a result, bottlenecks may occur in the preparation of data sets that may greatly delay the availability of properly prepared data sets for subsequent analysis and/or presentation operations.

This has rendered such past practices as choosing to regularly perform a selected battery of data preparation operations on every data set, regardless of which data preparation operations are actually needed, increasingly unfeasible. The task of determining what data preparation operations actually need to be performed on each data set has become increasingly important.

Unfortunately, the increasing size of data sets also increases the difficulty in relying on personnel to manually select the data preparation operations that are to be performed on each data set. Manually inspecting even a large enough portion of data set to identify what data preparation operations are needed becomes increasingly difficult and requires ever more time per data set. Additionally, the increasing variety of data preparation operations that may need to be performed to accommodate an increasing variety of uses for data sets can become overwhelming.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes a processor and a storage to store instructions that, when executed by the processor, cause the processor to perform operations including; or a computer-program product tangibly embodied in a non-transitory machine-readable storage medium includes instructions operable on the processor to cause the processor to perform operations including: receive an indication of availability of a data set, wherein the indication of availability of the data set comprises an indication of at least one of a contextual aspect of the data set from among a pre-selected set of contextual aspects, a structural feature of the data set from among a pre-selected set of structural features, or a data feature of a data value of the data set from among a pre-selected set of data features; coordinate a performance of a distribution of data set portions of the data set among a set of processor cores; provide a set of feature routines to each processor core of the set of processor cores to enable each processor core of the set of processor cores to execute instructions of each feature routine to detect a structural feature of the corresponding data set portion or a data feature of data values of the corresponding data set portion; receive indications of detected structural features and detected data features of the set of data set portions from the set of processor cores; generate, for the data set, metadata indicative of the detected structural features and the detected data features; generate, for the data set, context data indicative of the set of contextual aspects of the data set; provide the metadata and context data to each processor core of the set of processor cores; distribute a set of suggestion models among the set of processor cores to provide each processor core of the set of processor cores with a different suggestion model from among the set of suggestion models, and to enable the set of processor cores to employ the set of suggestion models to derive a suggested subset of data preparation operations of a set of data preparation operations to be suggested to be performed on the data set, wherein each suggestion model comprises a pre-selected type of model previously trained to determine whether to suggest that a corresponding data preparation operation of the set of data preparation operations be performed on the data set based on the metadata and context data; receive indications of the suggested subset from the set of processor cores; transmit an indication of the suggested subset to a viewing device to enable a presentation of the suggested subset; receive, from the viewing device, an indication of a selected subset of the set of data preparation operations selected to be performed; compare the selected subset to the suggested subset to determine whether there is a difference between the suggested and selected subsets; and in response to a determination that there is a difference between the suggested and selected subsets, re-train at least one suggestion model of the set of suggestion models based at least on a combination of the metadata, the context data and the selected subset.

The processor may be caused to provide an indication of the selected subset to each processor core of the selected set of processor cores to enable the set of processor cores to perform the selected subset of data preparation operations on the data set.

The at least one suggestion model may include neural network configuration data that comprises an indication of at least one of a quantity of neurons, a quantity of rows of neurons, a set of connections among neurons, a trigger function to be implemented by at least one neuron, weights and biases of the trigger function; and use of the at least one model by at least one processor core of the set of processor cores to determine whether to suggest that the corresponding data preparation operation be performed on the data set may include use of the suggestion model by the at least one processor core to configure a neural network to implement a set of classifiers. The re-training of the at least one suggestion model may include use, by the at least one processor core, of at least the combination of the metadata, the context data and selected subset to perform backpropagation on the neural network to change at least one of the weights or the biases.

The set of processor cores may be distributed among a set of node devices, and the processor may be caused to perform operations including: receive indications of availability of each node device of a plurality of node devices; and select the set of node devices from among the plurality of node devices based on the received indications of availability. The coordination of the performance of distribution of the data set portions of the data set among the set of processor cores may include a coordination of a performance of a distribution of the data set portions among the set of node devices from at least one storage device through a network; the provision of the set of feature routines to each processor core of the set of processor cores may include transmission of the set of feature routines to each node device of the set of node devices; the provision of the metadata and context data to each processor core of the set of processor cores may include transmission of the metadata and context data to each node device of the set of node devices; and the distribution of the set of suggestion models among the set of processor cores may include the distribution of the set of suggestion models among the set of node devices to provide each node device of the set of node devices with a different suggestion model from among the set of suggestion models.

Each node device of the set of node devices may store the corresponding data set portion distributed to the node device after the detection of structural features or data features of the corresponding data portion; and the processor may be caused to transmit, to each node device of the set of node devices, an indication of the selected subset to enable the node device to perform the selected subset of the set of data preparation operations on the corresponding data set portion. The pre-selected set of structural features of the data set may include a size of the data set; the indication of availability of the data set may include an indication of the size of the data set; and the processor may be caused to perform operations including derive a quantity of node devices based on the size of the data set, and select the quantity of node devices from among the plurality of node devices as the set of node devices. The processor may be caused to perform operations including: receive an indication from each node device of the plurality of node devices of a type of processor of the node device; and select the set of feature routines to transmit to each node device of the set of node devices based on the type of processor of the node device.

The processor may be caused to perform operations including: receive update data comprising a feature routine; coordinate a distribution of training data set portions of a training data set among the set of node devices; transmit the set of feature routines that includes the received feature routine to each node device of the set of node devices to enable each node device of the set of node devices to detect features of the corresponding training data set portion; receive indications of detected features of the set of training data set portions from the set of node devices; and generate, for the training data set, a portion of training metadata indicative of the detected features. The processor may also be caused to transmit, to each node device of the set of node devices, the portion of the training metadata, a portion of training context data and a set of action indications, wherein: the portion of the training context data is indicative of a set of contextual aspects of the training data set; and the set of action indications is indicative of a subset of data preparation actions of a set of data preparation actions to be suggested to be performed on the training data set based on the portion of the training metadata and the portion of the training context data. The processor may be further caused to perform operations including: distribute the set of suggestion models among the set of node devices to provide each node device of the set of node devices with a different suggestion model from among the set of suggestion models, and to enable a re-training of the set of suggestion models by the set of node devices; receive, from each node device, a corresponding suggestion model of the set of suggestion models after the re-training; and store the received suggestion models as replacements for the set of suggestion models.

The pre-selected set of contextual aspects may include at least one of: an indication of an identity of a source of the data set; an indication of a location associated with the source; an indication of an industry associated with the source; an indication of a time or date of receipt of the data set; an indication of a user of the other device; an indication of a location associated with the user; an indication of an industry associated with the user; or an indication of a time or date of receipt of a request from the user to access the data set. The pre-selected set of structural features may include at least one of: an indication of a size of the data set; an indication of a time or date of generation of the data set; an indication of a language of the data set; an indication of an organization of data values within the data set; or an indication of a number of dimensions of indexing of the data set. The pre-selected set of data features may include at least one of: an indication of at least one data type within the data set; an indication of at least one data format within the data set; or an indication of a minimum, a maximum, a mean or an average of a data value of the data set.

A computer-implemented method includes: receiving, by a processor, an indication of availability of a data set, wherein the indication of availability of the data set comprises an indication of at least one of a contextual aspect of the data set from among a pre-selected set of contextual aspects, a structural feature of the data set from among a pre-selected set of structural features, or a data feature of a data value of the data set from among a pre-selected set of data features; coordinating, by the processor, a performance of a distribution of data set portions of the data set among a set of processor cores; providing, by the processor, a set of feature routines to each processor core of the set of processor cores to enable each processor core of the set of processor cores to execute instructions of each feature routine to detect a structural feature of the corresponding data set portion or a data feature of data values of the corresponding data set portion; receiving, by the processor, indications of detected structural features and detected data features of the set of data set portions from the set of processor cores; generating, by the processor, for the data set, metadata indicative of the detected structural features and the detected data features; generating, by the processor, for the data set, context data indicative of the set of contextual aspects of the data set; providing, by the processor, the metadata and context data to each processor core of the set of processor cores; distributing, by the processor, a set of suggestion models among the set of processor cores to provide each processor core of the set of processor cores with a different suggestion model from among the set of suggestion models, and to enable the set of processor cores to employ the set of suggestion models to derive a suggested subset of data preparation operations of a set of data preparation operations to be suggested to be performed on the data set, wherein each suggestion model comprises a pre-selected type of model previously trained to determine whether to suggest that a corresponding data preparation operation of the set of data preparation operations be performed on the data set based on the metadata and context data; receiving, by the processor, indications of the suggested subset from the set of processor cores; transmitting, by the processor and via a network, an indication of the suggested subset to a viewing device to enable a presentation of the suggested subset; receiving, by the processor, and from the viewing device via the network, an indication of a selected subset of the set of data preparation operations selected to be performed; comparing, by the processor, the selected subset to the suggested subset to determine whether there is a difference between the suggested and selected subsets; and in response to a determination that there is a difference between the suggested and selected subsets, re-training, by the processor, at least one suggestion model of the set of suggestion models based at least on a combination of the metadata, the context data and the selected subset.

The method may further include providing, by the processor, an indication of the selected subset to each processor core of the selected set of processor cores to enable the set of processor cores to perform the selected subset of data preparation operations on the data set.

The at least one suggestion model may include neural network configuration data that comprises an indication of at least one of a quantity of neurons, a quantity of rows of neurons, a set of connections among neurons, a trigger function to be implemented by at least one neuron, weights and biases of the trigger function; and use of the at least one model by at least one processor core of the set of processor cores to determine whether to suggest that the corresponding data preparation operation be performed on the data set may include use of the suggestion model by the at least one processor core to configure a neural network to implement a set of classifiers. The re-training of the at least one suggestion model may include use, by the at least one processor core, of at least the combination of the metadata, the context data and selected subset to perform backpropagation on the neural network to change at least one of the weights or the biases.

The set of processor cores may be distributed among a set of node devices, and the method may further include receiving, by the processor, indications of availability of each node device of a plurality of node devices; and selecting, by the processor, the set of node devices from among the plurality of node devices based on the received indications of availability. The coordination of the performance of distribution of the data set portions of the data set among the set of processor cores may include a coordination of a performance of a distribution of the data set portions among the set of node devices from at least one storage device through a network; the provision of the set of feature routines to each processor core of the set of processor cores may include transmission of the set of feature routines to each node device of the set of node devices; the provision of the metadata and context data to each processor core of the set of processor cores may include transmission of the metadata and context data to each node device of the set of node devices; and the distribution of the set of suggestion models among the set of processor cores may include the distribution of the set of suggestion models among the set of node devices to provide each node device of the set of node devices with a different suggestion model from among the set of suggestion models.

Each node device of the set of node devices may store the corresponding data set portion distributed to the node device after the detection of structural features or data features of the corresponding data portion; and the method may further include transmitting, by the processor, to each node device of the set of node devices, an indication of the selected subset to enable the node device to perform the selected subset of the set of data preparation operations on the corresponding data set portion. The pre-selected set of structural features of the data set may include a size of the data set, the indication of availability of the data set may include an indication of the size of the data set; and the method may further include: deriving, by the processor, a quantity of node devices based on the size of the data set; and selecting, by the processor, the quantity of node devices from among the plurality of node devices as the set of node devices. The method may further include: receiving, by the processor, an indication from each node device of the plurality of node devices of a type of processor of the node device; and selecting, by the processor, the set of feature routines to transmit to each node device of the set of node devices based on the type of processor of the node device.

The method may further include: receiving, by the processor, update data comprising a feature routine; coordinating, by the processor and through the network, a distribution of training data set portions of a training data set among the set of node devices; transmitting, by the processor, the set of feature routines that includes the received feature routine to each node device of the set of node devices to enable each node device of the set of node devices to detect features of the corresponding training data set portion; receiving, by the processor, indications of detected features of the set of training data set portions from the set of node devices; and generating, by the processor, for the training data set, a portion of training metadata indicative of the detected features. The method may also include transmitting, by the processor, to each node device of the set of node devices, the portion of the training metadata, a portion of training context data and a set of action indications, wherein: the portion of the training context data is indicative of a set of contextual aspects of the training data set; and the set of action indications is indicative of a subset of data preparation actions of a set of data preparation actions to be suggested to be performed on the training data set based on the portion of the training metadata and the portion of the training context data. The method may further include: distributing, by the processor, the set of suggestion models among the set of node devices to provide each node device of the set of node devices with a different suggestion model from among the set of suggestion models, and to enable a re-training of the set of suggestion models by the set of node devices; receiving, by the processor, and from each node device, a corresponding suggestion model of the set of suggestion models after the re-training; and storing the received suggestion models as replacements for the set of suggestion models.

The pre-selected set of contextual aspects may include at least one of: an indication of an identity of a source of the data set; an indication of a location associated with the source; an indication of an industry associated with the source; an indication of a time or date of receipt of the data set; an indication of a user of the other device; an indication of a location associated with the user; an indication of an industry associated with the user; or an indication of a time or date of receipt of a request from the user to access the data set. The pre-selected set of structural features may include at least one of: an indication of a size of the data set; an indication of a time or date of generation of the data set; an indication of a language of the data set; an indication of an organization of data values within the data set; or an indication of a number of dimensions of indexing of the data set. The pre-selected set of data features may include at least one of: an indication of at least one data type within the data set; an indication of at least one data format within the data set; or an indication of a minimum, a maximum, a mean or an average of a data value of the data set.

An apparatus includes a processor and a storage to store instructions that, when executed by the processor, cause the processor to perform operations including; or a computer-program product tangibly embodied in a non-transitory machine-readable storage medium includes instructions operable on the processor to cause the processor to perform operations including: receive update data comprising a feature routine, wherein the feature routine comprises executable instructions to detect a structural feature of a data set from among a pre-selected set of structural features or a data feature of a data value of the data set from among a pre-selected set of data features; coordinate a performance of a distribution of training data set portions of a training data set among a set of processor cores; provide a set of feature routines to each processor core of the set of processor cores to enable each processor core of the set of processor cores to execute instructions of each feature routine to detect a structural feature of the corresponding training data set portion or a data feature of data values of the corresponding training data set portion; receive indications of detected structural features and detected data features of the set of training data set portions from the set of processor cores; generate, for the training data set, training metadata indicative of the detected structural features and detected data features of the set of training data set portions from the set of processor cores. The processor is also caused to provide the training metadata, a training context data and a set of action indications to each processor core of the set of processor cores, wherein: the training context data is indicative of a pre-selected set of contextual aspects; and the set of action indications is indicative of a subset of data preparation operations of a set of data preparation operations to be suggested to be performed on the training data set based on the training metadata and the training context data. The processor is further caused to distribute a set of suggestion models among the set of processor cores to provide each processor core of the set of processor cores with a different suggestion model from among the set of suggestion models, and to enable the set of processor cores to re-train the set of suggestion models, wherein: each suggestion model comprises a pre-selected type of model previously trained to determine whether to suggest that a corresponding data preparation operation of the set of data preparation actions be performed on a data set based on corresponding metadata and context data; the corresponding metadata is indicative of detected structural features and data features of the data set; and the corresponding context data is indicative of contextual aspects of the data set. The processor is still further caused to receive, from each processor core, a corresponding suggestion model of the set of suggestion models after the re-training; and store the received suggestion models as replacements for the set of suggestion models.

Space may be allocated within the training metadata to store a separate indication of whether each structural feature of the set of structural features or data feature of the set of data features that is detected in the training data by a corresponding feature routine of the set of feature routines. The processor may be caused to determine whether the structural feature or data feature detected by the received feature routine comprises a structural feature that is already among the set of structural features or a data feature that is already among the set of data features. In response to a determination that the structural feature or data feature detected by the received feature routine includes a new structural feature that is not already among the set of structural features or a new data feature that is not already among the set of data features, the processor may be caused to perform operations including: store the received feature routine as an addition to the set of feature routines prior to the transmission of the set of feature routine to each processor core of the set of processor cores to detect structural features and data features of the training data set; and allocate another space in the training metadata to store a separate indication of whether the new structural feature or new data feature is detected in the training data. The processor may be caused to, in response to a determination that the structural feature or data feature detected by the received feature routine includes a structural feature that is already among the set of structural features or a data feature that is already among the set of data features, replace a corresponding feature routine among the set of feature routines that detects the structural feature or data feature with the received feature routine prior to the transmission of the set of feature routines to the set of node devices to detect features of the training data set.

For each data preparation operation of the set of data preparation operations, space may be allocated within the set of action indications for a corresponding subset of action indications; for each subset of action indications, each action indication may correspond to a different combination of training data set and context data; and the update data comprises a suggestion model. The processor may be caused to determine whether the data preparation operation that corresponds to the received suggestion model comprises a data preparation operation that is already among the set of data preparation operations. In response to a determination that the corresponding data preparation operation includes a new data preparation operation that is not already among the set of data preparation operations, the processor may be caused to perform operations including: store the suggestion model as an addition to the set of suggestion models prior to the distribution of the set of suggestion models among the set of processor cores to enable re-training of the set of suggestion models; and allocate another space within the set of action indications for another subset of action indications that corresponds to the data preparation operation that corresponds to the received suggestion model. The processor may be caused to, in response to a determination that the corresponding data preparation operation includes a data preparation operation that is already among the set of data preparation operations, replace a corresponding suggestion model among the set of suggestion models that determines whether to suggest the data preparation operation prior to the distribution of the set of suggestion models among the set of processor cores to enable re-training of the set of suggestion models.

At least one suggestion model of the set of suggestion models may include neural network configuration data that comprises an indication of at least one of a quantity of neurons, a quantity of rows of neurons, a set of connections among neurons, a trigger function to be implemented by at least one neuron, weights and biases of the trigger function; and use of the at least one model by at least one processor core of the set of processor cores to determine whether to suggest that the corresponding data preparation operation be performed on the data set may include use of the suggestion model by the at least one processor core to configure a neural network to implement a set of classifiers. The re-training of the at least one suggestion model may include use, by the at least one processor core, of at least the combination of the training metadata, the training context data and a subset of action indications of the set of action indications that corresponds to the corresponding data preparation action to perform backpropagation on the neural network to change at least one of the weights or the biases.

The set of processor cores may be distributed among a set of node devices, and the processor may be caused to perform operations including: receive indications of availability of each node device of a plurality of node devices; and select the set of node devices from among the plurality of node devices based on the received indications of availability. The coordination of the performance of distribution of the training data set portions of the data set among the set of processor cores may include a coordination of a performance of a distribution of the training data set portions among the set of node devices from at least one storage device through a network; the provision of the set of feature routines to each processor core of the set of processor cores may include transmission of the set of feature routines to each node device of the set of node devices; the provision of the training metadata, the training context data and the set of action indications to each processor core of the set of processor cores may include transmission of the training metadata, the training context data and the set of action indications to each node device of the set of node devices; and the distribution of the set of suggestion models among the set of processor cores may include the distribution of the set of suggestion models among the set of node devices to provide each node device of the set of node devices with a different suggestion model from among the set of suggestion models.

The processor may be caused to perform operations including: receive an indication of availability of the data set, wherein the indication of availability of the data set comprises an indication of at least one of a contextual aspect of the data set from among the set of contextual aspects, a structural feature of the data set from among the set of structural features, or a data feature of a data value of the data set from among the set of data features; coordinate a performance of a distribution of data set portions of the data set among the set of node devices; transmit the set of feature routines to each node device of the set of node devices to enable each node device of the set of node devices to detect a structural feature of the corresponding data set portion or a data feature of data values of the corresponding data set portion; receive indications of detected structural features and detected data features of the set of data set portions from the set of node devices; generate, for the data set, metadata indicative of the detected structural features and the detected data features; generate, for the data set, context data indicative of the set of contextual aspects of the data set; transmit the metadata and context data to each node device of the set of node devices; distribute the set of suggestion models among the set of node devices to provide each node device of the set of node devices with a different suggestion model from among the set of suggestion models, and to enable the set of node devices to employ the set of suggestion models to derive a suggested subset of data preparation operations of a set of data preparation operations to be suggested to be performed on the data set; receive indications of the suggested subset from the set of node devices; transmit an indication of the suggested subset to a viewing device to enable a presentation of the suggested subset; receive, from the viewing device, an indication of a selected subset of the set of data preparation operations selected to be performed; compare the selected subset to the suggested subset to determine whether there is a difference between the suggested and selected subsets; and in response to a determination that there is a difference between the suggested and selected subsets, and in preparation for the re-training of the set of suggestion models, perform operations including store the metadata as an addition to the training metadata, store the context data as an addition to the training context data, and store an indication of the selected subset as an addition to the set of action indications.

The pre-selected set of contextual aspects may include at least one of: an indication of an identity of a source of the data set; an indication of a location associated with the source; an indication of an industry associated with the source; an indication of a time or date of receipt of the data set; an indication of a user of the other device; an indication of a location associated with the user; an indication of an industry associated with the user; or an indication of a time or date of receipt of a request from the user to access the data set. The pre-selected set of structural features may include at least one of: an indication of a size of the data set; an indication of a time or date of generation of the data set; an indication of a language of the data set; an indication of an organization of data values within the data set; or an indication of a number of dimensions of indexing of the data set. The pre-selected set of data features may include at least one of: an indication of at least one data type within the data set; an indication of at least one data format within the data set; or an indication of a minimum, a maximum, a mean or an average of a data value of the data set.

A computer-implemented method includes: receiving, by a processor, update data comprising a feature routine, wherein the feature routine comprises executable instructions to detect a structural feature of a data set from among a pre-selected set of structural features or a data feature of a data value of the data set from among a pre-selected set of data features; coordinating, by the processor, a performance of a distribution of training data set portions of a training data set among a set of processor cores; providing, by the processor, a set of feature routines to each processor core of the set of processor cores to enable each processor core of the set of processor cores to execute instructions of each feature routine to detect a structural feature of the corresponding training data set portion or a data feature of data values of the corresponding training data set portion; receiving, by the processor, indications of detected structural features and detected data features of the set of training data set portions from the set of processor cores; and generating, by the processor, for the training data set, training metadata indicative of the detected structural features and detected data features of the set of training data set portions from the set of processor cores. The method also includes providing, by the processor, the training metadata, a training context data and a set of action indications to each processor core of the set of processor cores, wherein: the training context data is indicative of a pre-selected set of contextual aspects; and the set of action indications is indicative of a subset of data preparation operations of a set of data preparation operations to be suggested to be performed on the training data set based on the training metadata and the training context data. The method further includes distributing, by the processor, a set of suggestion models among the set of processor cores to provide each processor core of the set of processor cores with a different suggestion model from among the set of suggestion models, and to enable the set of processor cores to re-train the set of suggestion models, wherein: each suggestion model comprises a pre-selected type of model previously trained to determine whether to suggest that a corresponding data preparation operation of the set of data preparation actions be performed on a data set based on corresponding metadata and context data; the corresponding metadata is indicative of detected structural features and data features of the data set; and the corresponding context data is indicative of contextual aspects of the data set. The method still further includes receiving, by the processor and from each processor core, a corresponding suggestion model of the set of suggestion models after the re-training; and storing the received suggestion models as replacements for the set of suggestion models.

Space may be allocated within the training metadata to store a separate indication of whether each structural feature of the set of structural features or data feature of the set of data features that is detected in the training data by a corresponding feature routine of the set of feature routines. The method may further include determining, by the processor, whether the structural feature or data feature detected by the received feature routine includes a structural feature that is already among the set of structural features or a data feature that is already among the set of data features. The method may further include, in response to a determination that the structural feature or data feature detected by the received feature routine includes a new structural feature that is not already among the set of structural features or a new data feature that is not already among the set of data features, performing operations including: storing the received feature routine as an addition to the set of feature routines prior to the transmission of the set of feature routine to each processor core of the set of processor cores to detect structural features and data features of the training data set; and allocating another space in the training metadata to store a separate indication of whether the new structural feature or new data feature is detected in the training data. The method may further include, in response to a determination that the structural feature or data feature detected by the received feature routine includes a structural feature that is already among the set of structural features or a data feature that is already among the set of data features, replacing a corresponding feature routine among the set of feature routines that detects the structural feature or data feature with the received feature routine prior to the transmission of the set of feature routines to the set of node devices to detect features of the training data set.

For each data preparation operation of the set of data preparation operations, space may be allocated within the set of action indications for a corresponding subset of action indications; for each subset of action indications, each action indication may correspond to a different combination of training data set and context data; and the update data may include a suggestion model. The method may further include determining, by the processor, whether the data preparation operation that corresponds to the received suggestion model comprises a data preparation operation that is already among the set of data preparation operations. The method may still further include, in response to a determination that the corresponding data preparation operation includes a new data preparation operation that is not already among the set of data preparation operations, performing operations including: storing the suggestion model as an addition to the set of suggestion models prior to the distribution of the set of suggestion models among the set of processor cores to enable re-training of the set of suggestion models; and allocating another space within the set of action indications for another subset of action indications that corresponds to the data preparation operation that corresponds to the received suggestion model. The method may further include, in response to a determination that the corresponding data preparation operation comprises a data preparation operation that is already among the set of data preparation operations, replacing a corresponding suggestion model among the set of suggestion models that determines whether to suggest the data preparation operation prior to the distribution of the set of suggestion models among the set of processor cores to enable re-training of the set of suggestion models.

At least one suggestion model of the set of suggestion models may include neural network configuration data that includes an indication of at least one of a quantity of neurons, a quantity of rows of neurons, a set of connections among neurons, a trigger function to be implemented by at least one neuron, weights and biases of the trigger function; and use of the at least one model by at least one processor core of the set of processor cores to determine whether to suggest that the corresponding data preparation operation be performed on the data set may include use of the suggestion model by the at least one processor core to configure a neural network to implement a set of classifiers. The re-training of the at least one suggestion model may include use, by the at least one processor core, of at least the combination of the training metadata, the training context data and a subset of action indications of the set of action indications that corresponds to the corresponding data preparation action to perform backpropagation on the neural network to change at least one of the weights or the biases.

The set of processor cores may be distributed among a set of node devices, and the method may further include: receiving, by the processor, indications of availability of each node device of a plurality of node devices; and selecting, by the processor, the set of node devices from among the plurality of node devices based on the received indications of availability. The coordination of the performance of distribution of the training data set portions of the data set among the set of processor cores may include a coordination of a performance of a distribution of the training data set portions among the set of node devices from at least one storage device through a network; the provision of the set of feature routines to each processor core of the set of processor cores may include transmission of the set of feature routines to each node device of the set of node devices; the provision of the training metadata, the training context data and the set of action indications to each processor core of the set of processor cores may include transmission of the training metadata, the training context data and the set of action indications to each node device of the set of node devices; and the distribution of the set of suggestion models among the set of processor cores may include the distribution of the set of suggestion models among the set of node devices to provide each node device of the set of node devices with a different suggestion model from among the set of suggestion models.

The method may further include: receiving, by the processor, an indication of availability of the data set, wherein the indication of availability of the data set comprises an indication of at least one of a contextual aspect of the data set from among the set of contextual aspects, a structural feature of the data set from among the set of structural features, or a data feature of a data value of the data set from among the set of data features; coordinating, by the processor and through a network, a performance of a distribution of data set portions of the data set among the set of node devices; transmitting, by the processor, the set of feature routines to each node device of the set of node devices to enable each node device of the set of node devices to detect a structural feature of the corresponding data set portion or a data feature of data values of the corresponding data set portion; receiving, by the processor, indications of detected structural features and detected data features of the set of data set portions from the set of node devices; generating, by the processor, for the data set, metadata indicative of the detected structural features and the detected data features; generating, by the processor, for the data set, context data indicative of the set of contextual aspects of the data set; transmitting, by the processor, the metadata and context data to each node device of the set of node devices; distributing, by the processor, the set of suggestion models among the set of node devices to provide each node device of the set of node devices with a different suggestion model from among the set of suggestion models, and to enable the set of node devices to employ the set of suggestion models to derive a suggested subset of data preparation operations of a set of data preparation operations to be suggested to be performed on the data set; receiving, by the processor, indications of the suggested subset from the set of node devices; transmitting, by the processor and by the network, an indication of the suggested subset to a viewing device to enable a presentation of the suggested subset; receiving, by the processor, and via the network from the viewing device, an indication of a selected subset of the set of data preparation operations selected to be performed; comparing, by the processor, the selected subset to the suggested subset to determine whether there is a difference between the suggested and selected subsets; and in response to a determination that there is a difference between the suggested and selected subsets, and in preparation for the re-training of the set of suggestion models, performing operations including storing the metadata as an addition to the training metadata, storing the context data as an addition to the training context data, and storing an indication of the selected subset as an addition to the set of action indications.

The pre-selected set of contextual aspects may include at least one of: an indication of an identity of a source of the data set; an indication of a location associated with the source; an indication of an industry associated with the source; an indication of a time or date of receipt of the data set; an indication of a user of the other device; an indication of a location associated with the user; an indication of an industry associated with the user; or an indication of a time or date of receipt of a request from the user to access the data set. The pre-selected set of structural features may include at least one of: an indication of a size of the data set; an indication of a time or date of generation of the data set; an indication of a language of the data set; an indication of an organization of data values within the data set; or an indication of a number of dimensions of indexing of the data set. The pre-selected set of data features may include at least one of: an indication of at least one data type within the data set; an indication of at least one data format within the data set; or an indication of a minimum, a maximum, a mean or an average of a data value of the data set.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 14 illustrates another example embodiment of a distributed processing system.

FIGS. 19A, 19B, 19C and 19D, together, illustrate an example embodiment of a logic flow of a coordinating device preparing or updating a distributed processing system.

DETAILED DESCRIPTION

Figure 1:
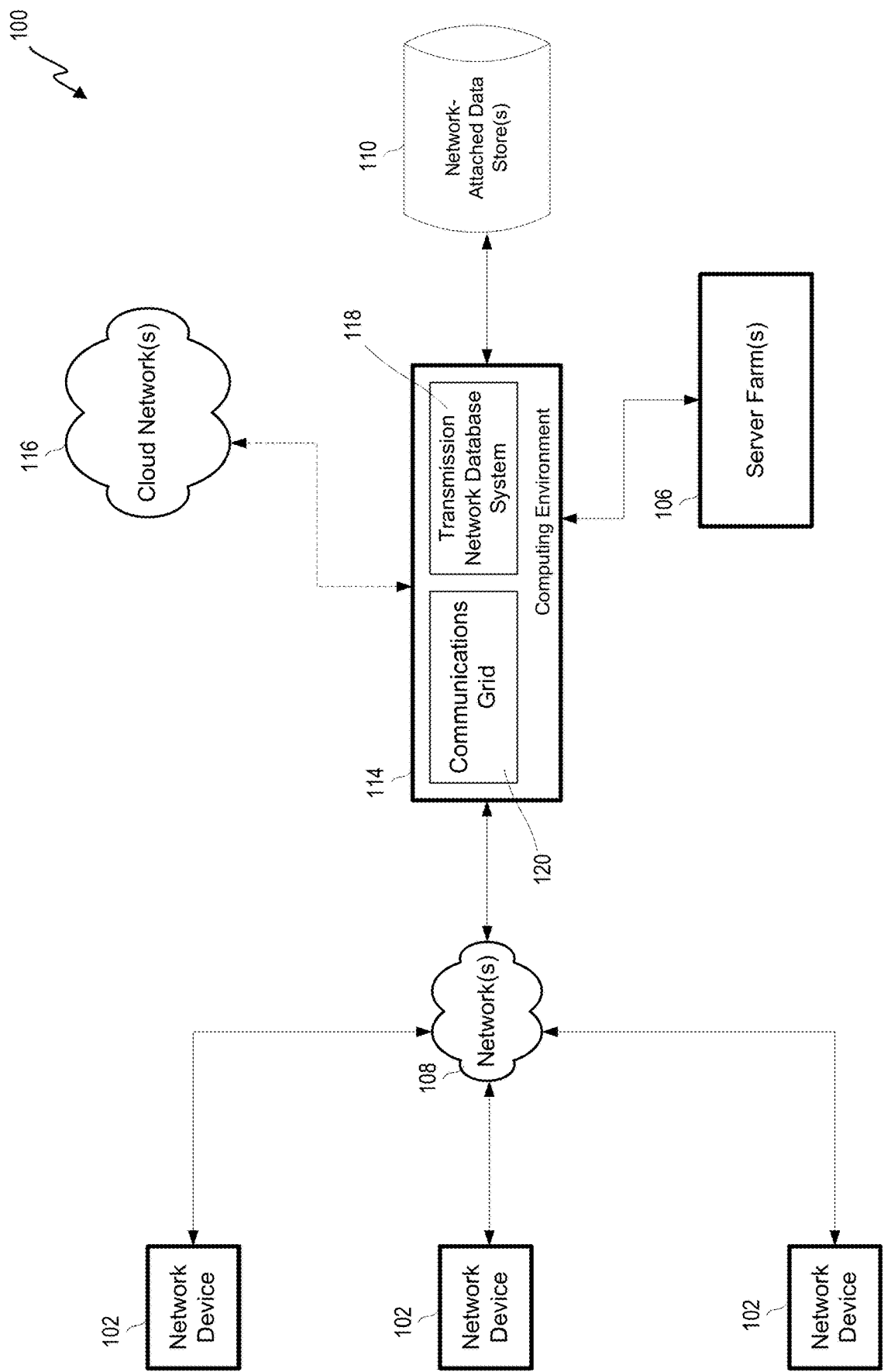
FIG. 1 illustrates a block diagram that provides an illustration of the hardware components of a computing system, according to some embodiments of the present technology.

Various embodiments described herein are generally directed to a distributed processing system for selecting a subset of available data preparation operations to suggest be performed on a data set based on the detection of features of the data set, where the variety of features to be detected and/or the variety of data preparation operations to be available to be suggested is extensible. More precisely, in a distributed processing system, a data set may be divided into multiple portions that are distributed among a set of node devices to enable features of each of those portions to be detected by the set of node devices at least partially in parallel. A coordinating device of the distributed processing system may generate a portion of metadata indicative of the features detected in the data set based on indications received from the multiple node devices of features detected within each of the data set portions. The coordinating device may also generate a portion of context data indicative of various aspects of the context of the data set, and may transmit the portions of the metadata and of the context data to each node device of the multiple node devices. A set of suggestion models that each correspond to a different data preparation operation of a set of data preparation operations that are able to be performed on a data set may be distributed among the set of node devices. Acting at least partially in parallel, the node devices of the set of node devices may use the portions of the metadata and the context data as inputs to the set of suggestion models to derive a subset of the set of data preparation operations to suggest be performed on the data set. The coordinating device may provide an indication of the suggested subset of data preparation operations to another device to enable a presentation of the suggested subset thereby, and may await receipt therefrom of an indication of what subset of data preparation operations of the set of data preparation operations is selected to be performed on the data set. Upon receipt of the selected subset of data preparation operations, the coordinating device may coordinate the performance of the selected subset of data preparation operations on the data set by the node devices, at least partially in parallel. The coordinating device may also compare the suggested subset of data preparation operations to the selected subset. If there are differences therebetween, then the coordinating device may add the combination of the portion of the metadata, the portion of the context data and the selected subset to a training data set by which the set of suggestion models may be retrained at a recurring interval of time or number of instances of generating a suggested subset.

The data of each data set may be any of a variety of types of data (e.g., societal statistics data, business operations data, raw data from sensors of large scale experiments, financial data, medical treatment analysis data, data from geological or meteorogical instruments, streams of data collected from Internet-attached appliances, etc.). By way of example, the data set may include scientific observation data concerning geological and/or meteorological events, or from sensors laboratory experiments in areas such as particle physics. By way of another example, the data set may include indications of activities performed by a random sample of individuals of a population of people in a selected country or municipality, or of a population of a threatened species under study in the wild. Each data set may be stored in a distributed manner among a grid of storage devices of the distributed processing system. In some embodiments, the grid of storage devices may be employed to store numerous data sets as each data set is assembled from data items detected and/or collected by various source devices, and/or data items generated as an output of various analyses performed by various source devices.

Regardless of the exact manner in which each data set is formed, as a data set is formed to the point of completion and/or becomes available in some other way, the coordinating device of the distributed processing system may receive an indication of its availability. In some embodiments, such an indication may be received from a storage device that stores at least a portion of the data set. It may be that this arises from the coordinating device recurringly polling storage devices to identify occurrences of the storage of new data sets therein. Alternatively or additionally, it may be that this arises from the coordinating device receiving a request from a viewing device operated by a user thereof to access the data set from where it is currently stored within one or more storage devices such that the coordinating device is made aware of the availability of the data set.

Depending on the exact manner in which the coordinating device is made aware of the availability of the data set, in some embodiments, the coordinating device may receive an initial amount of information concerning features and/or aspects of its context along with the indication of its availability, in some embodiments. Alternatively or additionally, the coordinating device may query the one or more storage devices in which the data set is stored to, itself, retrieve such an initial amount of information. Among such features in such an initial amount of information may be an indication of the size of the data set, and/or among such aspects of its context may be an indication of its source, when it was generated and/or within what storage device(s) it is stored. The coordinating device may use such information concerning aspects of the context of the data set to assign a higher or lower priority to the data set versus other data sets. By way of example, the source of the data set and/or which storage device(s) in which it is stored may cause the data set to be assigned a high enough priority as to become the next selected data set despite a lengthy queue of other data sets being available. Alternatively or additionally, the coordinating device may use such information concerning the feature of size of the data set, along with recurringly received indications of which node devices of the distributed processing system are available to determine how many node devices of the distributed processing system, as well as which ones, to include in the set of node devices.

Regardless of the exact manner in which the data set becomes the next selected data set, and regardless of the exact manner in which the set of node devices is selected, the coordinating device may communicate with each of the node devices of the set of node devices as part of effecting the distribution of portions of the data set among the set of node devices. In some embodiments, the coordinating device may divide the data set into data set portions of equal (or nearly equal) size as part of distributing the processing and storage requirements of the data set among the set of node devices relatively equally. The coordinating device may transmit, to each node device of the set of node devices, a pointer or other indication as to the storage location(s) within one or more storage devices at which it may independently retrieve the data set portion assigned to it by the coordinating device. In other embodiments, the coordinating device may, itself, retrieve each data set portion from one or more storage devices and relay each to the node device of the set of node devices to which the coordinating device has assigned it.

With the data set portions of the data set distributed among the set of node devices, the coordinating device may transmit a set of feature routines to each node device of the set of node devices. Each feature routine corresponds to a particular feature that the data set may have, and may include a set of instructions executable within a node device to analyze a corresponding one of the data set portions to detect the corresponding feature. Each of the node devices may execute each of the feature routines of the set of feature routines to determine whether any of the features detectable through such execution are present within the data set portion assigned to that node device. The coordinating device may coordinate such execution of the set of feature routines by each node device of the set of node devices to occur at least partially in parallel. As such execution of the feature routines by the set of node devices occurs, each of the node devices of the set of node devices may provide indications of detected features to the coordinating device.

The features sought to be detected through the execution of the set of feature routines may include any of wide variety of features, including and not limited to, structural features of the data set, features of the indexing scheme by which data values of the data set are able to be located, and/or features of the data values, themselves. Thus, by way of example, the features to be so detected may include, and are not limited to, punctuation types, delimiter types, region-specific formats, industry-specific formats, use of data containerization and/or access control, use of data compression and/or encryption, data types of the data values, languages included, scripting and/or programming languages included, arithmetic and/or logical operators, indexing type, index labels, current index ranges, data set size, date/time and/or indication of author and/or owner. Where data values include numeric values, the features to be so detected may also include various statistical values, including and not limited to, maximums, minimums, mean and/or median.

In some embodiments, the coordinating device may cooperate with the set of node devices to exchange at least a subset of the indications of detected features among the node devices within the set of node devices, and may do so in a manner similar to what is disclosed in U.S. Pat. No. 9,753,767 issued Sep. 5, 2017, the disclosure of which is incorporated herein by reference in its entirety. As discussed therein, the detection of one or more features of the data set may be assisted by, guided by and/or triggered by whether one or more other features of the data set have been detected. By way of example, the detection of one portion of an indexing scheme used to organize data values within one data set portion may not be possible without another portion of the indexing scheme having been detected in another data set portion such that one or more aspects of the indexing scheme (e.g., the type of indexing scheme, the location of components of the indexing scheme within the data set, etc.) are made known.

Regardless of whether such indications of detected features are exchanged, the coordinating device may generate a portion of metadata that is indicative of features of the data set based on the indications of detected features received from the set of node devices. In some embodiments, such a portion of metadata may take the form of a feature vector of values indicative of the detected features. In some embodiments, those values may be limited to indications of simply whether particular features have been found to be present. In other embodiments, those values may include numerical indications of quantities, measures, degrees, etc. of aspects of features found to be present, and/or may include indications of particular type, format, industry standard, revision level, etc. of aspects of features found to be present.

With the portion of metadata (e.g., a feature vector) corresponding to the data set having been generated, the coordinating device may generate a portion of context data that also corresponds to the data set based on indications of contextual aspects of the data set received from any of a variety of sources. In some embodiments, such indications may be provided to the coordinating device as part of providing an indication to the coordinating device of the availability of the data set. By way of example, and as previously discussed, the coordinating device may receive a request to retrieve and/or otherwise provide access to the data set from a viewing device, and the request may include various indications of contextual aspects of the data set as part of providing the coordinating device with the information needed to search for and/or gain access to the data set. In other embodiments, upon becoming aware of the availability of the data set, the coordinating device may transmit a request to provide indications of contextual aspects of the data set to the one or more storage devices in which the data set may be stored.

The contextual aspects of the data set that are included in the portion of context data may include any of a variety of aspects, including and not limited to, aspects of when and how the data set was generated, aspects of the source of the data set and/or the data therein, aspects of legal and/or other rights associated with the data set and/or the data therein, etc. Thus, by way of example, the contextual aspects may include, and are not limited to, the when, where, how, why and/or by who the data set and/or the data therein was generated; where the data set is and/or has been stored; history of revisions to the data set; owners, creators, licensees, licensors, custodians, etc. of the data set; and/or copyrights, licensing terms, publication conditions, access restrictions, etc. of the data.

In a manner analogous to the metadata generated for the data set, in some embodiments, the portion of context generated for the data set may take the form of a context vector of values indicative of the contextual aspects of the data set. In some embodiments, those values may be limited to indications of simply whether each contextual aspect is applicable to the data set. In other embodiments, those values may include numerical indications of quantities, measures, degrees, etc. of contextual aspects that have been determined to be applicable. In still other embodiments, those values may include portions of text and/or other encoded forms of character data that are descriptive of contextual aspects.

With the portion of metadata and the portion of context data (e.g., a context vector) corresponding to the data set having been generated, the coordinating device may transmit both to each node device of the set of node devices. The coordinating device may also distribute a set of suggestion models among the set of node devices, with each node device receiving one or more different suggestion models from the other node devices. Each suggestion model corresponds to a different particular data preparation operation that may be performed on the data set from among a set of data preparation operations. Each suggestion model may be any of a variety of type of machine learning model (including any of a variety of types of decision tree), and each may have been previously trained to determine whether to suggest that its corresponding data preparation operation be performed on a data set based on detected features and contextual aspects thereof. In some embodiments, at least one of the suggestion models may be a contextual bandit decision tree selected to achieve a pre-selected balance between exploitation of past successes in determining whether the performance of the corresponding data preparation operation is to be suggested, and exploration of occasions on which to test making an opposite determination from the one that would be made based on exploitation in support of further machine learning.

With the portions of metadata and context data transmitted to each of the node devices of the set of node devices, and with the set of suggestion models distributed among the node devices, each of the node devices may employ the portions of metadata and context data as inputs to each of the one or more suggestion models distributed to it to derive a separate determination from each suggestion model of whether its corresponding data preparation operation is to be suggested to be performed on the data set. The coordinating device may coordinate such uses of the set of suggestion models by the set of node devices to occur at least partially in parallel. As such determinations are made, each of the node devices of the set of node devices may provide indications of such determinations to the coordinating device.

The data preparation operations may include any of a variety of types of operations, including and not limited to: data value and/or format normalizations; data transformations; data filtering, stripping and/or masking; and/or data various data analyses in support of the generation of various graphical presentations. Such operations may serve to change data values, the selection of data values, the format of data values, the arrangement of data values within a data set, the structure of a data set, the indexing scheme of a data set, etc. Alternatively or additionally, such operations may serve to remove data values for reasons of data security and/or to comply with data privacy (e.g., legally mandated personal medical data privacy restrictions), intellectual property protections (e.g., copyright), licensing terms, etc. Any of such operations may be performed to cause a data set and/or the data values thereof to fit what is needed for different geographic regions, different legal jurisdictions, different languages, different industries, different scientific fields, different entities (e.g., convert among corporate, academic and/or governmental entities), etc.

From the indications received by the coordinating device of which data preparation operations are to be suggested to be performed on the data set, and which are not, the coordinating device may transmit an indication of a suggested subset of the set of data preparation operations that are to be performed on the data set to another device to enable the presentation of the suggested subset to a user. The other device may, itself, provide the user with a user interface by which it directly presents the suggested subset and awaits input from the user. In some embodiments, the other device may be a viewing device that enables the user thereof to manually view (or otherwise inspect) portions and/or various aspects of the data set to determine whether the user agrees with the suggested subset of data preparation operations. The user may provide input indicating that the suggested subset is selected to be the subset of data preparation operations that are to be performed on the data set, or a different subset of the set of data preparation operations is selected to be so performed.

Upon receipt, from the other device, of an indication of the selected subset of data preparation operations that are to be performed on the data set, the coordinating device may coordinate the performance of the selected subset with the set of node devices. In some embodiments, each node device of the set of node devices may continue to store the data set portion of the data set that was distributed to it as part of the aforedescribed detection of features. In such embodiments, and depending on such factors as the amount of time that has elapsed since the aforedescribed detection of features, advantage may be taken of such distribution of the data set among the set of node devices by causing the set of node devices to then perform the selected subset of data preparation operations on those data set portions in situ.

Also upon receipt, from the other device, of the indication of the selected subset of data preparation operations to be performed on the data set, the coordinating device may compare the selected subset to the suggested subset to determine whether there are any differences therebetween. If there are no differences, then the suggested subset may be deemed to represent a set of successful determinations by the distributed processing system of which data preparation operations are to be suggested to the user. In some embodiments, the coordinating device 2500 may maintain a count, a score or other indication for each suggestion model that reflects the rate of the ability of each suggestion model to successfully make such determinations. Such an indication of success rate may be updated to reflect each instance of a success and/or lack thereof in making such a determination for each suggestion model, and such an indication may be employed as an input to any subsequent re-training of that suggestion model and/or of the set of suggestion models.

However, if there are differences between the suggested subset and the selected subset, then the coordinating device may add the portion of metadata, the portion of context data and an indication of the selected subset to a training data structure used in training the set of suggestion models. In some embodiments, whether the coordinating device does add these items to the training data structure may be at least partially dependent on the choice of the overall machine learning algorithm employed to improve the making of determinations of what data preparation operations to suggest. As will be familiar to those skilled in the art, while the use of decision trees and/or similar models as the suggestion models may be deemed relatively effective in making such determinations, decision trees are subject to all too easily learning wrong lessons from occasional bad input. More precisely, there may be instances in which the user provides a selected subset of the data preparation operations that includes one or more errant selections of a data preparation operation to be performed or to not be performed. The use of decision trees may result in the suggestion models corresponding to those errantly selected or errantly non-selected data preparation operations all too easily learning such mistakes, thereby resulting in future incorrect determinations of whether to suggest the performance of those data preparation operations. To counter this, in some embodiments, any of a variety of sampling algorithms may be used to control whether the training data structure is to be augmented with the introduction of noise into the training set to increase the variance and reduce the possibility of overfitting of the selected subset in response to the selected subset differing from the suggested subset. Such use of sampling may be based on a presumption that, even though there may be occasional mistakes made by a user in specifying a subset of the data preparation operations to be performed on a data set, the user is more likely to specify a correct subset on the majority of occasions. Thus, in essence, such use of sampling serves to reduce the likelihood of incorporating such occasional mistakes into future re-training. It also helps adjust the algorithm for the future so that if user patterns change, the algorithm is self-adjusting to accommodate the new patterns.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
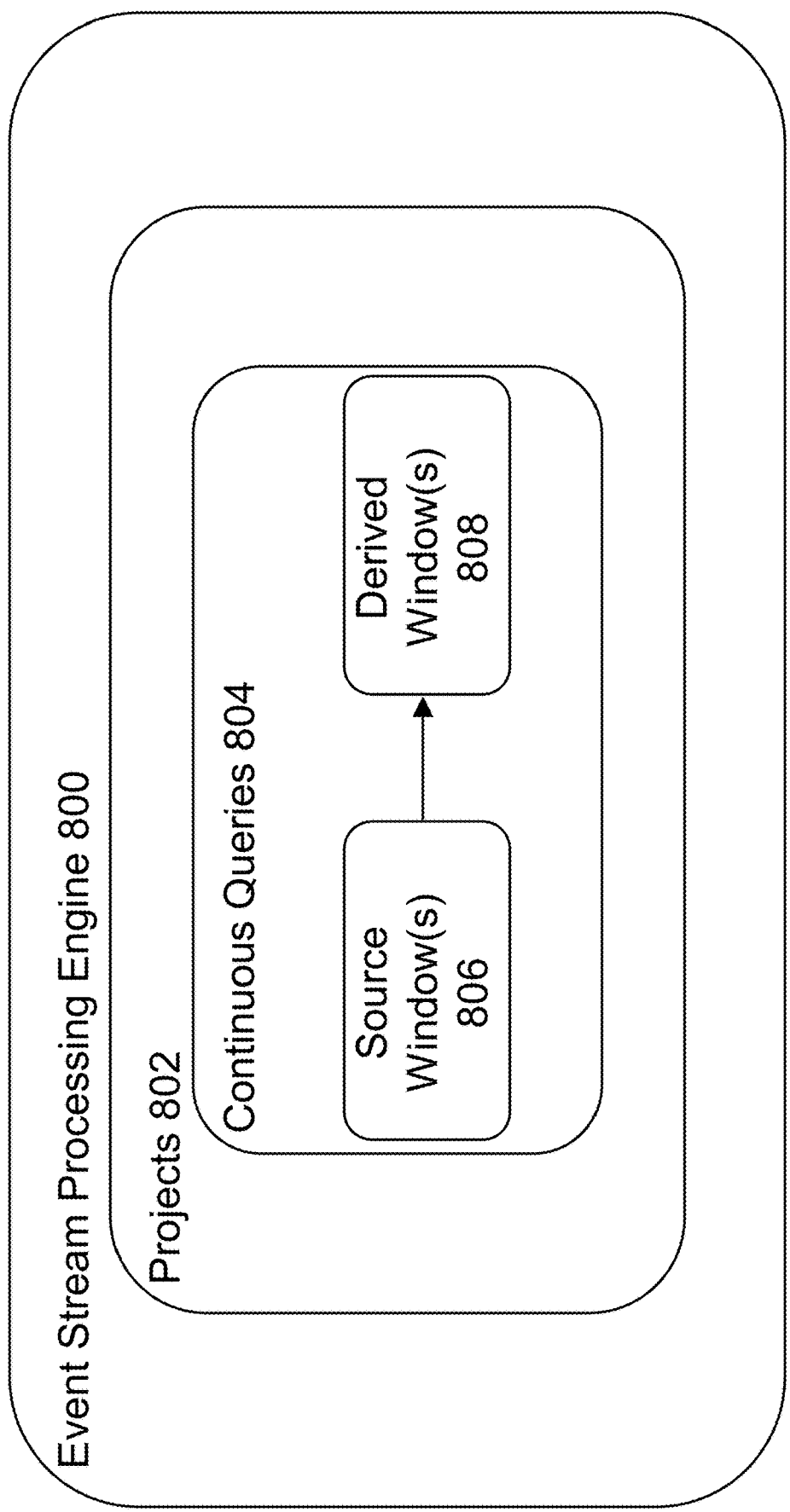
FIG. 8 illustrates a block diagram including components of an Event Stream Processing Engine (ESPE), according to embodiments of the present technology.
Figure 9:
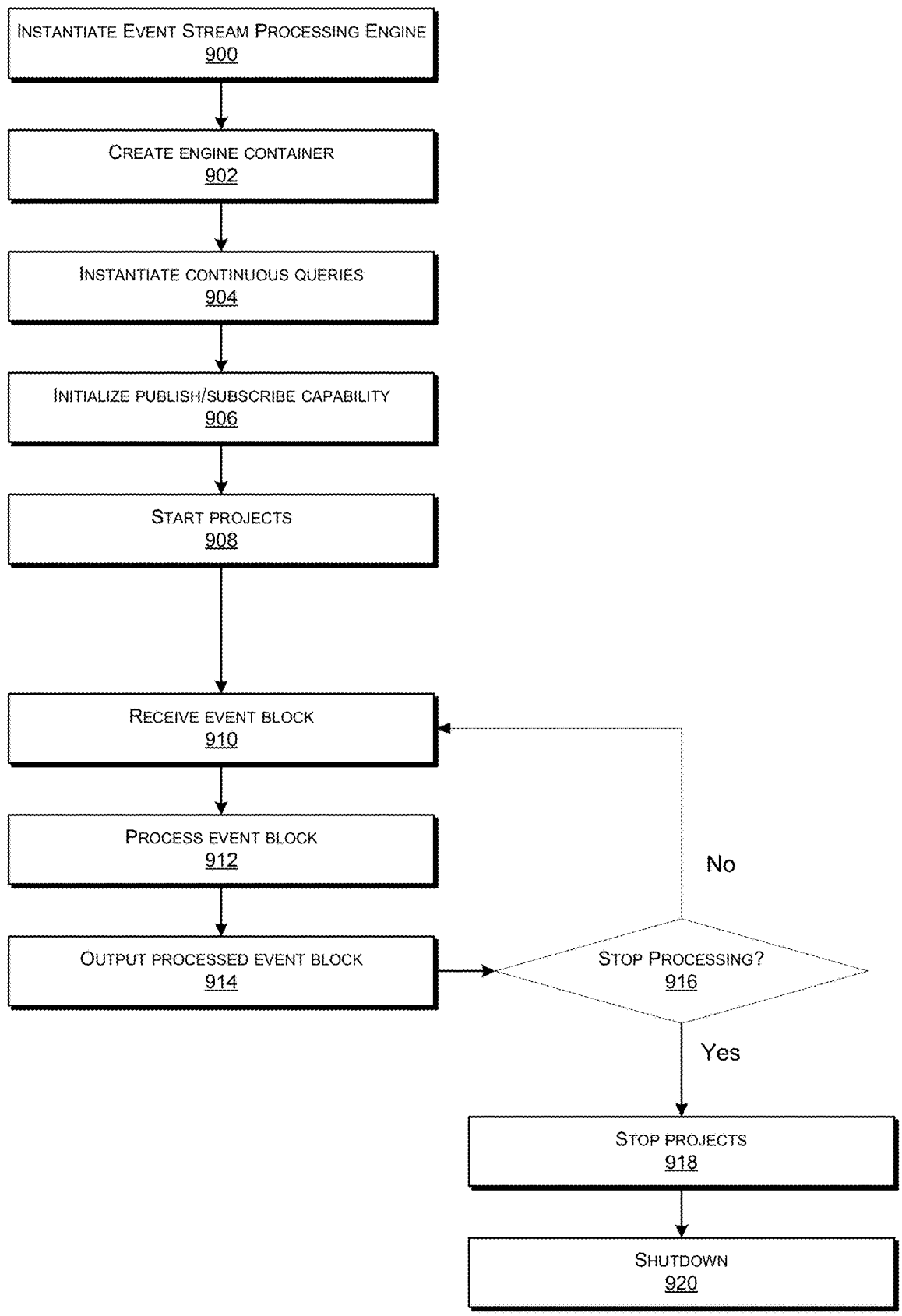
FIG. 9 illustrates a flow chart showing an example process including operations performed by an event stream processing engine, according to some embodiments of the present technology.
Figure 10:
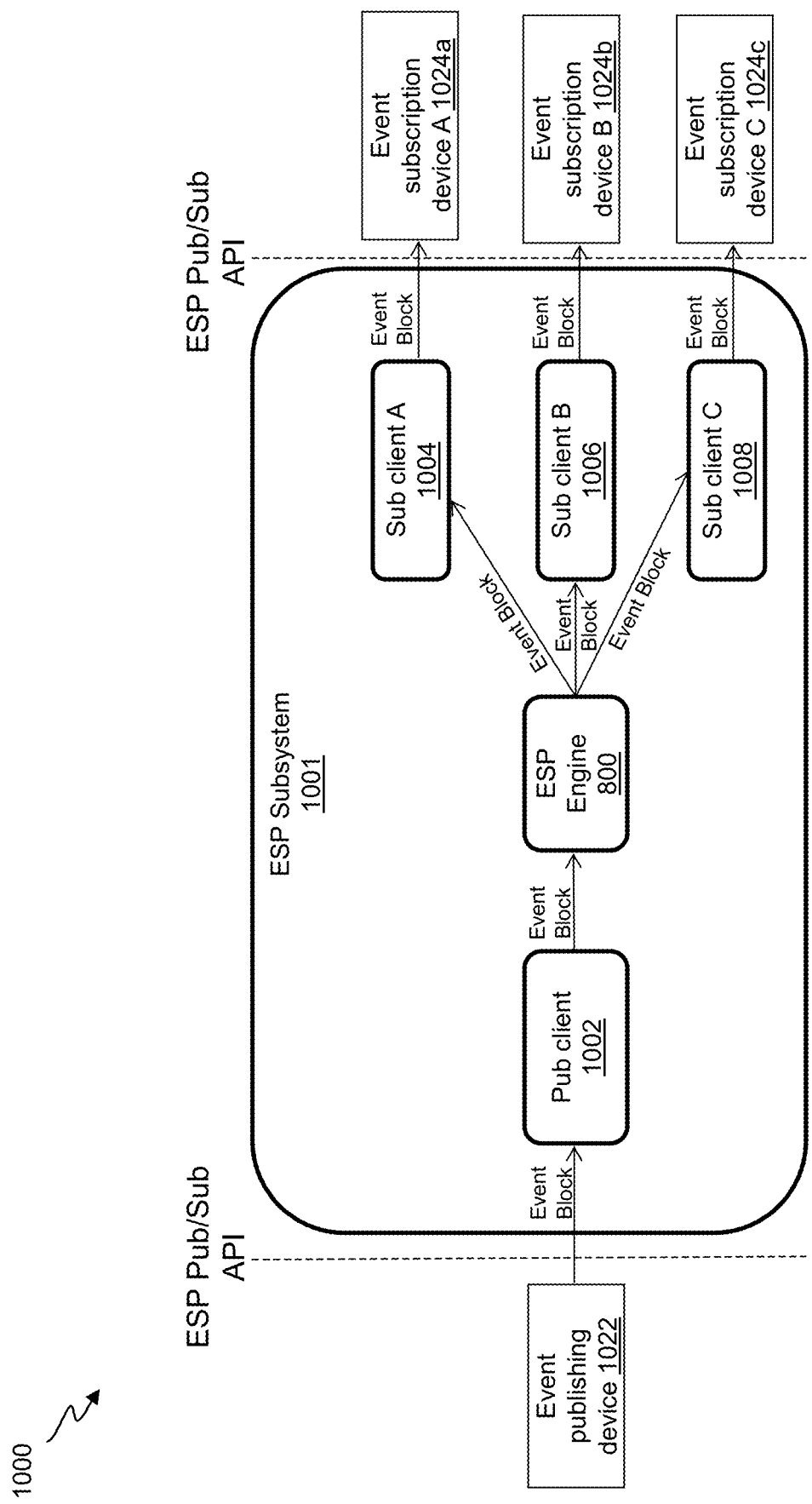
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
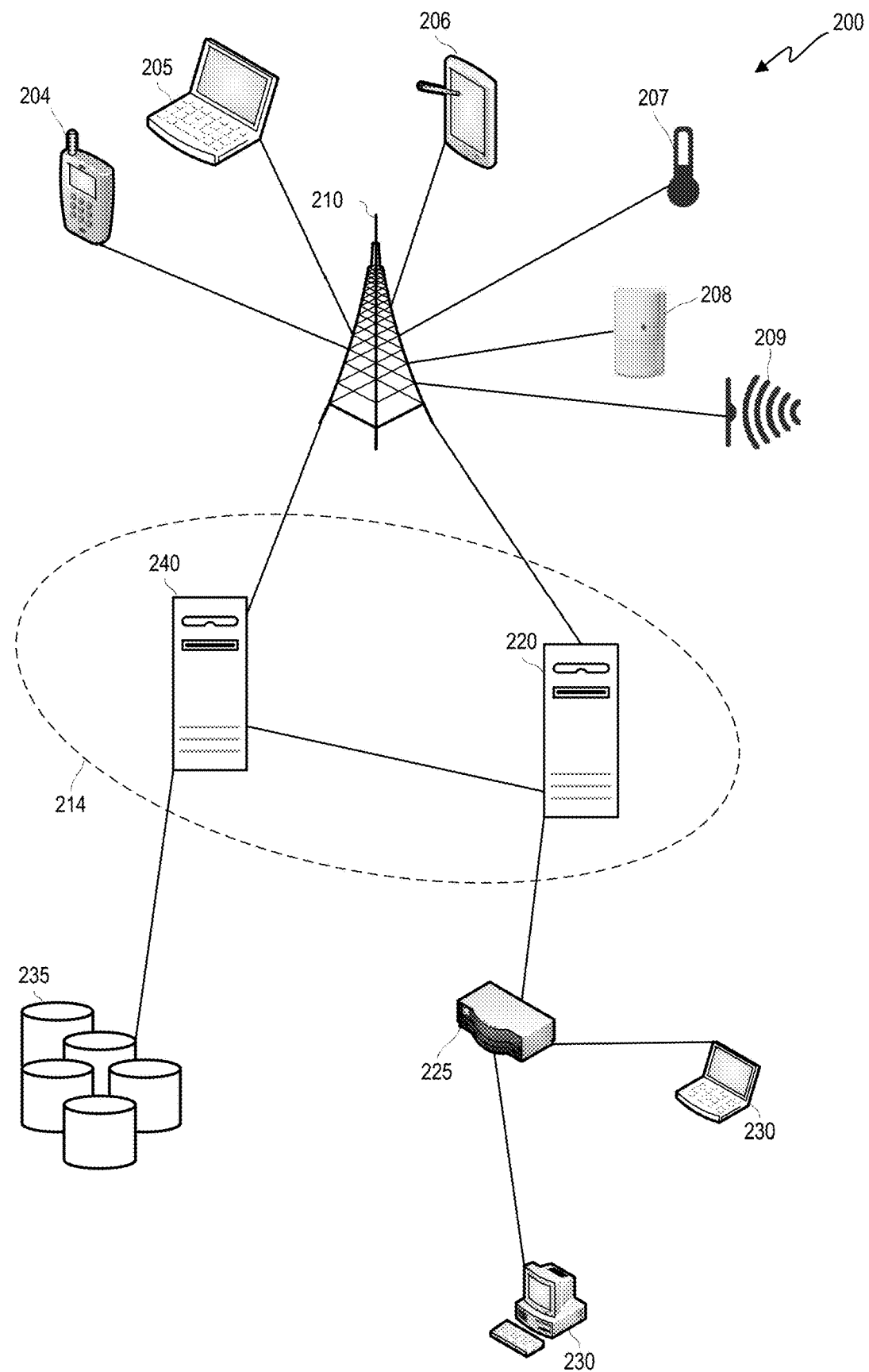
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
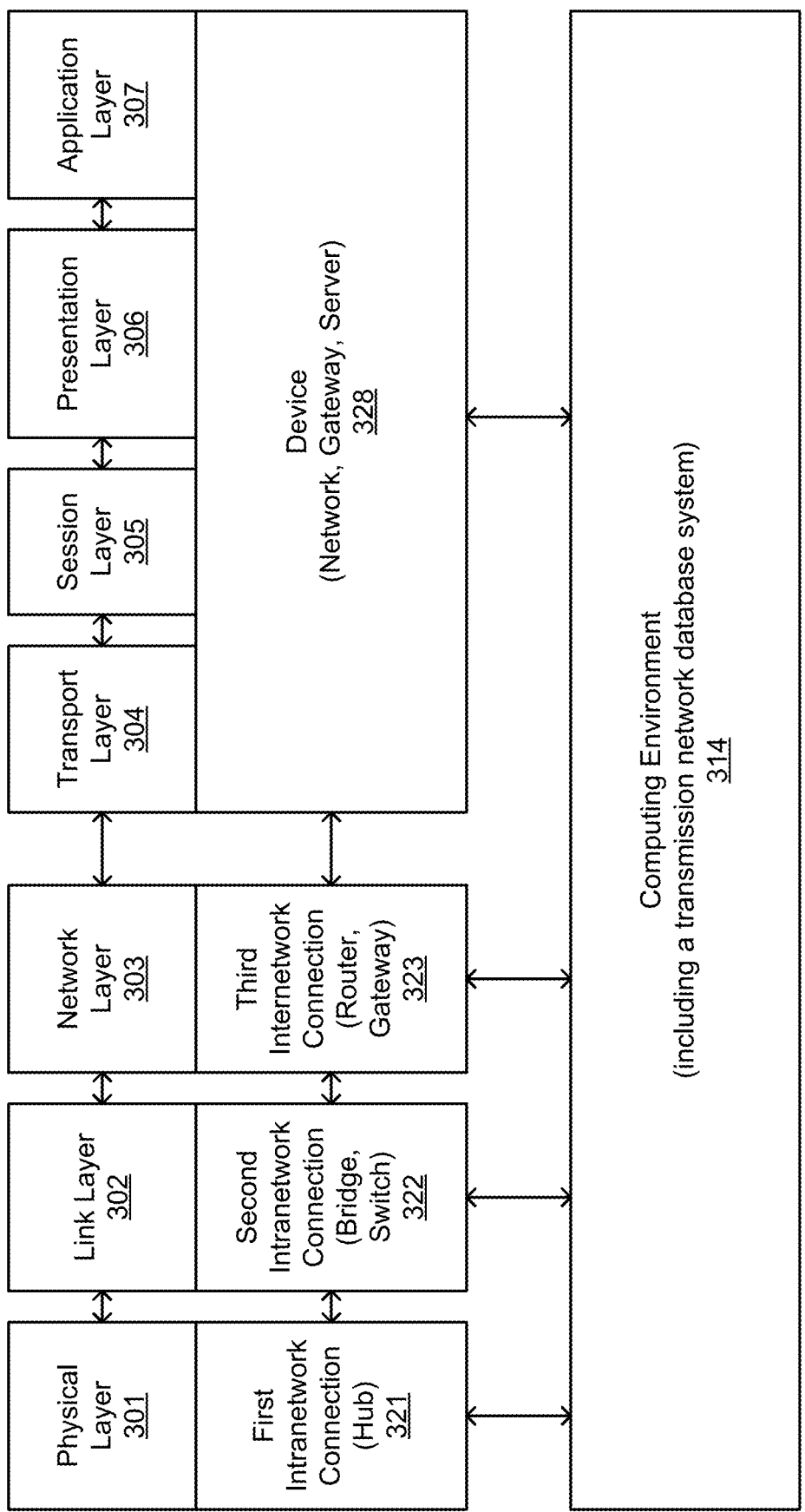
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
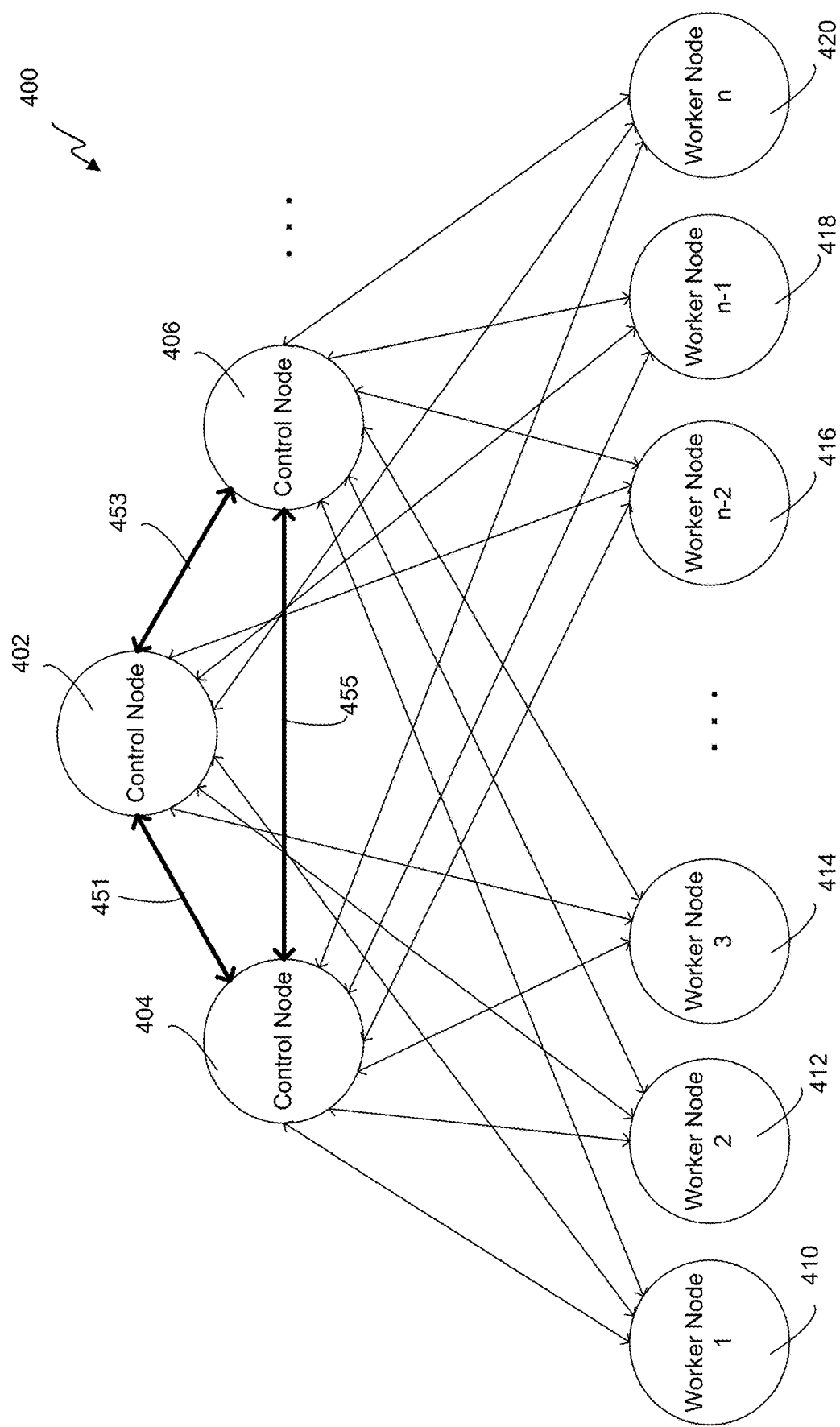
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology.

Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
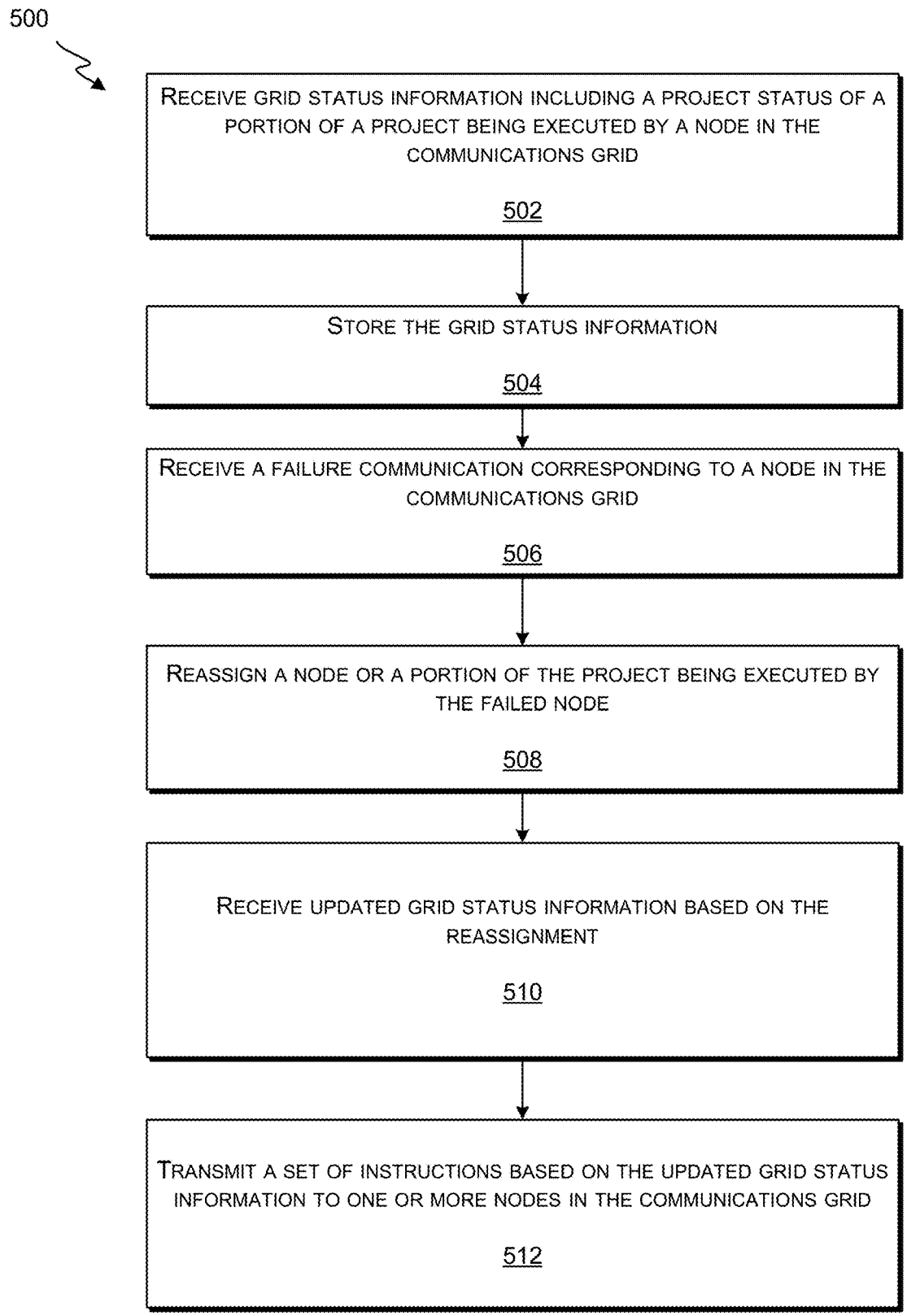
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
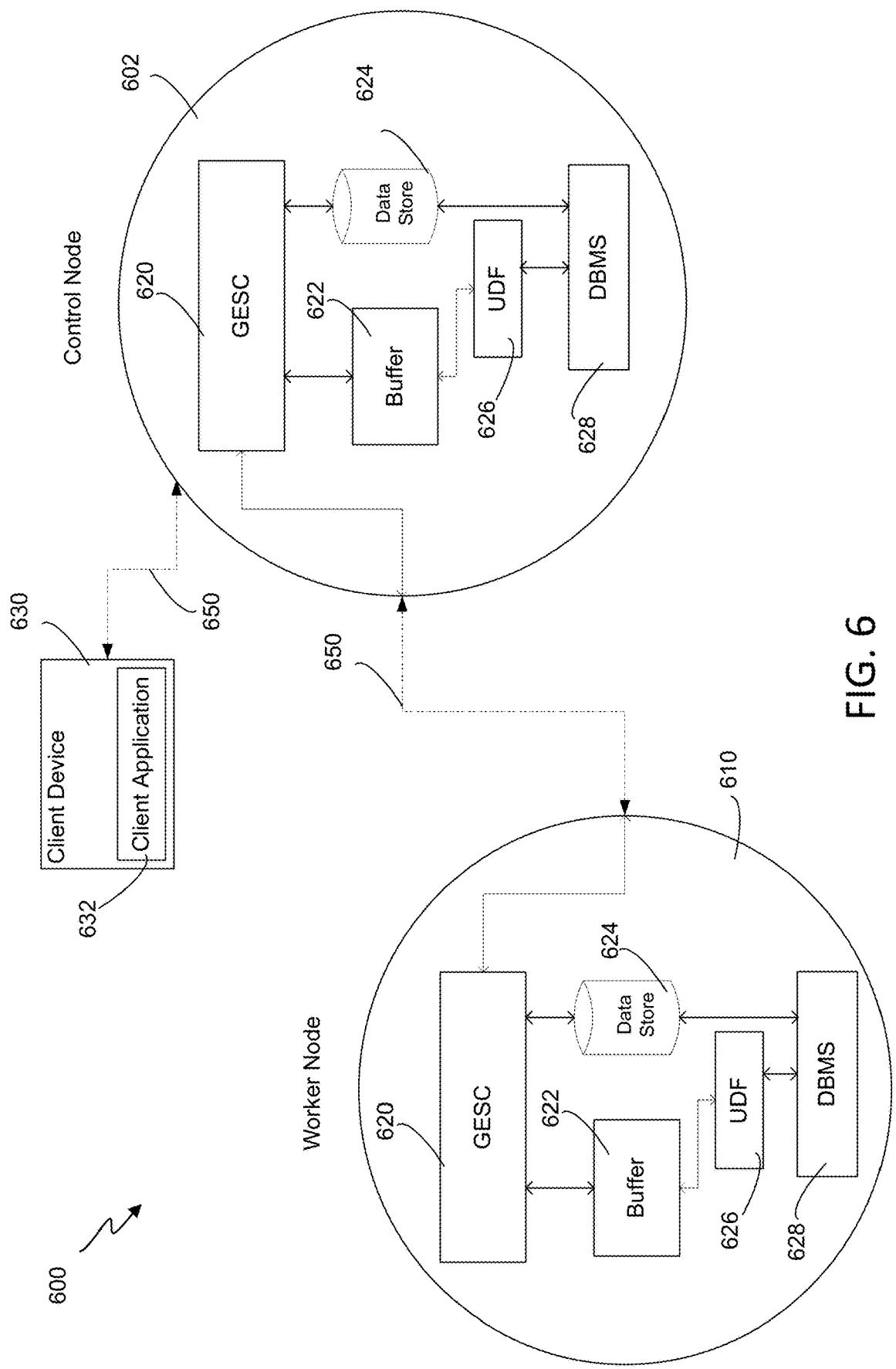
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
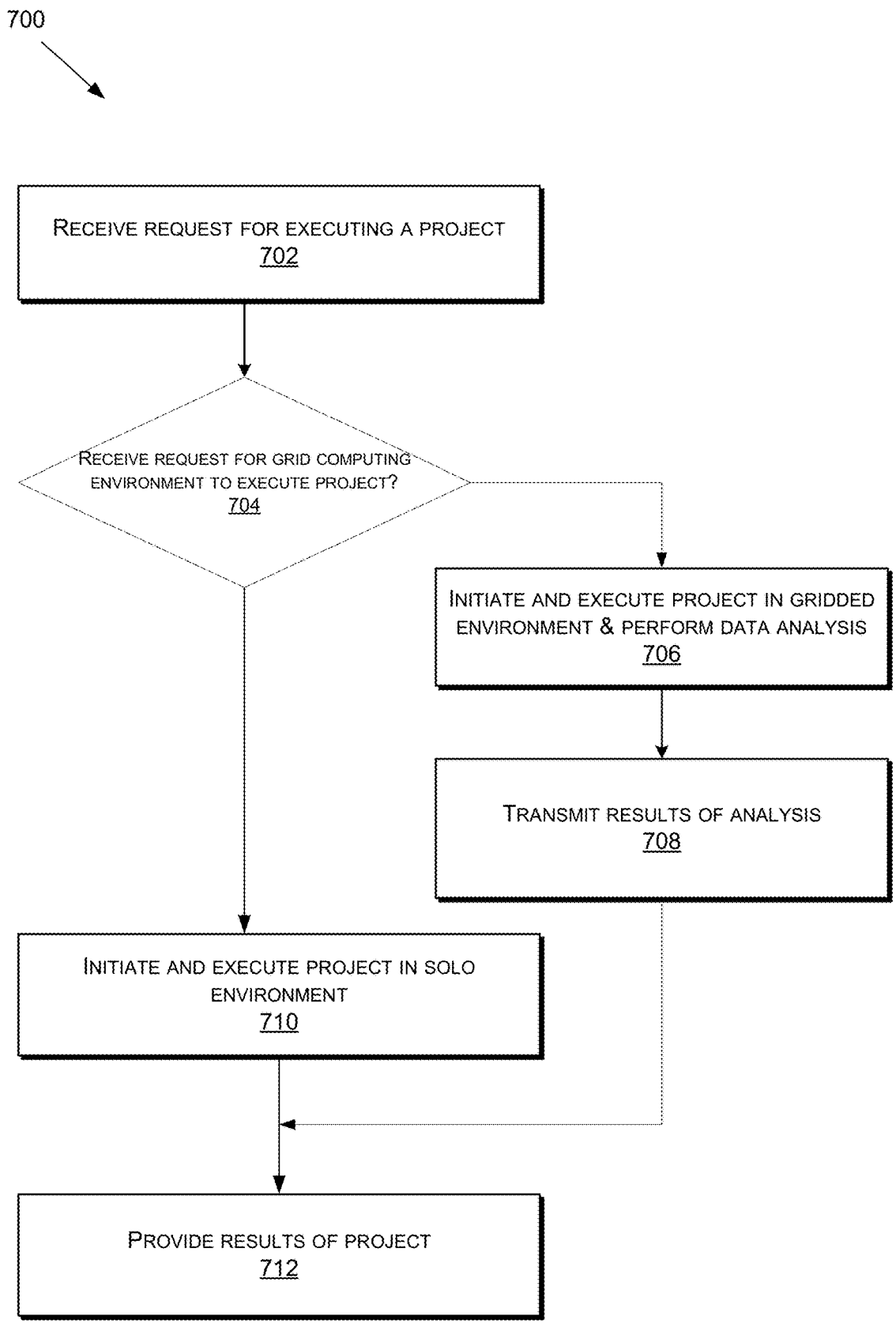
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
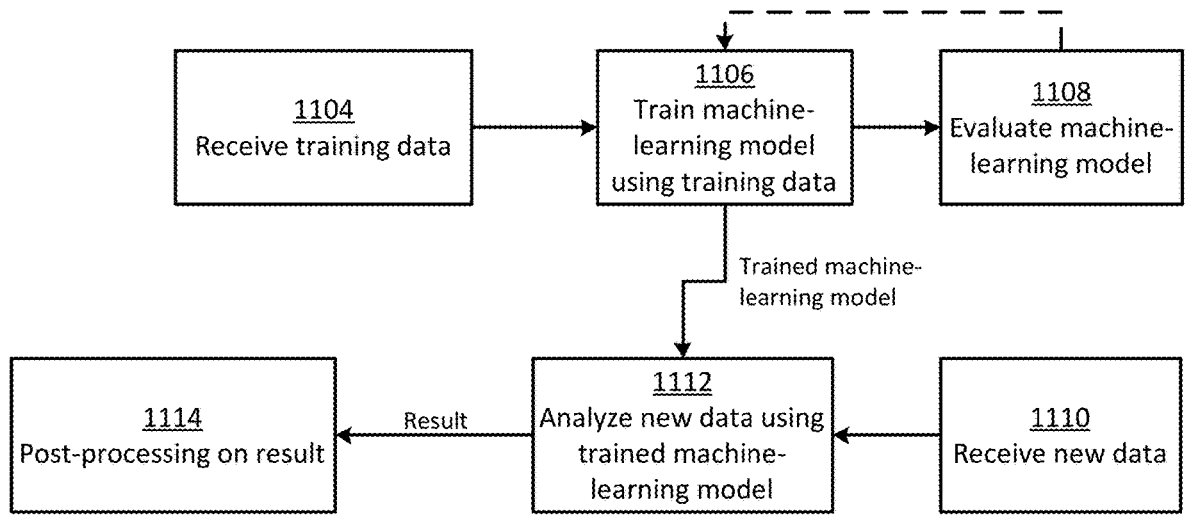
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
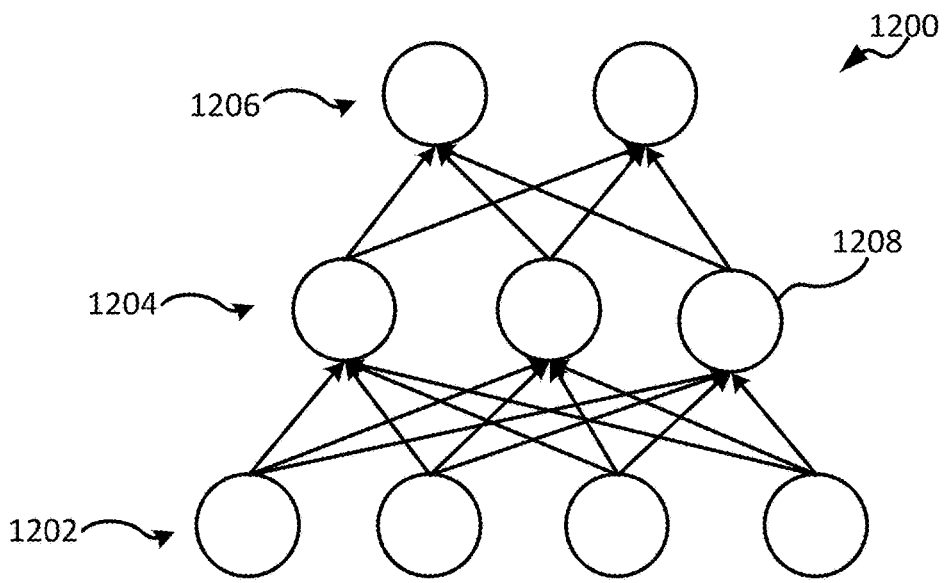
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
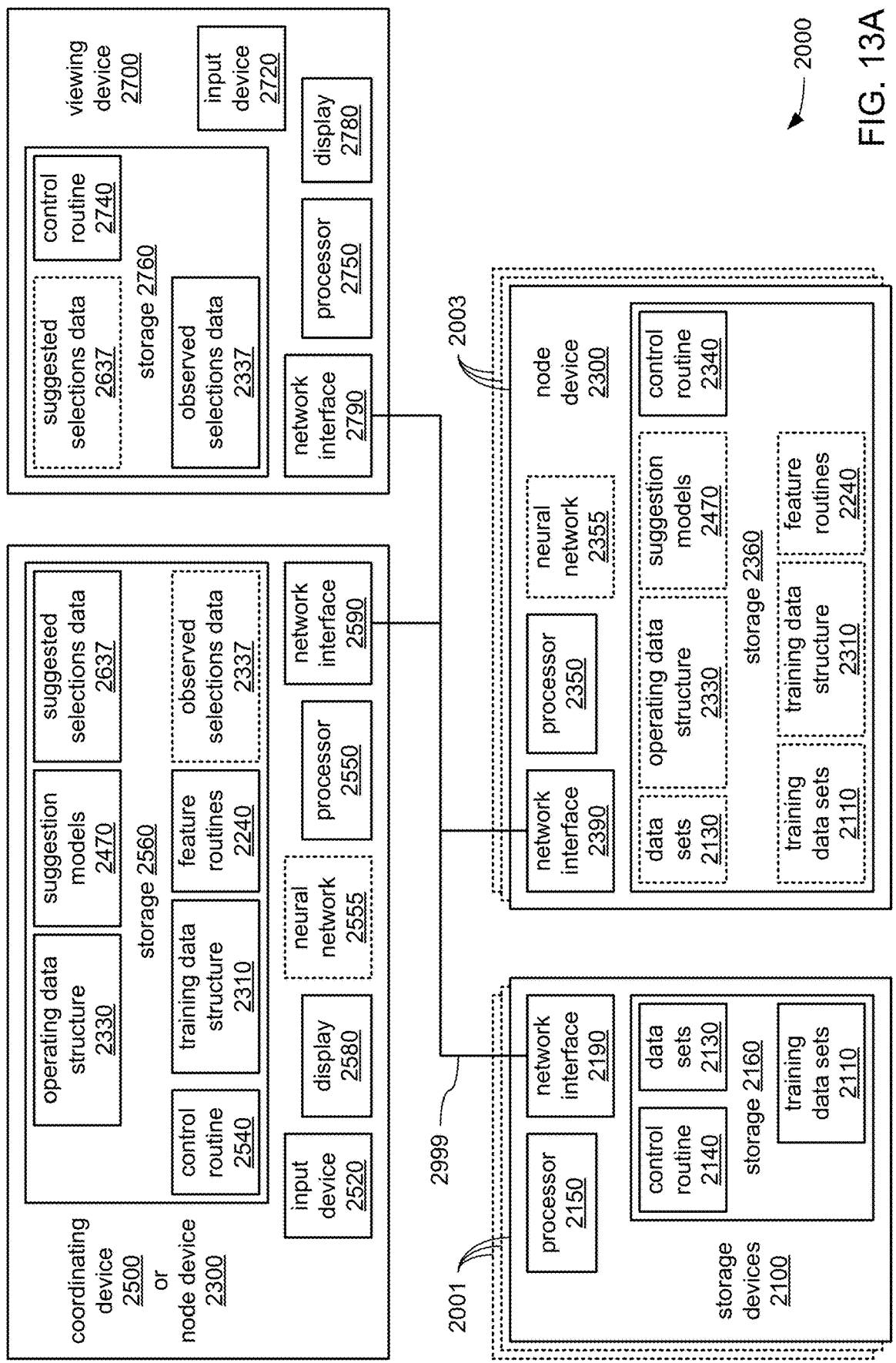
FIGS. 13A, 13B and 13C, together, illustrate an example embodiment of a distributed processing system.
Figure 13B:
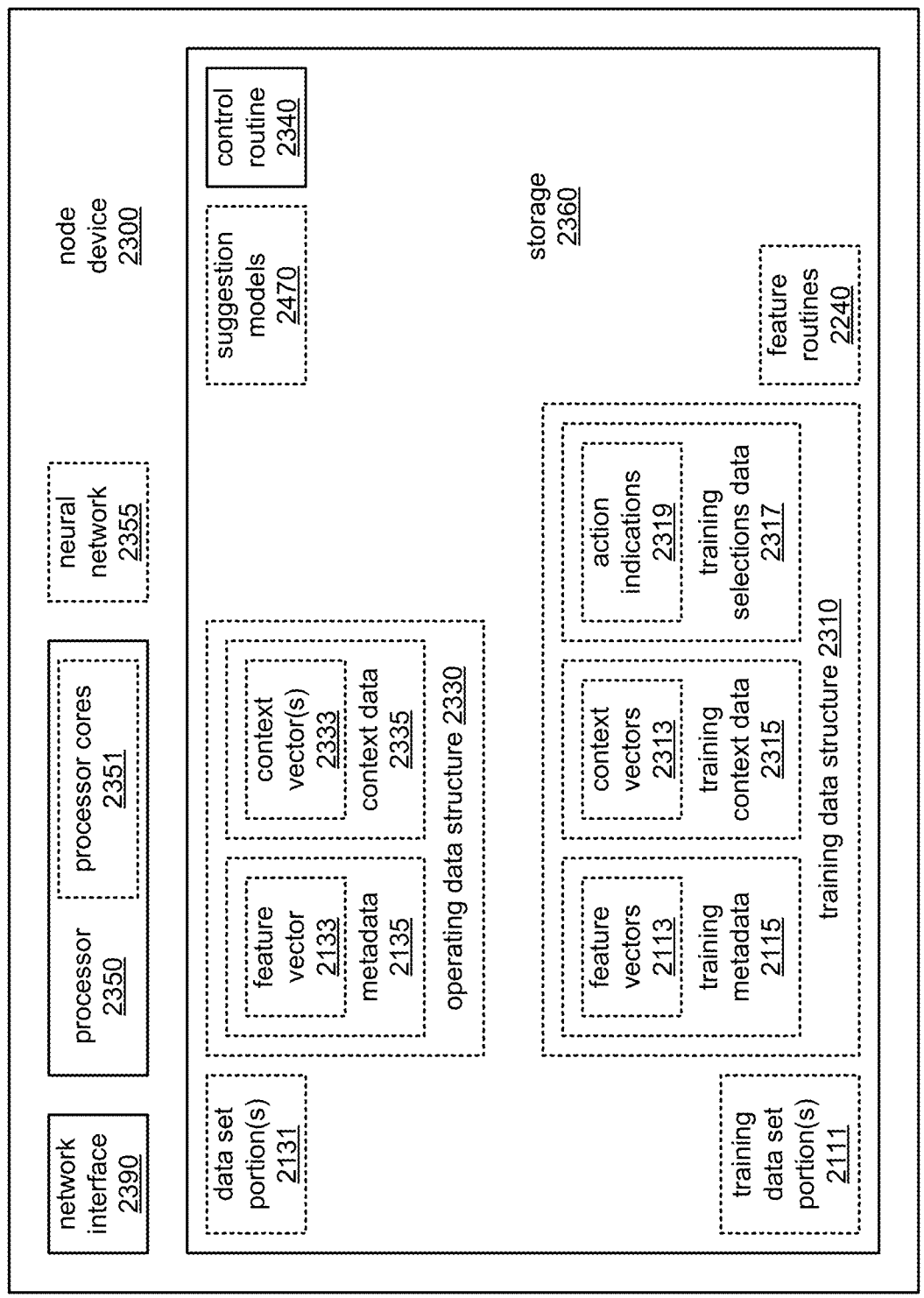
Figure 13C:
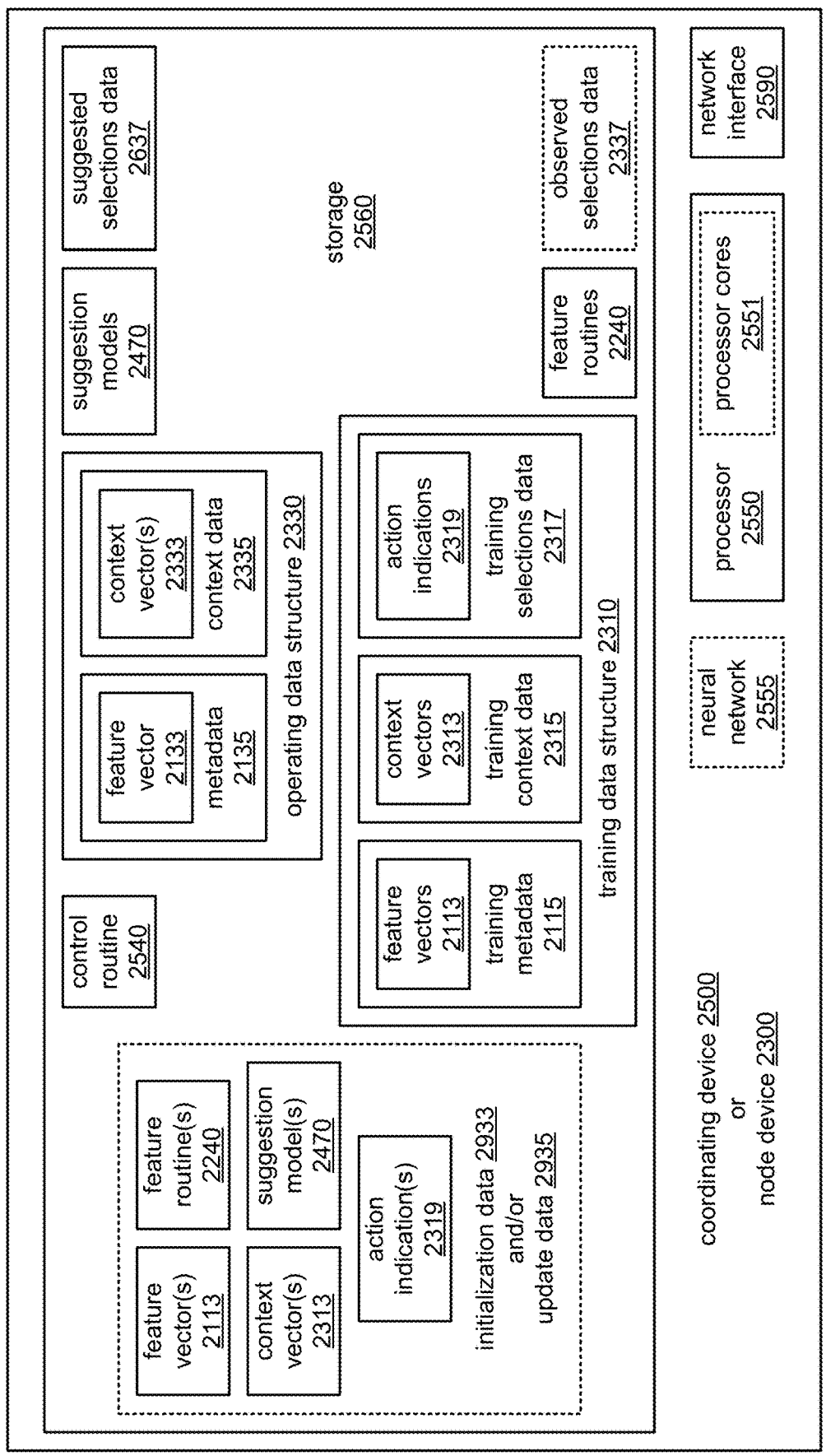

FIGS. 13A, 13B and 13C, together, illustrate an example embodiment of a distributed processing system 2000 incorporating one or more storage devices 2100 that may form a storage device grid 2001, multiple node devices 2300 of node device grid 2003, a coordinating device 2500 and a viewing device 2700 coupled by a network 2999. FIG. 14 illustrates an alternate example embodiment of the distributed online library system 2000 in which the node devices 2300 may perform the functions of the one or more storage devices 2100 such that the storage device grid 2001 may be incorporated into the node device grid 2003. In both of the embodiments of FIGS. 13A-C and 14, the distributed processing system 2000 performs data preparation operations on data sets 2130. Additionally, in both of these embodiments, the distributed processing system 2000 also suggests data preparation operations to be performed on each data set 2130 based on its features to aid operators thereof in selecting the data preparation operations that are to be performed by the distributed processing system 2000 on each data set 2130. Further, in both of these embodiments, the features of data sets 2130 that are detected and the variety of data preparation operations about which such suggestions are made are extensible.

Figure 15:
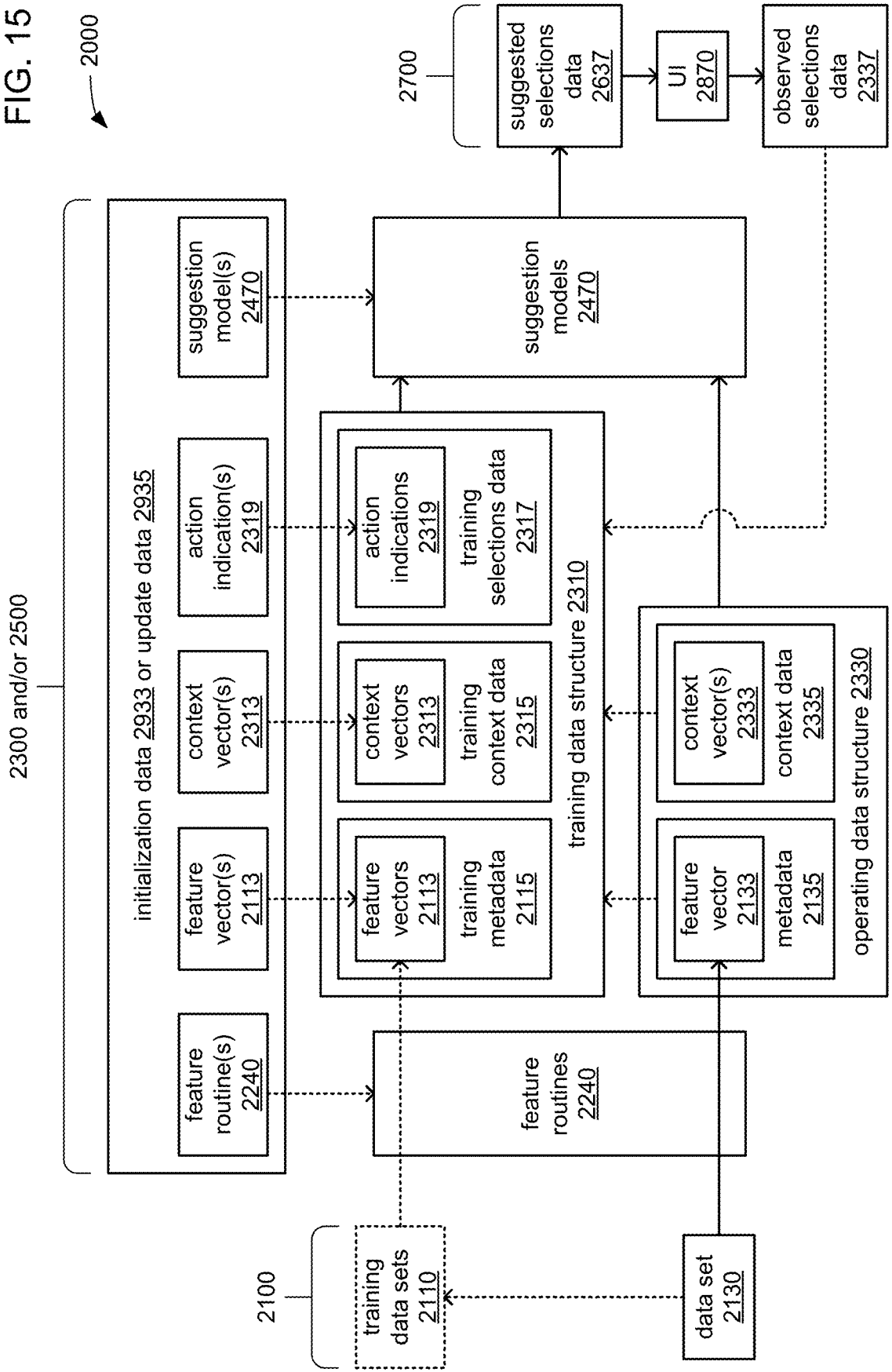
FIG. 15 illustrates an example embodiment of generation, exchanges and use of pieces of data among devices of a distributed processing system.

FIG. 15 illustrates aspects of the provision, exchange and use of various pieces of data within the devices 2100, 2300, 2500 and 2700, and among these devices via the network 2999. As will be explained in greater detail, as part of performing the aforementioned suggestion and data preparation operations, these devices may exchange a variety of portions of data sets 2130 (e.g., data set portions 2131), metadata 2135 and/or context data 2335, as well as training equivalents of each, including portions of training data sets 2110 (e.g., data set portions 2111), training metadata 2115 and/or training context data 2315. Additionally, these devices may exchange sets of feature routines 2240 and/or suggestion models 2470 as part of detecting data set features and/or deriving suggestions at least partially in parallel. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

Turning to FIGS. 13A-C, as well as to FIG. 15, in various embodiments, each of the storage devices 2100 may incorporate one or more of a processor 2150, a storage 2160 and a network interface 2190 to couple each of the storage devices 2100 to the network 2999. The storage 2160 may store a control routine 2140, one or more data sets 2130, and/or one or more training data sets 2110. The control routine 2140 may incorporate a sequence of instructions operative on the processor 2150 of each of the storage devices 2100 to implement logic to perform various functions, at least partially in parallel with the processors 2150 of others of the storage devices 2100. In executing the control routine 2140, the processor 2150 of each of the storage devices 2100 may operate the network interface 2190 thereof to receive data items of each of one or more of the data sets 2130 via the network 2999, and may store such data items as part thereof. The processor 2150 of each of the storage devices 2100 may also operate the network interface 2190 to provide an indication to the coordinating device 2500 of the availability of one or more of the data sets 2130 via the network 2999. Providing such an indication to the coordinating device 2500 for a particular data set 2130 may be in response to having received all of the data items of that data set 2130 such that it is available from the one or more storage devices in complete form.

Each of the one or more data sets 2130 may include any of a wide variety of types of data associated with any of a wide variety of subjects. By way of example, each data set 2130 may include scientific observation data concerning geological and/or meteorological events, or from sensors employed in laboratory experiments in areas such as particle physics. By way of another example, each data set 2130 may include indications of activities performed by a random sample of individuals of a population of people in a selected country or municipality, or of a population of a threatened species under study in the wild.

In some embodiments, the processors 2150 of the storage devices 1100 may cooperate to perform a collection function in which each of the processors 2150 operates a corresponding one of the network interfaces 2190 to receive data items of one or more of the data sets 2130 via the network 2999, and may assemble the received data items into the one or more data sets 2130 over a period of time. In such embodiments, data items of a data set 2130 may be received via the network 2999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 2999 to the storage devices 2100 where the numerous data items are then assembled to form a data set 2130. In other embodiments, the storage devices 2100 may receive one or more of the data sets 2130 from a multitude of other devices (not shown), such as another grid of other node devices. By way of example, such other devices may perform one or more processing operations that generates a data set 2130 (e.g., use a Bayesian analysis to derive a prediction of the behavior of people in a simulation of evacuating a burning building, or to derive a prediction of behavior of structural components of a bridge in response to various wind flows), and may then transmit a data set 2130 as an output to the storage device grid 2001.

The one or more training data sets 2110 are employed to prepare the distributed processing system 2000 for normal use, including training the ability of the system 2000 to suggest data preparation operations to be performed on each data set 2130. The one or more training data sets 2110 may include training data set(s) 2110 that incorporate simulated data values that are randomly generated and/or may be generated to incorporate random, but known, combinations of features in support of using the training data sets 2110 for such training. Alternatively or additionally, the one or more training data sets 2110 may include previously encountered ones of the one or more data sets 2130 that have been selected due to the combinations of features that have been previously detected in each. Regardless of the exact manner in which each training data set 2110 is generated, as will be explained in greater detail, the one or more training data sets 2110 may be provided to the system 2000 from an outside source (not shown) as part of an initialization data 2933 used in initial preparation of the system 2000 for use. Alternatively or additionally, the one or more training data sets 2100 may be similarly provided to the system 2000 from an outside source (again, not shown) as part of an instance of update data 2935 used in extending the capabilities of the system 2000 and/or in otherwise improving its ability to suggest data preparation operations to be performed on data sets 2130.

In various embodiments, each of the multiple node devices 2300 may incorporate one or more of a processor 2350, a neural network 2355, a storage 2360 and a network interface 2390 to couple each of the node devices 2300 to the network 2999. The processor 2350 may incorporate multiple processor cores 2351 among which operations may be distributed. The storage 2360 may store a control routine 2340. As will be explained in greater detail, depending on the operations that the multiple node devices 2300 are caused to perform by the coordinating device 2500, the storage 2360 may, at various times, additionally store one or more data set portions 2131 of data set(s) 2130 and/or one or more training data set portions 2111 of training data set(s) 2110 received from the one or more storage devices 2100; and/or one or more of feature routines 2240, an operating data structure 2330, a training data structure 2310 and/or suggestion model(s) 2470 provided by the coordinating device 2500. The control routine 2340 may incorporate a sequence of instructions operative on the processor(s) 2350 of each of the node devices 2300 to implement logic to perform various functions, at least partially in parallel with the processor(s) 2350 of others of the node device 2300. In executing the control routine 2340, the processor 2350 of each of the node devices 2300 may perform various operations under the control of the coordinating device 2500.

In various embodiments, the control device 2500 may incorporate one or more of a processor 2550, a neural network 2555, a storage 2560, and/or a network interface 2590 to couple the control device 2500 to the network 2999. The processor 2550 may incorporate multiple processor cores 2551 among which operations may be distributed. The storage 2360 may store a control routine 2340. The storage 2560 may store a control routine 2540, the operating data structure 2330, the training data structure 2310, a suggested selections data 2637 and an observed selections data 2337. As will be explained in greater detail, on occasions in which the system 2000 receives either the initialization data 2933 or an instance of the update data 2935, at least a portion thereof may also be stored within the storage 2560. The control routine 2540 may incorporate a sequence of instructions operative on the processor(s) 2550 to implement logic to perform various functions. In executing the control routine 2540, the processor 2550 of the coordinating device 2500 may monitor the availability of each of the node devices 2300, may assign sets of the node devices 2300 from among the multiple node devices 2300 to perform various operations, and may monitor the performance of those operations by the node devices 2300.

In various embodiments, the viewing device 2700 may incorporate a processor 2750, a storage 2760, an input device 2720, a display 2780, and/or a network interface 2790 to couple the viewing device 2700 to the network 2999. The storage 2760 may store one or more of a control routine 2740, the suggested selections data 2637 and the observed selections data 2337. The control routine 2740 may incorporate a sequence of instructions operative on the processor 2750 to implement logic to perform various functions. In executing the control routine 2740, the processor 2750 may operate the input device 2720 and the display 2780 to provide a user interface (UI) by which a user may operate the viewing device 2700 to inspect at least a portion of a data set 2130, may control the performance of various analyses on a data set 2130, and/or may be presented with visualizations and/or other results of analyses performed on a data set 2130. The processor 2750 may also be caused to operate such a UI to prompt the user to provide various pieces of contextual information concerning a data set 2130, the manner in which a data set 2130 is to be used, and/or still other contextual aspects.

Turning to FIGS. 14 and 15, in the depicted alternate embodiment of the distributed processing system 2000, the storage 2360 within each of the node devices 2300 is caused to store the one or more data sets 2130 and the one or more training data sets 2110 therein in lieu of the storage devices 2100 of the embodiment of FIGS. 13A-C and 15 doing so. Correspondingly, in executing the control routine 2340, the processor 2350 within each of the node devices 2300 may be caused to perform the earlier described operations of receiving data values from other devices, and generating one or more data sets 2130 therefrom. Further, in executing the control routine 2340, the processor 2350 may be caused to provide the indication to the coordinating device 2500, via the network 2999, of the availability of a data set 2130 for the performance of data preparation operations thereon in lieu of the processor 2150 of one of the storage devices 2100 of the embodiment of FIGS. 13A-C and 15 doing so.

It should be noted that, despite the specific depiction in FIGS. 13A-C and 14 of two example embodiments of the distributed processing system 2000, still other alternate embodiments of the distributed processing system 2000 are possible that differ in still other ways. By way of example, in another alternate embodiment, the functionality of the coordinating device may be incorporated into one or more of the node devices 2300 as process(es) supported on separate thread(s) by the processor 2350, by a separate processor within a coordinating subsystem, and/or within an isolated virtual machine. This may be done to entirely obviate the need for a separate coordinating device 2500, or may be done within a particular node device 2300 to enable that node device 2300 to take over such functionality as a backup to the coordinating device 2500.

Referring again to FIGS. 13A-C, 14 and 15, as recognizable to those skilled in the art, the control routines 2140, 2340, 2540 and 2740, including the components of which each is composed, are selected to be operative on whatever type of processing component(s) that are selected to implement applicable ones of the processors 2150, 2350, 2550 and/or 2750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2350, 2550 and/or 2750. Where one or more device drivers are included, those device drivers may provide support for any of a variety of other components, whether hardware or software components, of the storage devices 2100, the node devices 2300, the control device 2500 and/or the viewing device 2700 (or of virtual machines employed to implement any of these devices in virtual form).

Figure 16A:
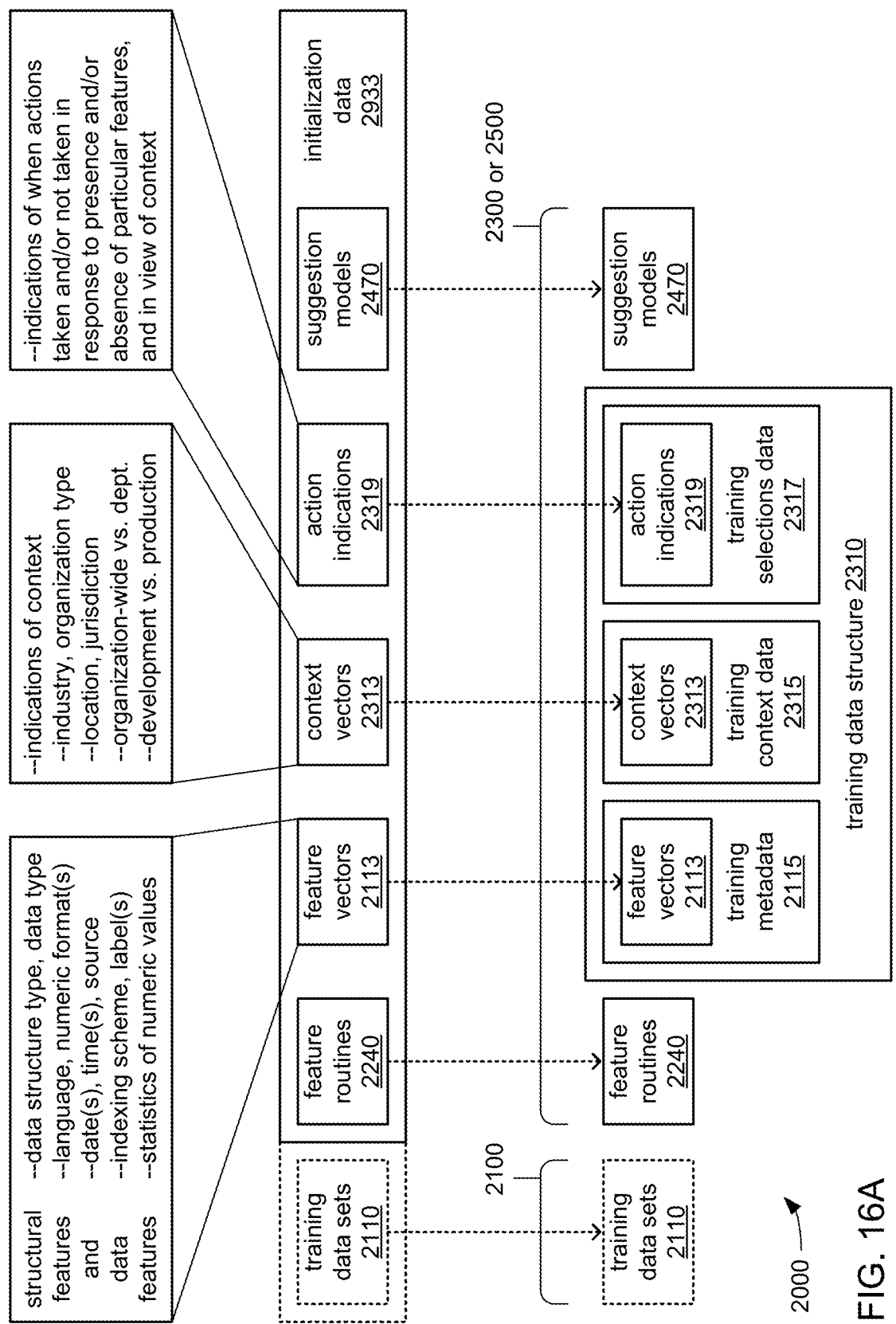
FIGS. 16A, 16B, 16C and 16D, together, illustrate a more detailed example embodiment of preparation of a distributed processing system for normal use.
Figure 16B:
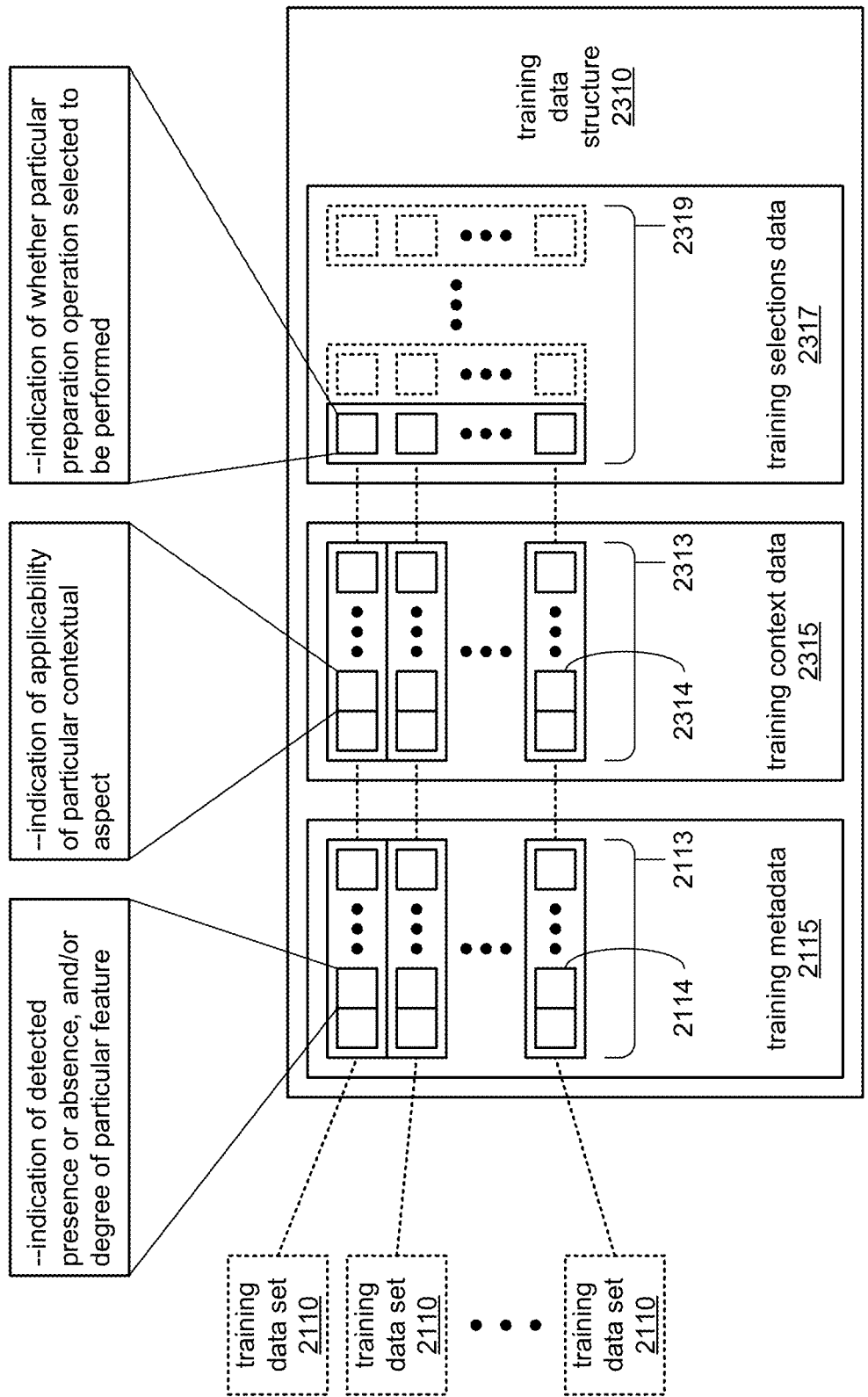
Figure 16C:
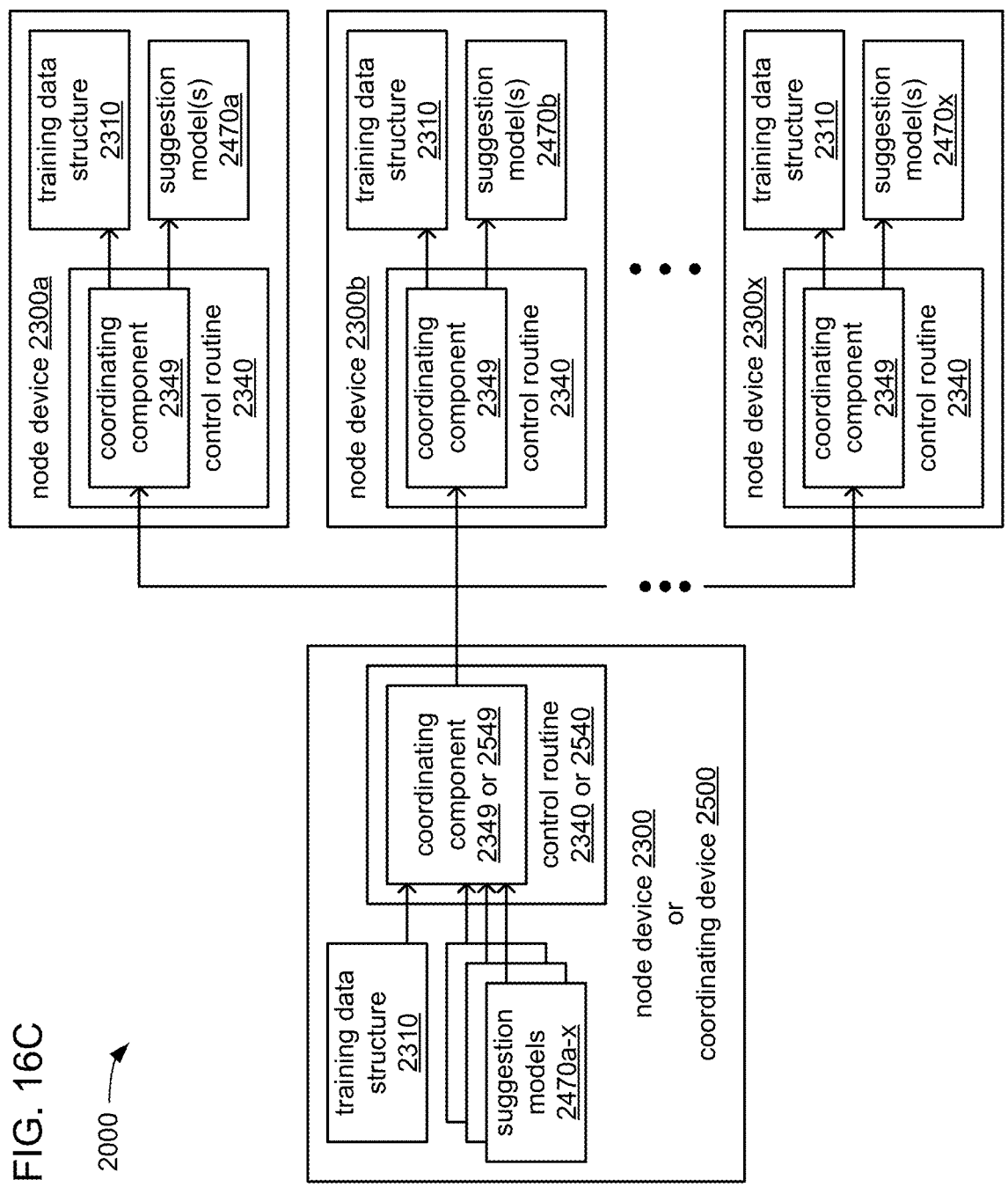
Figure 16D:
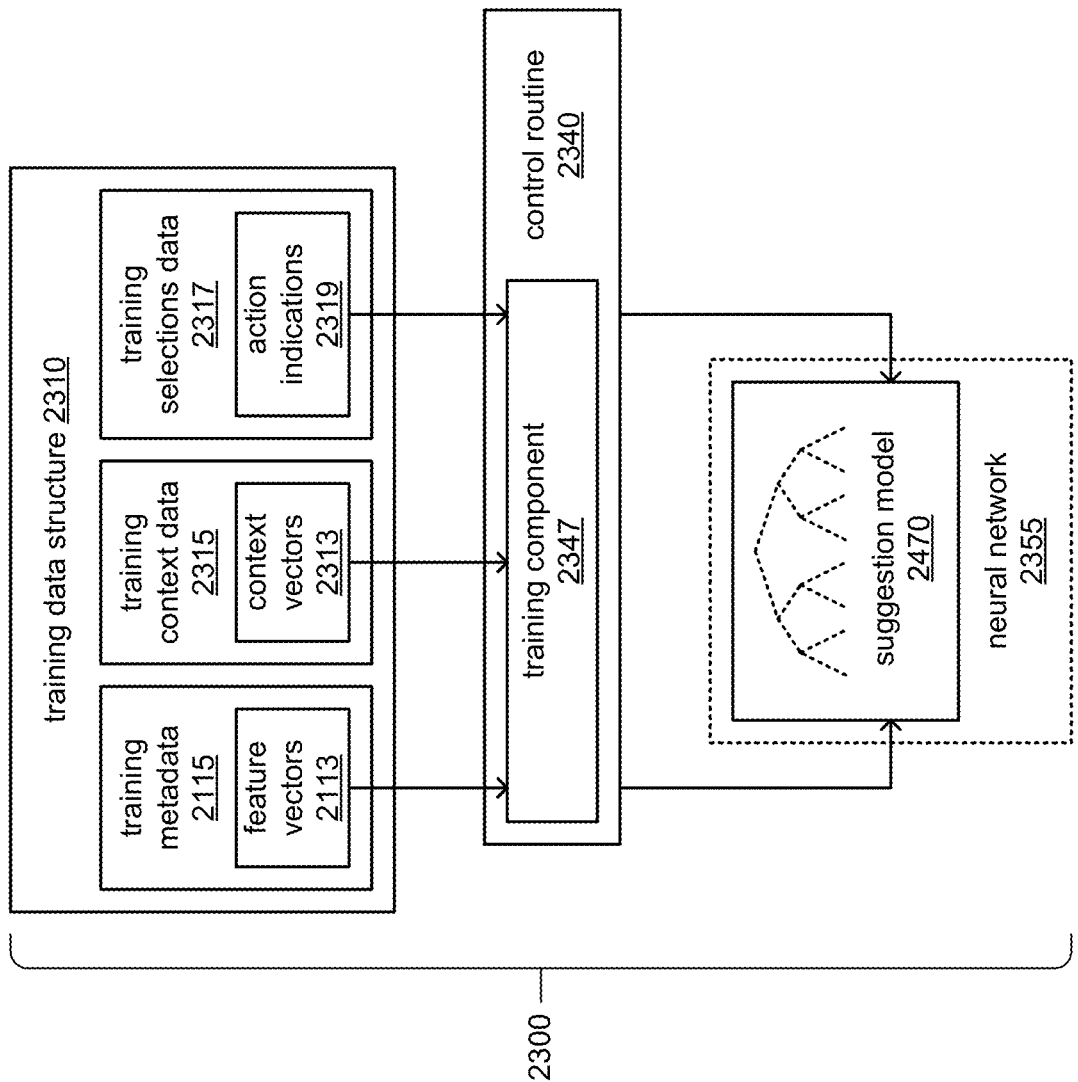

FIGS. 16A, 16B, 16C and 16D, together and in greater detail, illustrate an example of an embodiment of performing an initial preparation of the distributed processing system 2000 for use, including an initial training of a set of suggestion models 2470 thereof. FIG. 16A illustrates aspects of the reception and distribution of the initialization data 2933 to provide the devices 2100, 2300 and/or 2500 of the system 2000 with various items required to at least begin preparation of the system 2000 for normal operation. FIG. 16B illustrates aspects of an embodiment of the training data structure 2310 employed in training the set of suggestion models 2470. FIGS. 16C-D, together, illustrate aspects of performing the training of the set of suggestion models 2470.

Turning more specifically to FIGS. 16A-B, the distributed processing system 2000 may be provided with the initialization data 2933 as part of preparing the distributed processing system 2000 to generate suggestions of data preparation operations to perform on a data set 2130. As depicted, the initialization data 2933 may include a set of the feature routines 2240, a set of feature vectors 2113 that form the training metadata 2115, a set of context vectors 2313 that form the training context data 2315, a set of action indications 2319 that form the training selections data 2317, and/or a set of the suggestion models 2470. As also depicted, the initialization data 2933 may also include multiple training data sets 2110. As further depicted, while the feature routines 2240, the feature vectors 2113, the context vectors 2313, the action indicators 2319 and/or the suggestion models 2470 included within the initialization data 2933 may be provided to, and accordingly stored by, the coordinating device 2500 (or a node device 2300 performing the functions of the coordinating device 2500), the training data sets 2110 that may also be included within the initialization data 2933 may be provided to, and accordingly stored by, the one or more storage devices 2100.

Each feature routine 2240 corresponds to a particular feature from among a pre-selected set of features that each data set 2130 or each training data set 2110 may have. In some embodiments, each feature routine 2240 may include a set of instructions executable by the processor 2350 within at least one of the node devices 2300 to analyze a data set portion 2131 or a training data set portion 2111 (at least partially in parallel with others of the node devices 2300) to detect the corresponding feature. It should be noted that, in embodiments of the distributed processing system in which the processors 2350 of different ones of the node devices 2300 are of different types that support differing instruction sets, there may be more than one version of each feature routine 2240 that corresponds to a particular feature to enable the detection of that particular feature within any of the node devices 2300, regardless of the type of the processor 2350.

Each feature vector 2113 of the training metadata 2115 corresponds to a particular training data set 2110 of the multiple training data sets 2110 that may be stored by the one or more storage devices 2100. As will be explained in greater detail, similar feature vectors 2133 of the metadata 2135 correspond to the data sets 2130 that may be stored by the one or more storage devices 2100. Each feature vector 2113 includes a set of feature indicators 2114 that correspond to a set of pre-selected features. In some embodiments, each of the feature indicators 2114 of a feature vector 2113 may simply indicate whether the corresponding training data set 2110 has the corresponding feature. In other embodiments, one or more of the feature indicators 2114 may provide an indication of degree of the corresponding feature, or may provide an indication of a type or category associated with the feature that may be selected from a predefined set. As will be explained in greater detail, the feature indicators 2114 of each feature vector 2113 may be given their values by the set of feature routines 2240 as a result of the set of feature routines 2240 having been executed to analyze the corresponding data set 2110 to detect the presence, absence and/or degree of each feature of the set of features therein.

The features that are sought to be detected through the execution of the set of feature routines 2240, and for which indications may be included within feature vectors 2113 and 2133, may include any of wide variety of features, including and not limited to, structural features of a data set 2130 or training data set 2110, features of the indexing scheme by which data values are able to be located, and/or features of the data values, themselves. Thus, by way of example, the features to be so detected may include, and are not limited to, punctuation types, delimiter types, region-specific formats, industry-specific formats, use of data containerization and/or access control, use of data compression and/or encryption, data types of the data values, languages included, scripting and/or programming languages included, arithmetic and/or logical operators, indexing type, index labels, current index ranges, data set size, date/time and/or indication of author and/or owner. Where data values include numeric values, the features to be so detected may also include various statistical values, including and not limited to, maximums, minimums, mean and/or median.

Each context vector 2313 of the training context data 2315 may also correspond to a particular training data set of the multiple training data sets 2110 that may be stored by the one or more storage devices 2100. In a manner similar to the aforedescribed feature vectors 2113, similar context vectors 2333 of the context data 2335 correspond to the data sets 2130 that may be stored by the one or more storage devices 2100. Each context vector 2313 includes a set of context indicators 2314 that correspond to a set of pre-selected contextual aspects. In a manner similar to the aforedescribed feature indicators 2114, in some embodiments, each of the context indicators 2314 of a context vector 2313 may simply indicate whether the corresponding contextual aspect applies to the corresponding training data set 2110. In other embodiments, one or more of the context indicators 2314 may provide an indication of degree of the corresponding contextual aspect, or may provide an indication of a type or category associated with the contextual aspect that may be selected from a predefined set.

It should be noted that, unlike the contextual aspects indicated in context vectors 2333 for data sets 2130, at least some of the contextual aspects indicated in the context vectors 2313 for the set of training data sets 2110 are necessarily fictitious. This arises from the fact that the training data sets 2110, unlike the data sets 2130, may exist solely for the purpose of training suggestion models 2470, and not for such other purposes as serving as inputs to further analyses or as bases of presentations such that any data preparation operations actually need to be performed on any of the training data sets 2110. Stated differently, each of the data sets 2130 contain actual data values that were generated in some manner, at some source, at some time and location, and for some purpose that gives it a context for its creation. Further, each of the data sets 2130 may have been revised one or more times under any of a variety of conditions each time, may have been stored at one or more locations over time, and has been and/or is subject to various legal rights belonging to one or more persons and/or legal entities that gives it a historical context. Still further, each of the data sets 2130 may have been stored within the one or more storage devices 2100 as a result of having been requested by a user of (e.g., a user of the viewing device 2700) for use as an input to a further analysis desired by that user and/or to be presented to that user, thereby adding to its current context.

In contrast, a training data set 2110 generated solely to exhibit a particular desired combination of features for purposes of efficiently training suggestion models 2470 will not have any such history associated with its generation, subsequent handling or current intended use such that it cannot be said to have a context that in any way resembles that of a data set 2130. Even where, as will be explained in greater detail, a data set 2130 is added to the set of training data sets 2110 such that it becomes a training data set 2110 that happens to have the history of a data set 2130, the fact of its addition to the set of training data sets 2110 necessarily changes its current context. It is for this reason that, for each training data set 2110, regardless of its origins, at least some of the contextual aspects indicated in its corresponding context vector 2313 are selected to provide a fictitious simulation of a context of a data set 2130.

Each suggestion model 2470 corresponds to a different particular data preparation operation that may be performed on a data set 2130 from among a set of data preparation operations. Also, each suggestion model 2470 is trainable to make a determination of whether to suggest that its corresponding data preparation operation be performed on a data set 2130 based on features and contextual aspects of that data set 2130 to. In various embodiments, each suggestion model 2470 may be any of a variety of types of model that is amenable for use in machine learning environments, including any of a variety of types of decision tree. In embodiments of the distributed processing system 2000 in which at least a subset of the node devices 2300 incorporate the neural network 2355, the suggestion models 2470 may be selected to be of a type that supports implementation using the neural network 2355. Regardless of whether neural networks are used, in embodiments in which at least one of the suggestion models 2470 is a decision tree, the type of decision tree may be a contextual bandit decision tree that is selected to enable a pre-selected balance to be achieved between exploitation of past successes in determining whether the performance of the corresponding data preparation operation is to be suggested, and exploration of occasions on which to test making an opposite determination from the one that would be made based on exploitation in support of further machine learning.

Turning more specifically to FIG. 16B, as depicted, in some embodiments, the training data structure 2310 may have a structure akin to a two-dimensional array in which pairs of one each of the feature vectors 2113 and the context vectors 2313 may be organized into a set of rows that each correspond to one of the training data sets 2110 that may be stored within the one or more storage devices 2100. Further, the action indications 2319 may be organized into columns that each correspond to one of the data preparation actions of the set of data preparation actions that may be performed on a data set 2130, and accordingly also to the corresponding suggestion model 2470. Within each such column, each action indication 2319 occupies one of the rows and serves to indicate whether the correct response of the corresponding suggestion model 2470 to the particular combination of feature vector 2113 and context vector 2313 within that row is a determination that the corresponding data preparation operation is to be suggested, or that the corresponding data preparation operation is NOT to be suggested. Stated differently, within each of the depicted columns of action indications 2319, the individual action indications 2319 specify the expected output of the corresponding suggestion model 2470 in response to the input combination of feature vector 2113 and context vector 2313 within the corresponding row.

It should be noted that such a specific depiction of such a two-dimensional array structure is merely an example of one approach that may be taken to establish relationships between inputs and outputs of suggestion models 2470 within the training data structure 2310. Other embodiments are possible in which the training data structure may be of an entirely different structure in which an entirely different mechanism to associate inputs and outputs may be used. Similarly, it should be noted that other embodiments are possible in which the feature vectors 2113 and the context vectors 2313 need not be vector data structures (or any other form of one-dimensional array) as has been depicted and discussed, and instead, could each be implemented as any of a variety of other data structures.

Turning more specifically to FIG. 16C, as depicted, the control routine 2540 of the coordinating device 2500 may include a coordinating component 2549, and/or the control routine 2340 of each of the node devices 2300 may include a coordinating component 2349. In embodiments that include the coordinating device 2500, the coordinating component 2549 may be operable on the processor 2500, and each of the instances of the coordinating routine 2349 may be operable on their respective processors 2300, to coordinate through the network 2999 to transmit the training data structure 2310 from the coordinating device 2500 to each of the node devices 2300 of the set of node devices 2300. Alternatively, in embodiments in which a node device 2300 performs the functions of the coordinating device 2500, the coordinating component 2349 thereof may, in place of the coordinating component 2549, coordinate with its counterparts in other node devices 2300 to transmit the training data structure 2310 to each of those other node devices 2300 of the set of node devices 2300.

A similar coordination may also be employed to distribute the set of suggestion models 2470 among the set of node devices 2300 such that each node device 2300 of the set of node devices 2300 is provided with one or more different ones of the suggestion models 2470. In FIG. 16C, an example set of suggestion models 2470 has been designated as 2470a through 2470x, and is depicted as having been distributed to corresponding ones of an example set of node devices 2300 that has been designated 2300a through 2300x. It should be noted that this is a very simplistic example of the distribution of a set of suggestion models 2470 provided for the purpose of making clear that the distribution of a set of suggestion models 2470 does not entail transmitting the entire set to each node device 2300 of a set of node devices. It is envisioned that, in actual implementation, there may be such a large quantity of suggestion models 2470 within the set of suggestion models 2470 compared to the quantity of node devices 2300 within the set of node devices 2300 that a distribution thereof may result in each such node device being provided with a different subset of the set of suggestion models 2470, rather than different individual suggestion model 2470 as depicted in the simplistic example of FIG. 16C.

Referring briefly back to FIG. 16B, as well as to FIG. 16C, it should be noted that, despite the depiction and discussion herein of the entire training data structure 2310 being transmitted to each node device 2300 of the set of node devices 2300, other embodiments are possible in which differing portions of the training data structure 2310 may be transmitted to each node device 2300. More specifically, it may be that each node device 2300 of the set of node devices 2300 is provided with a portion of the training data structure 2310 that, instead of including all of the action indications 2319 within all of the columns corresponding to the entire set of suggestion models 2470, includes a subset of those columns that correspond to the one or more suggestion models 2470 that have been distributed to that node device 2300.

Turning more specifically to FIG. 16D, as depicted, within each node device 2300 of the set of node devices 2300, the control routine 2340 may include a training component 2347 operable on the processor 2300 to employ the training data structure 2310 (or the particular subset of the training data structure 2310 received by the node device 2300) to train each of the one or more suggestion model 2470 received by the node device 2300. More precisely, as previously discussed, each suggestion model 2470 is trained to make a determination of whether to suggest the performance of a corresponding data preparation operation on a particular data set 2130 based on the features and contextual aspects of that particular data set 2130. As previously discussed, each of the suggestion models 2470 may be any of a variety of types of model, and so the exact manner in which each suggestion model 2470 may be trained may vary accordingly.

As also previously discussed, in embodiments in which at least a subset of the node devices 2300 of the node device grid 2003 incorporate the neural network 2355 for use in implementing at least a subset of the suggestion models 2470, such training may be performed through a backpropagation or other appropriate technique for the training of neural networks. In such embodiments, such suggestion models 2470 may include configuration data that specifies one or more of 1) the overall quantity and organization of neurons into layer(s); 2) the mapping of indications of particular features and/or indications of particular contextual aspects to neuron inputs of an input layer; 3) the connections among neurons within and/or between layers; 4) the mapping of the indication(s) of the determination of whether to suggest a data preparation operation is mapped to neuron output(s) of an output layer; 5) aspects of the triggering function by which each neuron is triggered by its input(s) to provide particular output(s); and 6) the weights and/or biases used for inputs, outputs and/or the triggering functions of the neurons. It may be that parts of such configuration data define the quantity of neurons used, their organization into layers, the mappings of inputs and/or outputs, the connections thereamong, the triggering functions, and/or an initial set of weights and/or biases may serve to define the type of model for a suggestion model 2470, while the process of being trained and/or subsequently re-trained may serve to adjust at least a subset of the weights and/or biases.

Referring briefly back to FIG. 16C, as well as to FIG. 16D, the coordinating device 2500 (or a node device 2300 performing the functions of the coordinating device 2500) may coordinate the training of the suggestion models 2470 by each of the node devices 2300 of the set of node devices 2300 to occur at least partially in parallel. More precisely, the coordinating component 2549 of the coordinating device 2500 and each of the instances of the coordinating component 2349 of each of the node devices 2300 may enable the processor 2550 to control and/or monitor the training of each of the suggestion models 2470. As each suggestion model 2470 is trained, the processor 2550 may, through the coordinating components 2549 and 2349, coordinate the transmission of each of the now trained suggestion models 2470 back to the coordinating device 2500 to be stored for use with data sets 2130, as will shortly be described in greater detail. Alternatively or additionally, as each suggestion model 2470 is trained, each of the node devices 2300 of the set of node devices 2300 may locally store the one or more suggestion models 2470 provided to it for training to obviate the need to again distribute the set of suggestion models 2470 as part of the set of node devices 2300 subsequently using the set of suggestion models 2470.

Figure 17A:
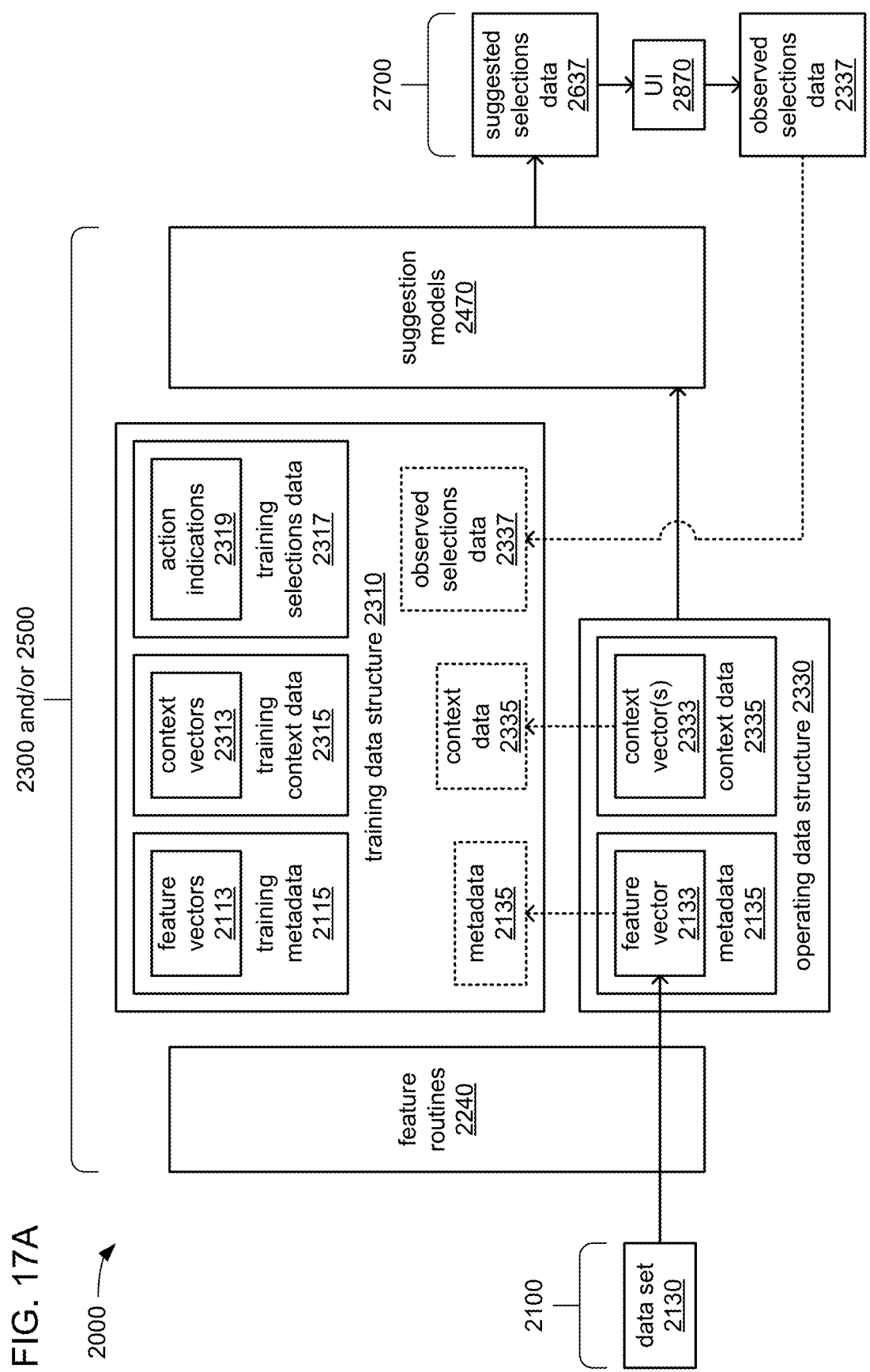
FIGS. 17A, 17B, 17C, 17D, 17E and 17F, together, illustrate a more detailed example embodiment of feature detection and suggestion of data preparation operations.
Figure 17B:
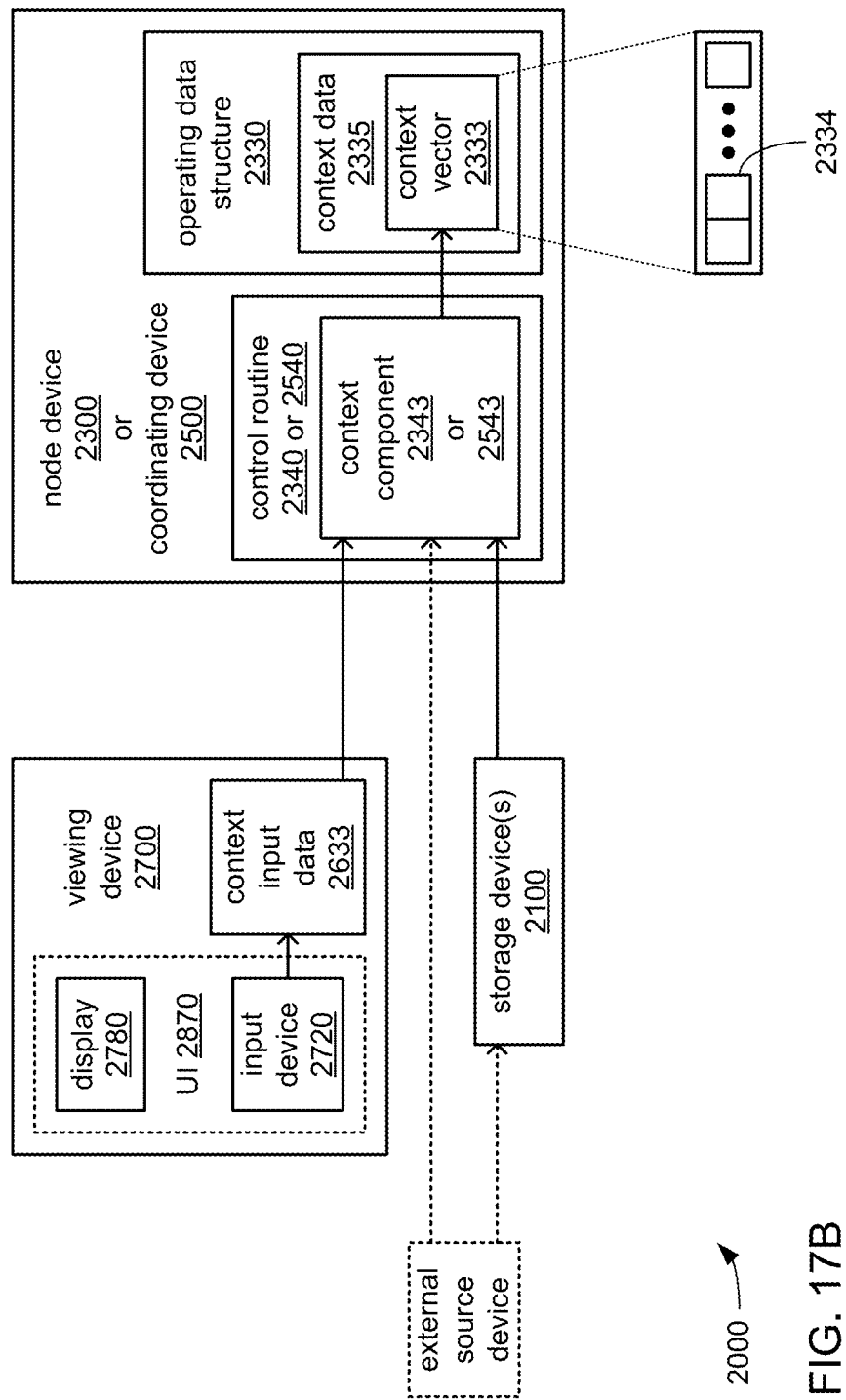
Figure 17C:
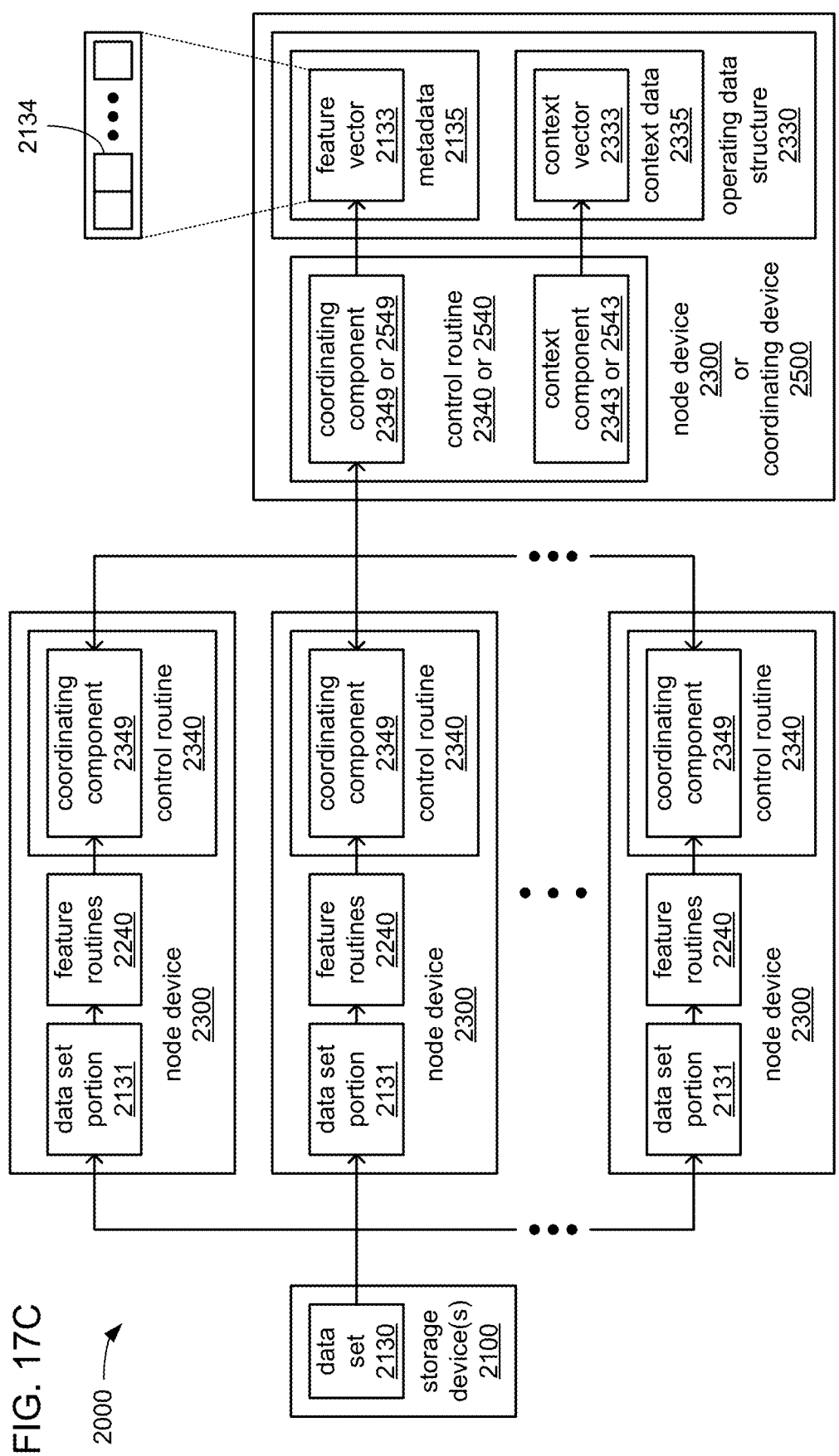
Figure 17D:
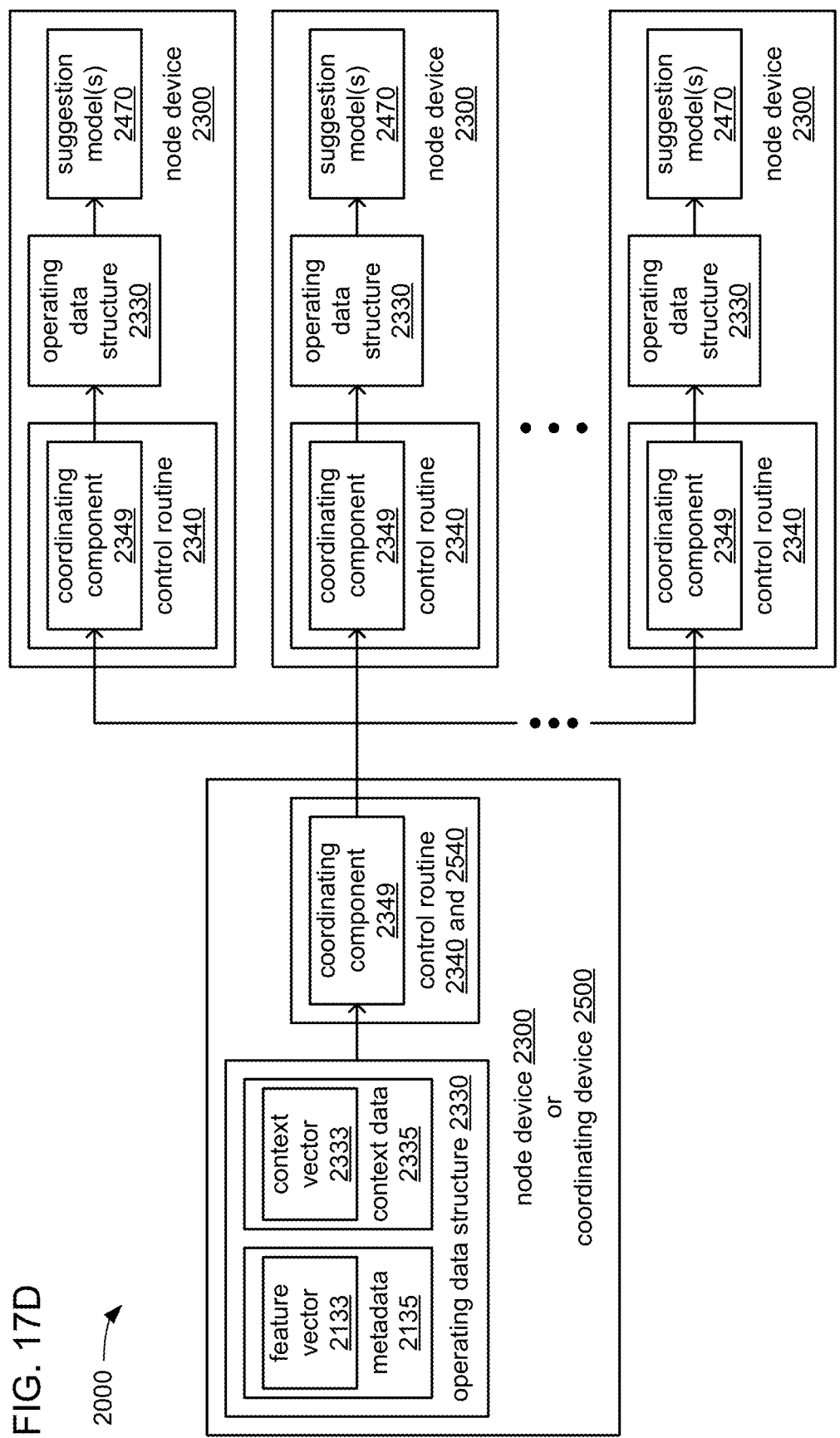
Figure 17E:
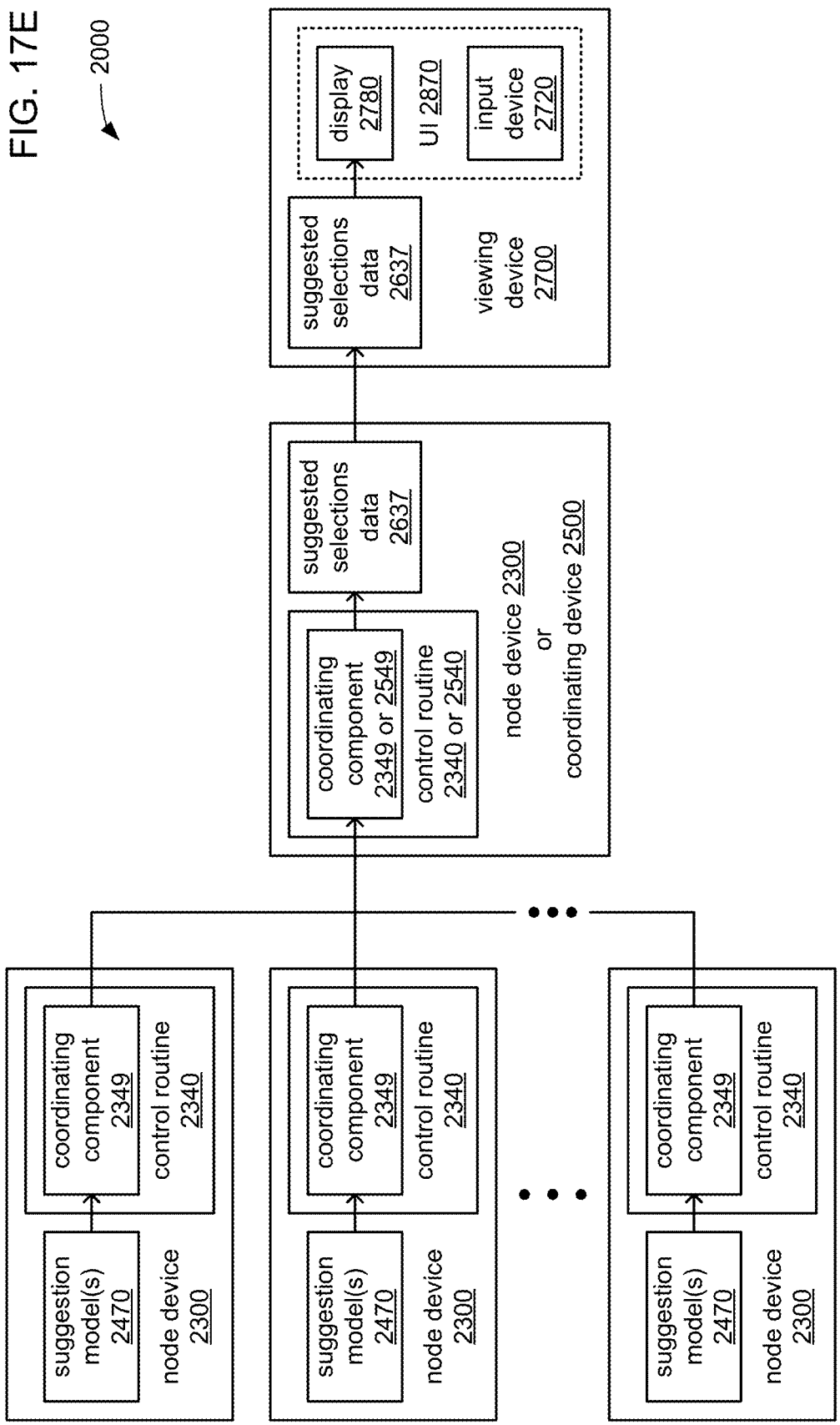
Figure 17F:
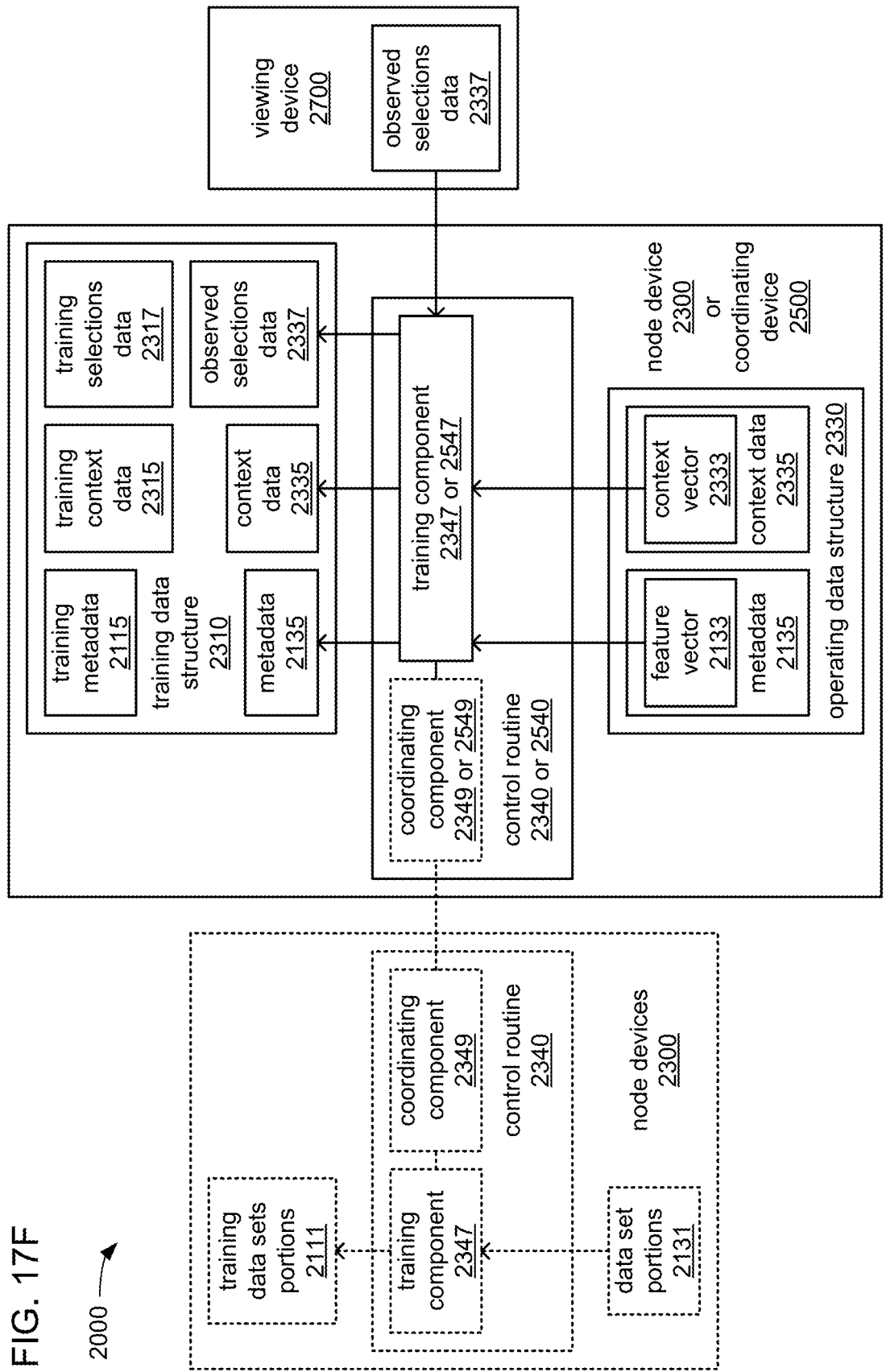

FIGS. 17A, 17B, 17C, 17D, 17E and 17F, together and in greater detail, illustrate an example of an embodiment of performing feature detection, determining what data preparation operation to suggest be performed and selectively updating the training data structure 2310 for subsequent re-training of suggestion models 2470. FIG. 17A illustrates aspects of the provision, exchange and use of various pieces of data in performing these operations. FIG. 17B illustrates aspects of an embodiment of receiving at least some contextual aspects of a data set 2130. FIG. 17C illustrates aspects of an embodiment of performing feature detection to detect features of the data set 2130. FIGS. 17D-E, together, illustrate aspects of an embodiment of determining which data preparation operations to suggest be performed on the data set 2130. FIG. 17F illustrates aspects of selectively augmenting the training data structure 2310 with indications of what data preparation operations were actually selected to be performed correlated to indications of the detected features and various contextual aspects in preparation for subsequent re-training.

Turning to FIGS. 17A-B, as depicted, the control routine 2540 of the coordinating device 2500 may include a context component 2543 operative on the processor 2500 (or the control routine 2340 of a node device performing the functions of the coordinating device 2500 may include a context component 2343 operative on the processor 2300 thereof) to either generate a context vector 2333 of the context data 2335 within the operating data structure 2330, or select a context vector 2333 for inclusion in the context data 2335 within the operating data structure 2330, based on received pieces of information about the context of a data set 2130. This may be among the operations that are triggered by the coordinating device 2500 (or a node device 2300 performing the functions of the coordinating device 2500) being made aware of the availability of the data set 2130 in any of a variety of ways. In some embodiments, the one or more storage devices 2100 may transmit an indication of a data set 2130 having become available to the coordinating device 2500. Alternatively or additionally, the coordinating device 2500 may be made aware of the availability of a data set 2130 as a result of receiving a request for access thereto from the viewing device 2700.

It may be that the distributed processing system 2000 is operated by any of a wide variety of commercial, academic and/or governmental entities to perform data preparation operations and/or still other operations on numerous relatively large data sets 2130, and the one or more storage devices 2100 may be employed to store a built-up queue of data set 2130 that are to each be put through various data preparation operations before then being put through any of a variety of data analysis operations and/or being used as a basis for the generation of any of a variety of presentations of information. As previously discussed, in some embodiments, the one or more storage devices 2100 may receive a data set 2130 in completed form from a source (not shown) that is external to the system 2000, thereby triggering the transmission of the indication of availability of the data set 2130 to the coordinating device 2500. In other embodiments, the one or more storage devices 2100 may receive portions of a data set 2100 over time from one or more external devices (e.g., an array of sensor devices, etc.), and may assemble the data set 2100 from those received portions until the last portions are so received and the data set is complete, which may then trigger the transmission of the indication of availability of the data set 2130 to the coordinating device 2500.

Regardless of the exact manner in which the one or more storage devices 2100 receive a data set 2130, the process of receiving the data set 2130 may enable various pieces contextual information to be received with it. By way of example, where the data set 2130 is received in completed form from an external source, the data set 2130 may be conveyed to the one or more storage devices 2100 as a data file or any of a variety of other types of data container structure that includes a file header or other descriptive data structure. Such a header or other descriptive data structure may include indications of the identity of the source of the data set 2130 and/or the data values within it; aspects of the when, why, how and/or where of the generation of the data set 2130; what industry standard(s) and/or version levels thereof for formatting, compression and/or encryption may be applicable to the data set 2130; etc. By way of another example, where the data set 2130 is received in portions over time and for assembly by the one or more storage devices 2100, the one or more storage devices 2100 may already be provided with various pieces of contextual information concerning the source(s) of those portions as part of facilitating the establishment of communications to support the receipt of those portions. Such arrangements may entail one or more agreements and/or the establishment of one or more accounts with various pieces of account information; one or more pre-defined network addresses that may be polled by the one or more storage devices 2100 on a recurring basis; descriptive information of the one or more external devices from which the portions are received over time; etc.

It may be that the distributed processing system 2000 is operated by any of a wide variety of commercial, academic and/or governmental entities as a distributed library system by which various individuals of that entity may operate viewing devices, such as the viewing device 2700, to request access to any of a wide variety of data sets 2130 that may be maintained by any of a wide variety of other entities serving as sources with which various licensing and/or other content access arrangements may have been made. Thus, a user of the viewing device 2700 may employ a user interface 2870 provided thereby to enter a request that is relayed to the coordinating device 2500 to access a particular data set 2130. In response to receiving the request, the coordinating device 2500 may, in turn, relay the request to one or more devices external to the system 2000 that are associated with such licensing and/or other content access arrangements. Upon receiving the requested data set 2130, the coordinating device 2500 may directly store it within the one or more storage devices 2100 or may in arrange for it to be provided to the one or more storage devices 2100.

Regardless of the exact manner in which the one or more storage devices 2100 are provided with the requested data set 2130, various pieces contextual information may be received by the coordinating device from both the viewing device 2700 and the external device(s) that may provide the data set 2130. By way of example, as part of making the request to access the data set 2130, the user of the viewing device 2700 may provide any of a variety of differing pieces of contextual information about the data set 2130 that may be used to search for and identify it. Such information may include indications of the identity of the source of the data set 2130 and/or the data values within it; aspects of the when, why, how and/or where of the generation of the data set 2130; etc. Additionally, as part of receiving the data set 2130 from the external source(s), the coordinating device may also receive further pieces of contextual information about it. Again, this may arise from the data set 2130 being received as a data file or any of a variety of other types of data container structure that includes a file header or other descriptive data structure.

As depicted, and similar to what has been depicted and described for the training context data 2315, each of the context vectors 2333 of the context data 2335 may take the form of a vector data structure (e.g., a one-dimensional array) with a set of storage locations allocated for a set of context indicators 2334. Indeed, in some embodiments, the context vectors 2333 of the training context data 2335 may be of identical size and configuration to the context vectors 2313 of the training context data 2315, and may have the same number and arrangement of context indicators 2334 and 2314, respectively, that are indicative of the same contextual aspects. Similar to the context indicators 2314 of the context vectors 2313, in some embodiments, the context indicators 2334 of the context vectors 2333 may simply indicate whether the corresponding contextual aspect applies to the data set 2130. In other embodiments, one or more of the context indicators 2334 may provide an indication of degree of the corresponding contextual aspect, or may provide an indication of a type or category associated with the contextual aspect.

In some embodiments, the context component 2543 may generate the context vector 2333 that corresponds to the data set 2130 from the pieces of context information received from whichever one(s) of the viewing device 2700, from the external source device and/or from the one or more storage devices 2100 have provided contextual information. In other embodiments, the context component 2543 may use one or more of such received pieces of context information to select the context vector 2333 that corresponds to the data set 2130 from among multiple available context vectors 2333 (not shown). By way of example, it may be that the user of the viewing device 2700 is required to login to an account assigned to that use on the viewing device 2700, and that account may associate that user with such user-related contextual aspects as a country or region, industry or field of study, language and/or type of communications capability (e.g., whether the user is able to hear or is deaf), access privileges regarding data sets 2130 and/or specific varieties of data values therein, etc. Thus, the receipt of an indication of the identity of the user may trigger the selection of a context vector 2333 that specifies such contextual aspects of the user that then also become contextual aspects of the data set 2130 that the user may request access to.

The contextual aspects of the data set 2130 that are included in the context vector 2333 may include any of a variety of aspects, including and not limited to, aspects of when and how the data set 2130 was generated, aspects of the source of the data set 2130 and/or the data therein, aspects of legal and/or other rights associated with the data set 2130 and/or the data therein, etc. Thus, by way of example, the contextual aspects may include, and are not limited to, the when, where, how, why and/or by who the data set 2130 and/or the data 2130 therein was generated; where the data set 2130 is and/or has been stored; history of revisions to the data set 2130; owners, creators, licensees, licensors, custodians, etc. of the data set 2130; and/or copyrights, licensing terms, publication conditions, access restrictions, etc. of the data.

Regardless of the exact manner in which the context vector 2333 associated with the data set 2130 may be generated and/or selected, the coordinating device may additionally use such received contextual information to assign a higher or lower priority to the data set 2130 versus other data sets 2130 such that the order in which the performance of data preparation operations may be performed on data sets 2130 in a queue may be changed. By way of example, the identity of the source of the data set 2130 and/or of the user may cause the data set 2130 to be assigned a high enough priority as to become the next data set 2130 on which data preparation operations are to be performed despite a lengthy queue of other data sets 2130 having been available for longer periods of time. Alternatively or additionally, the coordinating device may use such information concerning the feature of size of the data set 2130, along with recurringly received indications of which node devices 2300 of the distributed processing system 2000 are available to determine how many node devices 2300 of the distributed processing system 2000, as well as which ones, to include in the set of node devices 2300.

Turning to FIG. 17C, the generation of a feature vector 2134 of the metadata 2135 within the operating data structure 2330 for the data set 2130 may be triggered along with the aforedescribed generation and/or selection of the corresponding context vector 2334. Through the coordinating components 2349 and 2549 and the network 2999, the coordinating device 2500 may communicate with each of the node devices 2300 of the set of node devices 2300 to divide the data set 2130 into data set portions 2131 and to distribute those data set portions 2131 among the set of node devices 2300. In some embodiments, the data set 2130 may be divided into data set portions 2131 of equal (or nearly equal) size as part of distributing the processing and storage requirements of the data set 2130 among the set of node devices 2300 relatively equally. The coordinating device 2500 may transmit, to each node device 2300 of the set of node devices 2300, a pointer or other indication as to the storage location(s) within one or more storage devices 2100 at which the data set portion 2131 assigned to it may be retrieved. In other embodiments, the coordinating device 2500 may, itself, retrieve each data set portion 2131 from one or more storage devices 2100 and relay each to the node device 2300 to data set portion 2131 has been assigned.

With the data set portions 2131 of the data set 2130 distributed among the set of node devices 2300, the coordinating device 2500 may transmit a set of feature routines 2240 to each node device 2300 of the set of node devices 2300. Each feature routine 2240 corresponds to a particular feature that the data set 2130 may have, and each feature routine 2240 may include a set of instructions executable by the processor 2350 within a node device 2300 to analyze a corresponding one of the data set portions 2131 to detect the corresponding feature. Each of the node devices 2300 of the set of node devices 2300 may execute each of the feature routines 2240 of the set of feature routines 2240 to determine whether any of the features detectable through the execution thereof are present within the data set portion assigned to that node device 2300. The coordinating device 2500 may coordinate such execution of the set of feature routines 2240 by each node device 2300 of the set of node devices 2300 to occur at least partially in parallel. As such execution of the feature routines 2240 by the set of node devices occurs, each of the node devices 2300 of the set of node devices 2300 may transmit indications of detected features to the coordinating device 2500 via the network 2999.

The features sought to be detected through the execution of the set of feature routines 2240 may include any of wide variety of features, including and not limited to, structural features of the data set 2130, features of the indexing scheme by which data values of the data set 2130 are able to be located, and/or features of the data values, themselves. Thus, by way of example, the features to be so detected may include, and are not limited to, punctuation types, delimiter types, region-specific formats, industry-specific formats, use of data containerization and/or access control, use of data compression and/or encryption, data types of the data values, languages included, scripting and/or programming languages included, arithmetic and/or logical operators, indexing type, index labels, current index ranges, data set size, date/time and/or indication of author and/or owner. Where data values of the data set 2130 include numeric values, the features to be so detected may also include various statistical values, including and not limited to, maximums, minimums, mean and/or median.

As previously discussed, in some embodiments, the coordinating device 2500 may cooperate with the set of node devices 2300 through the network 2999 to exchange at least a subset of the indications of detected features among the node devices 2300 within the set of node devices 2300, and may do so in a manner similar to what is disclosed in the previously mentioned U.S. Pat. No. 9,753,767 issued Sep. 5, 2017. Again, as discussed therein, the detection of one or more features of the data set 2130 may be assisted by, guided by and/or triggered by whether one or more other features of the data set 2130 have been detected.

Regardless of the exact manner in which feature detection is performed, the coordinating device 2500 may generate the feature vector 2134 for the data set 2130 based on the indications of detected features received from the set of node devices 2300. As depicted, and similar to what has been depicted and described for the training metadata 2115, each of the feature vectors 2133 of the metadata 2135 may take the form of a vector data structure (e.g., a one-dimensional array) with a set of storage locations allocated for a set of context indicators 2134. Indeed, in some embodiments, the feature vectors 2133 of the metadata 2135 may be of identical size and configuration to the feature vectors 2113 of the training metadata 2115, and may have the same number and arrangement of feature indicators 2134 and 2114, respectively, that are indicative of the same features. Similar to the feature indicators 2114 of the feature vectors 2113, in some embodiments, the feature indicators 2134 of the feature vectors 2133 may simply indicate whether the corresponding features are found to be present in the data set 2130. In other embodiments, one or more of the feature indicators 2134 may provide an indication of degree of the corresponding feature, or may provide an indication of a type or category associated with the feature.

Turning to FIGS. 17D-E, with the feature vector 2133 and the context vector 2333 corresponding to the data set 2130 having been generated, the coordinating device 2500 may transmit both (e.g., within the operating data structure 2330, as depicted) to each node device 2300 of the set of node devices 2300. The coordinating device 2500 may also distribute a set of suggestion models 2470 among the set of node devices 2300, with each node device 2300 receiving one or more different suggestion models 2470 from the other node devices 2300. Each suggestion model 2470 corresponds to a different particular data preparation operation that may be performed on the data set 2130 from among a set of data preparation operations. Each suggestion model 2470 may be any of a variety of type of machine learning model, and each may have been previously trained to determine whether to suggest that its corresponding data preparation operation be performed on a data set 2130 based on detected features and contextual aspects thereof. In some embodiments, at least one of the suggestion models may be a contextual bandit decision tree selected to achieve a pre-selected balance between exploitation of past successes in determining whether the performance of the corresponding data preparation operation is to be suggested, and exploration of occasions on which to test making an opposite determination from the one that would be made based on exploitation in support of further machine learning.

With the feature vector 2133 and the context vector 2333 transmitted to each of the node devices 2300 of the set of node devices 2300, and with the set of suggestion models 2470 distributed among the node devices 2300, each of the node devices 2300 may employ the feature vector 2133 and the context vector 2333 as inputs to each of the one or more suggestion models 2470 distributed to it to derive a separate determination from each suggestion model 2470 of whether its corresponding data preparation operation is to be suggested to be performed on the data set 2130. The coordinating device 2500 may coordinate such uses of the set of suggestion models 2470 by the set of node devices 2300 to occur at least partially in parallel. As such determinations are made, each of the node devices 2300 of the set of node devices 2300 may provide indications of such determinations to the coordinating device 2470.

The data preparation operations may include any of a variety of types of operations, including and not limited to: data value and/or format normalizations; data transformations; data filtering, stripping and/or masking; and/or data various data analyses in support of the generation of various graphical presentations. Such operations may serve to change data values, the selection of data values, the format of data values, the arrangement of data values within a data set, the structure of a data set, the indexing scheme of a data set, etc. Alternatively or additionally, such operations may serve to remove data values for reasons of data security and/or to comply with data privacy (e.g., legally mandated personal medical data privacy restrictions), intellectual property protections (e.g., copyright), licensing terms, etc. Any of such operations may be performed to cause a data set and/or the data values thereof to fit what is needed for different geographic regions, different legal jurisdictions, different languages, different industries, different scientific fields, different entities (e.g., convert among corporate, academic and/or governmental entities), etc.

Based on the indications received by the coordinating device 2500 of which data preparation operations are to be suggested to be performed on the data set 2130, the coordinating device 2470 may generate the suggested selections data 2637 to indicate the subset of data preparation operations that are to be suggested to be so performed. The coordinating device 2500 may then transmit the suggested selections data 2637 to the viewing device 2700 to enable the presentation of the suggested subset to the user thereof via the UI 2870 thereof. In some embodiments, the UI 2870 may be operable to enable the user of the viewing device 2700 to view (or otherwise inspect) portions and/or various aspects of the data set 2130 manually to determine whether the user agrees with the suggested subset indicated by the suggested selections data 2637. Via the UI 2870, the user may provide input indicating that the suggested subset is selected to be the subset of data preparation operations that are to be performed on the data set, or that a different subset of the set of data preparation operations is being manually selected to be so performed.

Turning to FIG. 17F, as depicted, the viewing device 2700 may generate and transmit to the coordinating device 2500 (or to a node device 2300 performing the functions of the coordinating device 2500) the observed selections data 2337 to indicate the subset of data preparation operations that have actually been selected by the user of the viewing device 2700 to be performed on the data set 2130. Upon receipt of the observed selections data 2337, the coordinating device may coordinate the performance of the selected subset of data preparation operations on the data set 2130 with the set of node devices 2300. In some embodiments, each node device 2300 of the set of node devices 2300 may have continued to store the data set portion 2131 of the data set 2130 that was distributed to it as part of the aforedescribed detection of features. In such embodiments, and depending on such factors as the amount of time that has elapsed since the aforedescribed detection of features, advantage may be taken of such distribution of the data set 2130 among the set of node devices 2300 by causing the set of node devices 2300 to then perform the selected subset of data preparation operations on the data set portions 2131 in situ.

Also upon receipt of the observed selections data 2337 from the viewing device 2700, the coordinating device 2500 may compare the selected subset to the suggested subset to determine whether there are any differences therebetween. If there are no differences, then the suggested subset may be deemed to represent a set of successful determinations by the full set of suggestion models 2470 of which data preparation operations are to be suggested to the user of the viewing device 2700. In some embodiments, the coordinating device 2500 may maintain a count, a score or other indication for each suggestion model 2470 that reflects the rate of the ability of each suggestion model 2470 to successfully make such determinations. Such an indication of success rate may be updated to reflect each instance of a success and/or lack thereof in making such a determination for each suggestion model 2470, and such an indication may be employed as an input to any subsequent re-training of the set of suggestion models 2470.

However, if there are differences between the suggested subset and the selected subset, then the coordinating device 2500 may add the feature vector 2133, the context vector 2333 and an indication of the selected subset to the training data structure 2310. In some embodiments, such an addition to the training data structure 2310 may always occur where there are differences between the suggested subset and the selected subset. In other embodiments, whether such addition occurs may be at least partially determined by a filtering or other limiting algorithm that may be part of an overall machine learning algorithm. As will be familiar to those skilled in the art, while the use of decision trees and/or similar models as the suggestion models may be deemed relatively effective in making such determinations, decision trees are subject to all too easily learning wrong lessons from occasional bad input. More precisely, there may be instances in which the user of the viewing device 2700 makes one or more errant selections of data preparation operations to be performed or to not be performed. This may arise in the case of an inexperienced user or where the data set 2130 is of a type that the user isn't as experienced in working with. Where one or more of the suggestion models 2470 are implemented as a type of decision tree, those errantly selected or errantly non-selected data preparation operations may be all too easily learned, thereby resulting in future incorrect determinations from one or more of the suggestion models 2470 of whether to suggest the performance of those data preparation operations.

To counter this, in some embodiments, any of a variety of sampling algorithms may be used to control whether the training data structure 2310 is to be augmented with the feature vector 2133, the context vector 2333 and an indication of the selected subset in response to the selected subset differing from the suggested subset. Such use of sampling to limit occasions on which such additions are made may be based on a presumption that, even though there may be occasional mistakes made by a user in specifying a subset of the data preparation operations to be performed on a data set, the user is more likely specify a correct subset on the majority of occasions. Thus, by effectively slowing the rate at which such additions are made to the training data structure 2310, in essence, such use of sampling serves to reduce the likelihood of incorporating such occasional mistakes into future re-training.

Figure 18A:
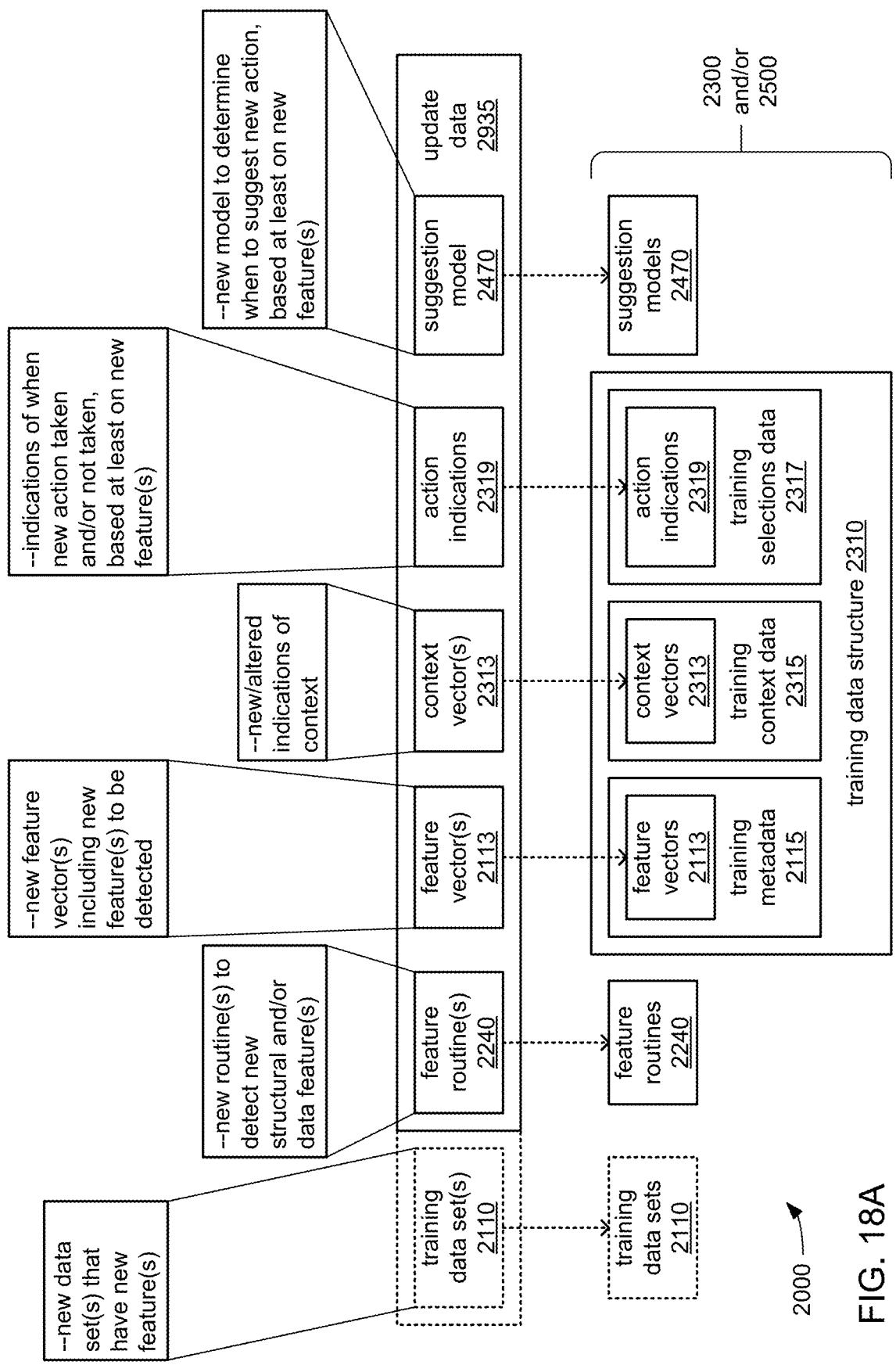
FIGS. 18A and 18B, together, illustrate a more detailed example embodiment of a re-training of a distributed processing system to extend and/or improve functionality.
Figure 18B:
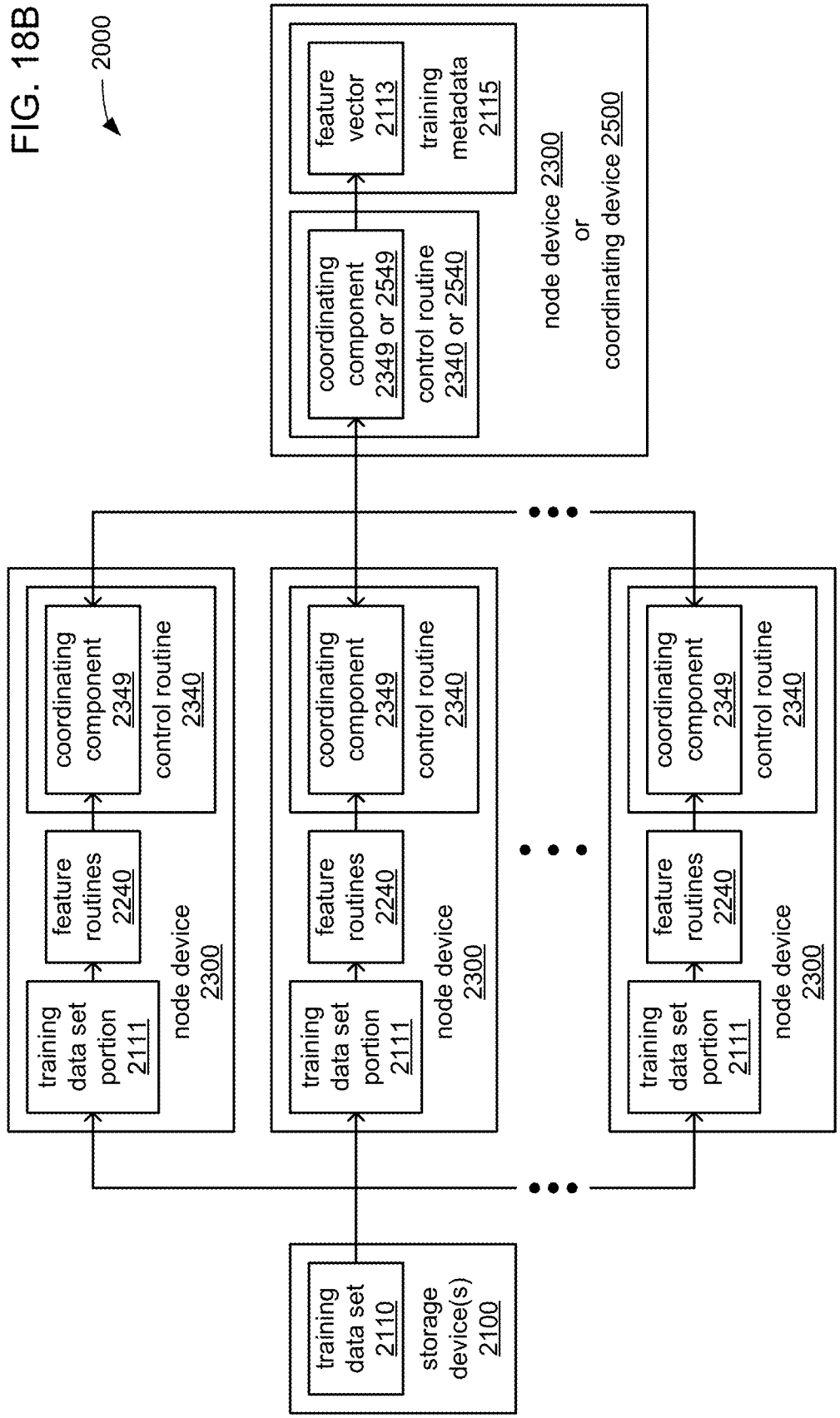
Figure 19A:
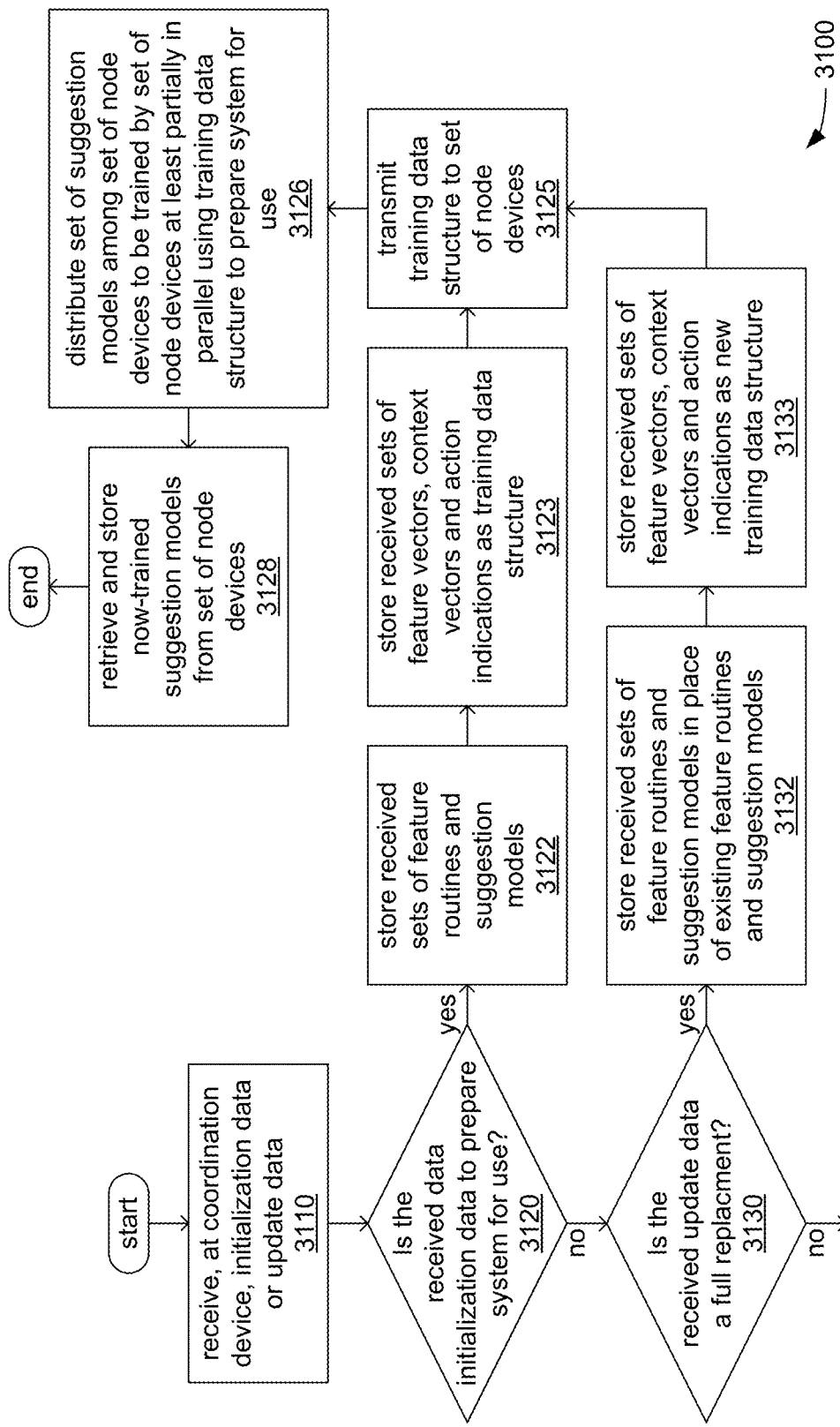
Figure 19B:
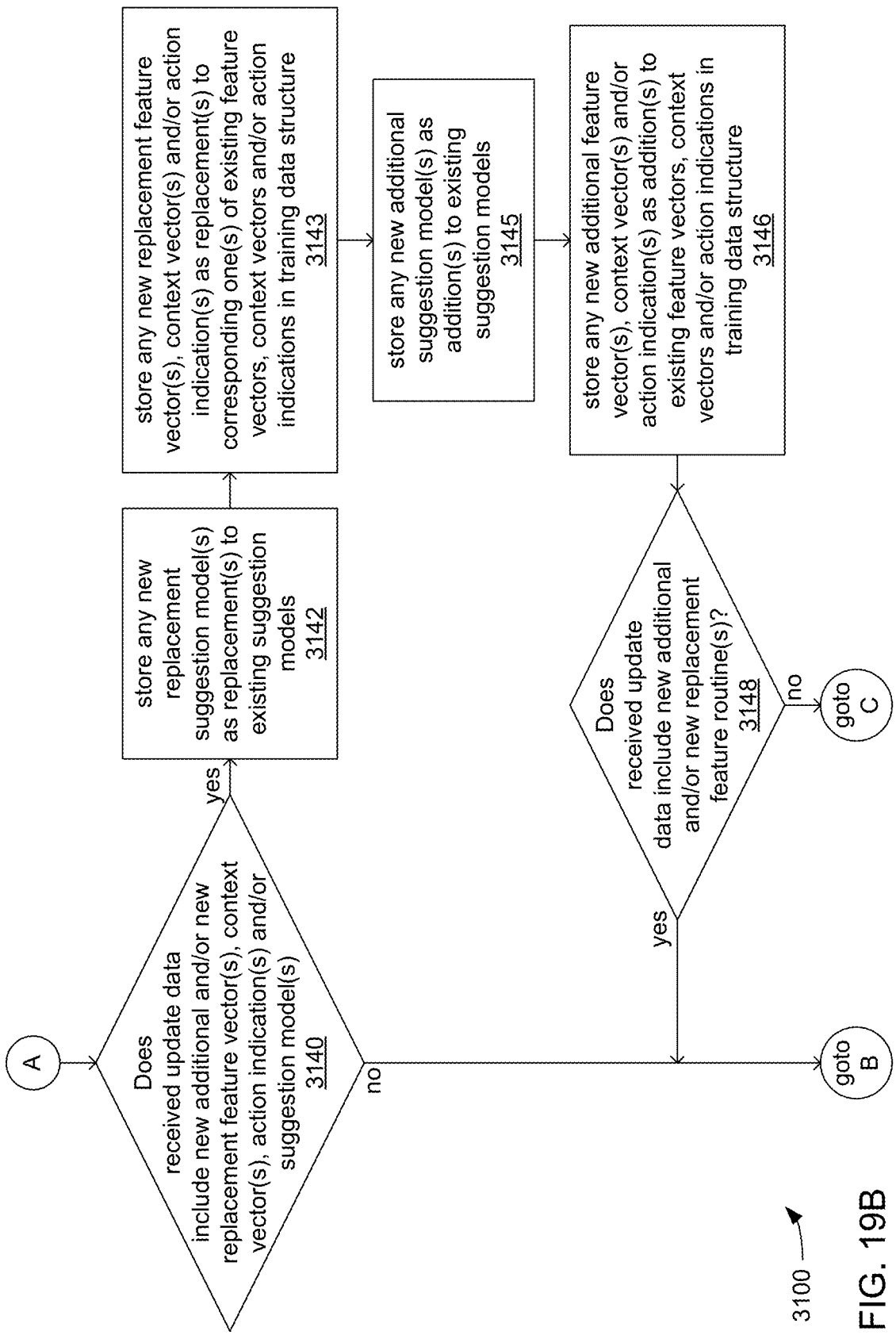
Figure 19C:
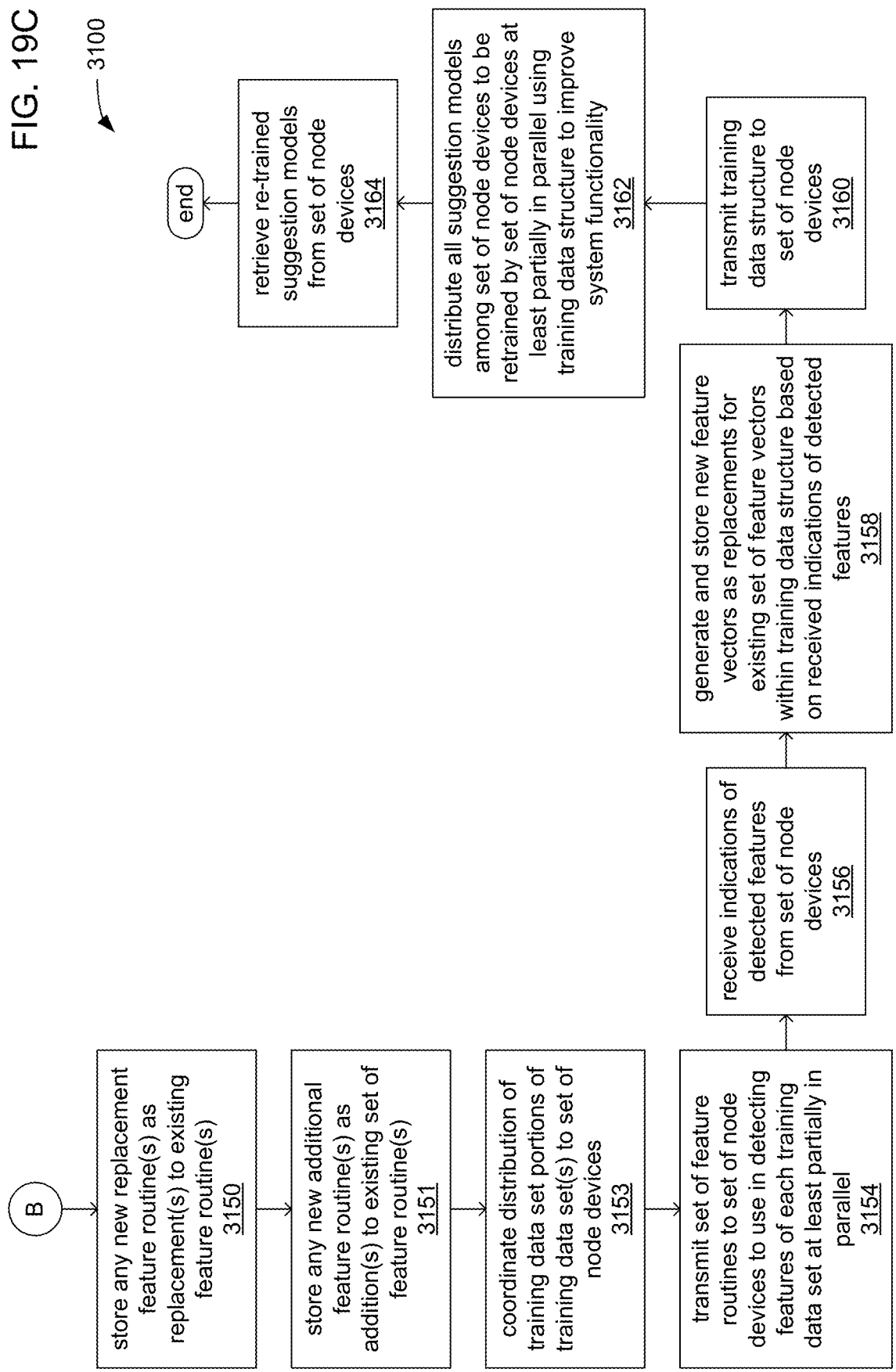

FIGS. 18A and 18B, together and in greater detail, illustrate an example of an embodiment of performing an update of one or more items of the distributed processing system 2000 to improve its functionality. FIG. 18A illustrates aspects of the reception and distribution of an instance of the update data 2935 to provide the devices 2100, 2300 and/or 2500 of the system 2000 with various new items to extend the functionality of, and/or to improve the accuracy of, the system 2000 in normal operation. FIG. 18B illustrates aspects of an embodiment of performing feature detection to detect features of a training data set 2110 as may be triggered by the receipt of an instance of the update data 2935.

Turning more specifically to FIG. 18A, the distributed processing system 2000 may be provided with an instance of the update data 2935 as part of ongoing efforts by an operator of the system 2000 to extend its capabilities and/or to improve the accuracy with which it performs various operations. As depicted, an instance of the update data 2935 may include one or more feature routines 2240, one or more feature vectors 2113, one or more context vectors 2313, one or more action indications 2319, and/or one or more suggestion models 2470. As also depicted, an instance of the update data 2935 may also include one or more training data sets 2110. Similar to the initialization data 2933, while the feature routines 2240, the feature vector(s) 2113, the context vector(s) 2313, the action indicator(s) 2319 and/or the suggestion model(s) 2470 included within an instance of the update data 2935 may be provided to, and accordingly stored by, the coordinating device 2500 (or a node device 2300 performing the functions of the coordinating device 2500), the training data set(s) 2110 that may also be included within an instance of the update data 2935 may be provided to, and accordingly stored by, the one or more storage devices 2100. Unlike the initialization data 2933, which contains full sets of most, if not all, of these items such that the system 2000 is able to be provided with what is needed from the initialization data 2933 to begin to be put to normal use, instances of the update data 2935 may contain relatively small subsets of new ones of these items for the purpose of augmenting the existing sets of these items with new items that extend functionality, and/or replacing portions of those sets with new items that improve functionality.

Depending on what new items are included in an instance of the update data 2935, and depending on whether complete sets of new items meant to replace existing sets of items are included, the coordinating device 2500 (or a node device 2300 performing the functions of the coordinating device 2500) may respond to the receipt of an instance of the update data 2935 in a variety of ways. By way of example, if an instance of the update data 2935 includes a full set of new suggestion models 2740 accompanied by full sets of new feature vectors 2113, new context vectors 2313 and new action indications 2319 (e.g., completely new versions of the training metadata 2115, the training context data 2315 and the training selections data 2317, respectively) for use in training the full set of new suggestion models 2740, then the processor 2550 of the coordinating device 2500 may be caused to respond to the receipt of such an instance of the update data 2935 by replacing the existing full sets of the suggestion models 2740, feature vectors 2113, context vectors 2313 and action indications 2319 already stored within the storage 2560 with the new full sets, followed by performing the training of the new set of suggestion models 2740. However, if less than a full set of new suggestion models 2740 is included in an instance of the update data 2935, and is accompanied by corresponding new feature vectors 2113, context vectors 2313 and action indications 2319, then the processor 2950 of the coordinating device 2900 may respond by replacing just a subset of the existing suggestion models 2740 with the new suggestion models 2740 if the new suggestion models 2740 are meant to be replacements, or by augmenting the existing set of suggestion models 2740 to additionally include the new suggestion models 2740 if the new suggestion models 2740 are meant to be additions. Correspondingly, the new feature vectors 2113 may replace a subset of or be added to the existing set of feature vectors 2113 (i.e., the training metadata 2115), the new context vectors 2313 may replace a subset of or be added to the existing set of context vectors 2313 (i.e., the training context data 2315), and the new action indications 2319 may replace a subset of or be added to the existing set of action indications 2319 (i.e., the training selections data 2317). Following such replacements or additions, the new feature vectors 2113, the new context vectors 2313 and the new action indications 2319 may then be used to train the new suggestion models 2740.

The replacement of some or all of the existing suggestion models 2740 in the set of suggestion models 2740 that are stored by the coordinating device 2500 may be deemed desirable in situations where it may be determined that a different type of model (e.g., a different type of decision tree) has been determined to be a better choice than the type of model (e.g., the type of decision tree) that may have been selected for the existing suggestion models 2740. As an alternative, it should also be noted that an instance of the update data 2935 may not include a replacement for an existing suggestion model 2740, but may include one or more new feature vectors 2113, one or more new context vectors 2313 and/or one or more new action indications 2319 that may replace existing ones that had been previously used to train that existing suggestion model 2740. This may be deemed desirable where one or more of these items for training that existing suggestion model 2740 have been found to contain errors and/or are otherwise deemed to be in need of improvement to improve the training of that existing suggestion model 2740.

In contrast, the addition of one or more new suggestion models 2740 to an existing set of suggestion models 2740 that are stored by the coordinating device 2500 may be part of adding support for new data preparation operations by adding the corresponding ability to make determinations of whether the performance of those new data preparation operations are to be suggested to a user. Such a new suggestion model 2740 that is provided to augment the existing set of suggestion models 2740 may be accompanied by corresponding new feature vectors 2113, new context vectors 2313 and new action indications 2319 that are needed to train the new suggestion model 2740, and which are added to corresponding ones of the existing set of feature vectors 2113 within the training metadata 2115, the existing set of context vectors 2313 within the training context data 2315, and the existing set of action indications 2319 within the training selections data 2317.

However, in some embodiments, there may also be instances of the update data 2935 that may contain complete new sets of these items such that they resemble the initialization data 2933 as their contents may entirely replace all of such existing items that may have been previously provided to a system 2000 to an extent that they effectively serve as the basis for a repeat of the initialization of the system 2000. On occasions in which such a complete replacement occurs, the result may effectively be a wiping away of all machine learning that had been accomplished based on the existing sets of items. Thus, in some embodiments in which the performance of such a complete replacement is supported, the coordinating device 2500 may be triggered to store a copy of the existing sets of these items within the one or more storage devices 2100 and/or to transmit a copy of the existing sets of these items to another device external to the system 2000 to enable preservation of the machine learning that has taken place for analysis.

Turning more specifically to FIG. 18B, where an instance of the update data 2935 includes one or more new feature routines 2240 and/or includes one or more new training data sets 2110, then the aforedescribed re-training of one or more suggestion models 2470 may need to be preceded with the use of the set of feature routines 2240 to generate one or more new feature vectors 2113 of the training metadata 2115. This may arise from the fact that the set of feature vectors 2113 of the training metadata 2115 are used as inputs to the training of the set of suggestion models 2470.

As has been discussed, each feature vector 2113 of the training metadata 2115 may be generated by the execution of the set of feature routines 2240 to analyze a corresponding training data set 2110 to determine which features it may have of the corresponding set of features. Therefore, if either the training data set 2110 or one of the feature routines 2240 that were used to generate a particular feature vector 2113 is changed, then the particular feature vector 2113 may need to be re-generated to correctly indicate which features of the set of features are present within the current version of the training data set 2110, as determined by the current set of feature routines 2240.

However, it should be noted that, in some embodiments, one or more new feature routines 2240 may be included in an instance of the update data to augment the existing set of feature routines 2240, rather than to replace existing feature routines 2240. This may be done to add the ability to detect entirely new features as another way to extend the capabilities of the distributed processing system 2000. As previously discussed, each feature vector 2113 of the training metadata 2115 includes a set of feature indicators 2114 that each correspond to one of the features of the set of features that may be detected in a corresponding training data set 2110, and correspondingly, each feature vector 2133 of the metadata 2135 includes a set of feature indicators 2134 that each correspond to one of the features of the same set of features that may be detected in a corresponding data set 2130. Thus, the addition of a new feature routine 2240 to detect a new feature may necessitate adding to the set of feature indicators 2114 and 2134 within each feature vector 2113 and 2133, respectively, to support the addition of the new feature to the set of features that are able to be detected. As a result, each training data set 2110 may need to be put back through a performance of feature detection by the system 2000 to re-generate a new set of feature vectors 2113 within the training metadata 2115 that each include the addition new feature indicator 2114 for the new feature. This, in turn, may necessitate a re-training of the set of suggestion models 2470 with the set of new feature vectors 2113.

FIGS. 19A, 19B, 19C and 19D, together, illustrate an example embodiment of a logic flow 3100. The logic flow 3100 may be representative of some or all of the operations executed by one or more embodiments described herein. More specifically, the logic flow 3100 may illustrate operations performed by the processor 2550 in executing the control routine 2540, and/or performed by other component(s) of the coordinating device 2500. Alternatively, the logic flow 3100 may illustrate operations performed by the processor 2350 in executing the control routine 2340, and/or performed by other component(s) of a node device 2300 that is performing the functions of the coordinating device 2500.

At 3110, a processor of a coordinating device of a distributed processing system (e.g., the processor 2550 of the coordinating device 2500 of the distributed processing system 2000) may receive, via a network, either initialization data or an instance of update data (e.g., via the network 2999, and either the initialization data 2933 or an instance of the update data 2935). As has been discussed, the initialization data may be received as part of preparing the system for normal use, while instances of the update data may be received by the distributed processing system over time during such normal use as part of a mechanism to extend and/or improve the capabilities of the distributed processing system.

At 3120, the processor may check whether the received data is initialization data that is provided to prepare the system for normal use. As previously discussed, such received initialization data may include sets of various items needed to enable the system to detect features in data sets (e.g., features within data sets 2130 and/or training data sets 2110), and to suggest a subset of a set of data preparation operations to perform on a data set based on its features and context. If the received data is initialization data, then the processor may store the various received sets of items in the initialization data as part of preparing the system for use. More specifically, at 3122, the processor may store the received sets of feature routines and suggestion models (e.g., sets of the feature routines 2240 and the suggestion models 2470). At 3123, the processor may store the received set of feature vectors as training metadata within a training data structure, may store the received set of context vectors as training context data within the training data structure, and may store the received set of action indications as training selections data within the training data structure (e.g., the training metadata 2115, the training context data 2315, and the training selections data 2317, respectively, within the training data structure 2310). At 3125, the processor may transmit the training data structure to each node device of a set of node devices selected for use in training the set of suggestion models. At 3126, the processor may distribute the set of suggestion models among the set of node devices to enable the set of suggestion models to be trained by the set of node devices, at least partially in parallel, and using the training data structure. At 3128, the processor may retrieve and store the now trained set of suggestion models from the set of node devices in preparation for use.

However, if at 3120, the received data is not initialization data, then at 3130, the processor may check whether the received data is an instance of update data containing full sets of replacements for all of: the existing set of feature routines, the existing set of suggestion models, the existing set of feature vectors, the existing set of context vectors and the existing set of action indications. If so, then the processor may store the various received sets of items in the instance of update data as full replacements for the existing sets of items. More specifically, at 3132, the processor may store the received sets of feature routines and suggestion models as replacements for the existing sets thereof. At 3133, the processor may store the received set of feature vectors, context vectors and action indications as replacements for existing sets thereof, before proceeding to transmit training data structure to each node device of a set of node devices at 3125.

However, if at 3130, the received data is not an instance of update data containing full sets of replacements for all of such sets of items, then a presumption is made that the received data is an instance of update data that contains new additional items and/or new replacement items for less than all items in all existing sets. More specifically, at 3140, the processor may check whether the received data is an instance of update data that includes new feature vectors, context vectors, action indications and/or suggestion models that are provided as replacements for existing ones within the existing sets and/or are provided as additions to the existing sets. If not at 3140, then at 3150, the processor may store any new replacement feature routines in the received data as replacement for whichever feature routines that they are meant to replace within the existing set of feature routines, and may store any new additional feature routines as additions to the existing set of feature routines at 3151. At 3153, the processor may at least coordinate (if not more directly effect) the distribution of training data set portions (e.g., the training data set portions 2111) of one or more training data sets among a set of node devices selected to perform feature detection, and may transmit the existing set of feature routines to each node device of the set of node devices at 3154 to enable each to perform feature detection on training data set portions of the one or more training data sets at least partially in parallel.

As the set of node devices perform feature detection, at 3156, the processor may receive indications from the set of node devices of features that have been detected in each of the one or more training data sets. As has been discussed, the processor may engage in, or at least coordinate, exchanges of indications among the set of node devices of features that have been detected to support instances in which the detection of one feature has a dependency on the detection of another feature by what may be a different a node device. At 3158, the processor may generate new feature vectors based on the received indications of detected features, and may store the new feature vectors as replacements for the existing set of feature vectors within the training data structure. At 3160, the processor may transmit the training data structure with the newly generated set of feature vectors to each of the node devices of the set of node devices. At 3162, the processor may distribute the set of suggestion models among the set of node devices to enable a re-training of the set of suggestion models by the set of node devices based on the training data structure within the new set of feature vectors. At 3164, the processor may retrieve the set of newly re-trained suggestion models from the set of node devices.

However, if at 3140, the received data is an instance of update data that includes new feature vectors, then at 3142, the processor may store any new replacement suggestion models as replacements for whichever specific suggestion models that they are meant to replace within the existing set of suggestion models. At 3143, the processor may store any new replacement feature vectors, context vectors and/or action indications as replacements for whichever specific feature vectors, context vectors and/or action indications that they are meant to replace within corresponding ones of their respective existing sets. At 3145, the processor may store any new additional suggestion models as additions to the existing set of suggestion models. At 3146, the processor may store any new additional feature vectors, context vectors and/or action indications as additions to their respective existing sets. At 3148, the processor may check whether the received instance of update data includes any new addition and/or replacement feature routines. If so, then the processor may proceed with storing any new replacement feature routines at 3150.

However, if at 3148, the received instance of update data does not include any new additional or replacement feature routines, then at 3170, the processor may transmit the training data structure to each of the node devices of the set of node devices. At 3172, the processor may distribute, among the set of node devices, any new additional and/or replacement suggestion models received in the instance of update data, as well as any suggestion models associated with any new additional and/or new replacement feature vectors, context vectors and/or action indications received in the instance of update data. At 3174, the processor may retrieve the newly re-trained suggestion models from the set of node devices.

Figure 20A:
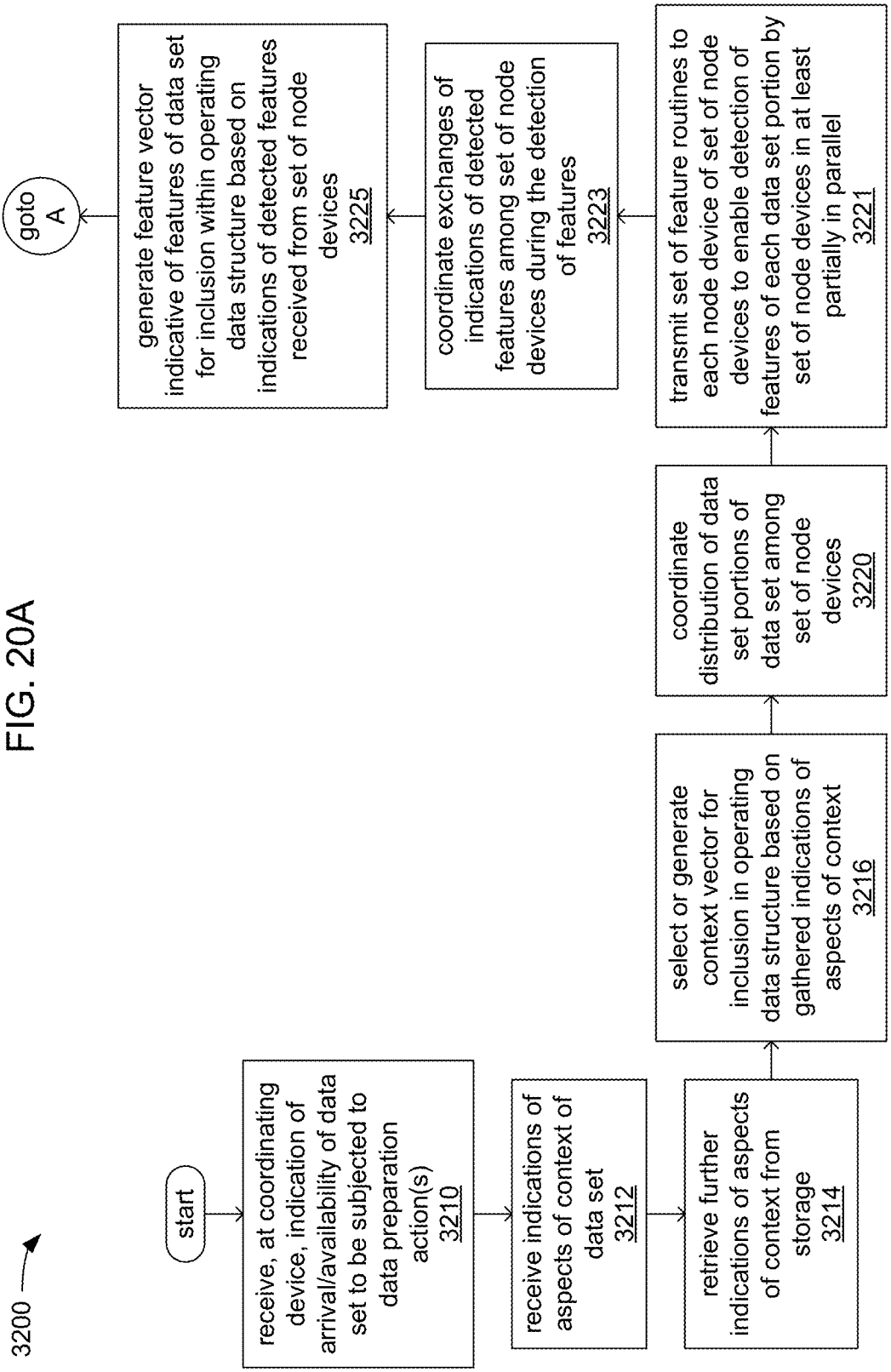
FIGS. 20A, 20B and 20C, together, illustrate an example embodiment of a logic flow of a coordinating device coordinating normal operation of a distributed processing system.
Figure 20B:
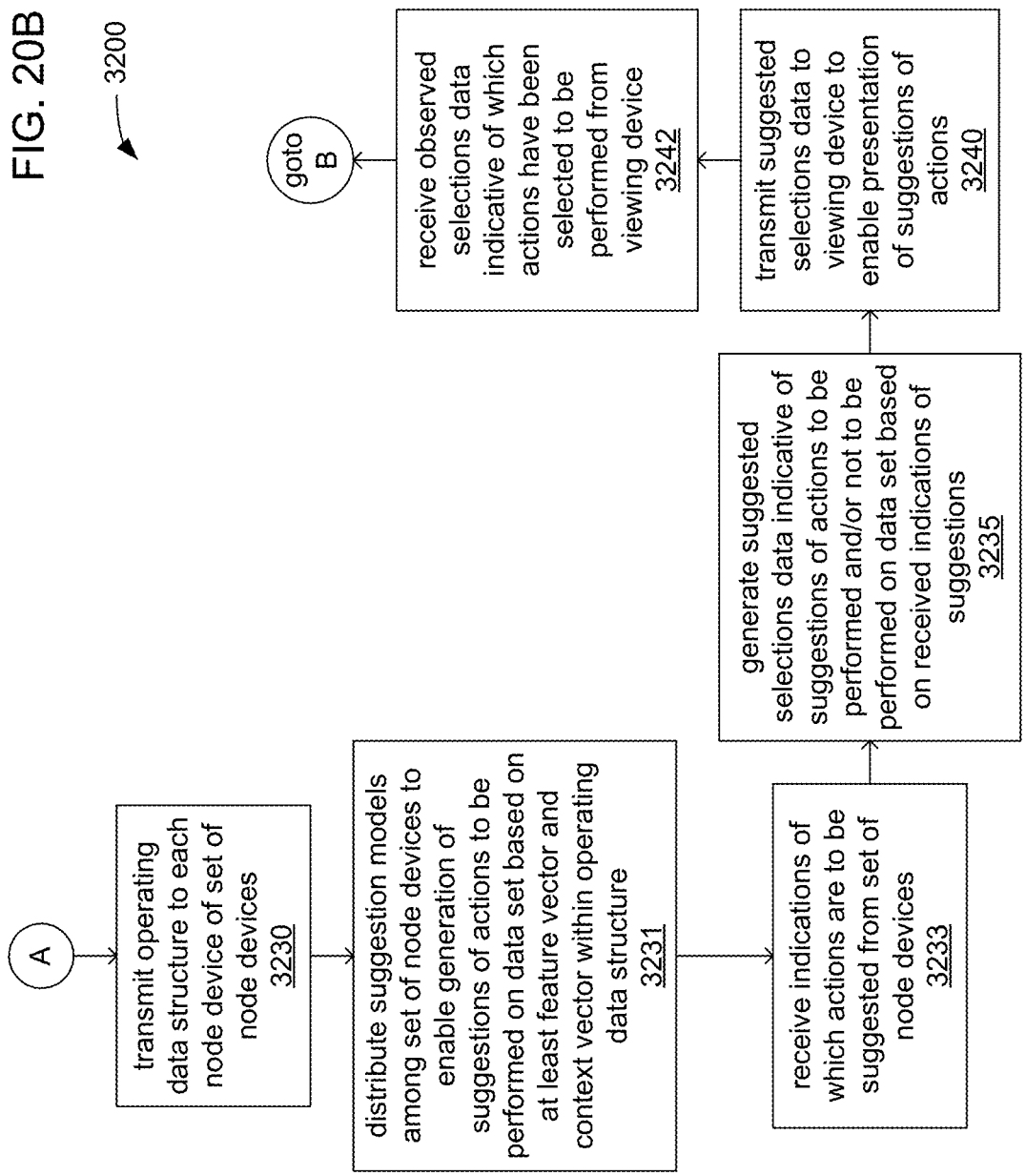
Figure 20C:
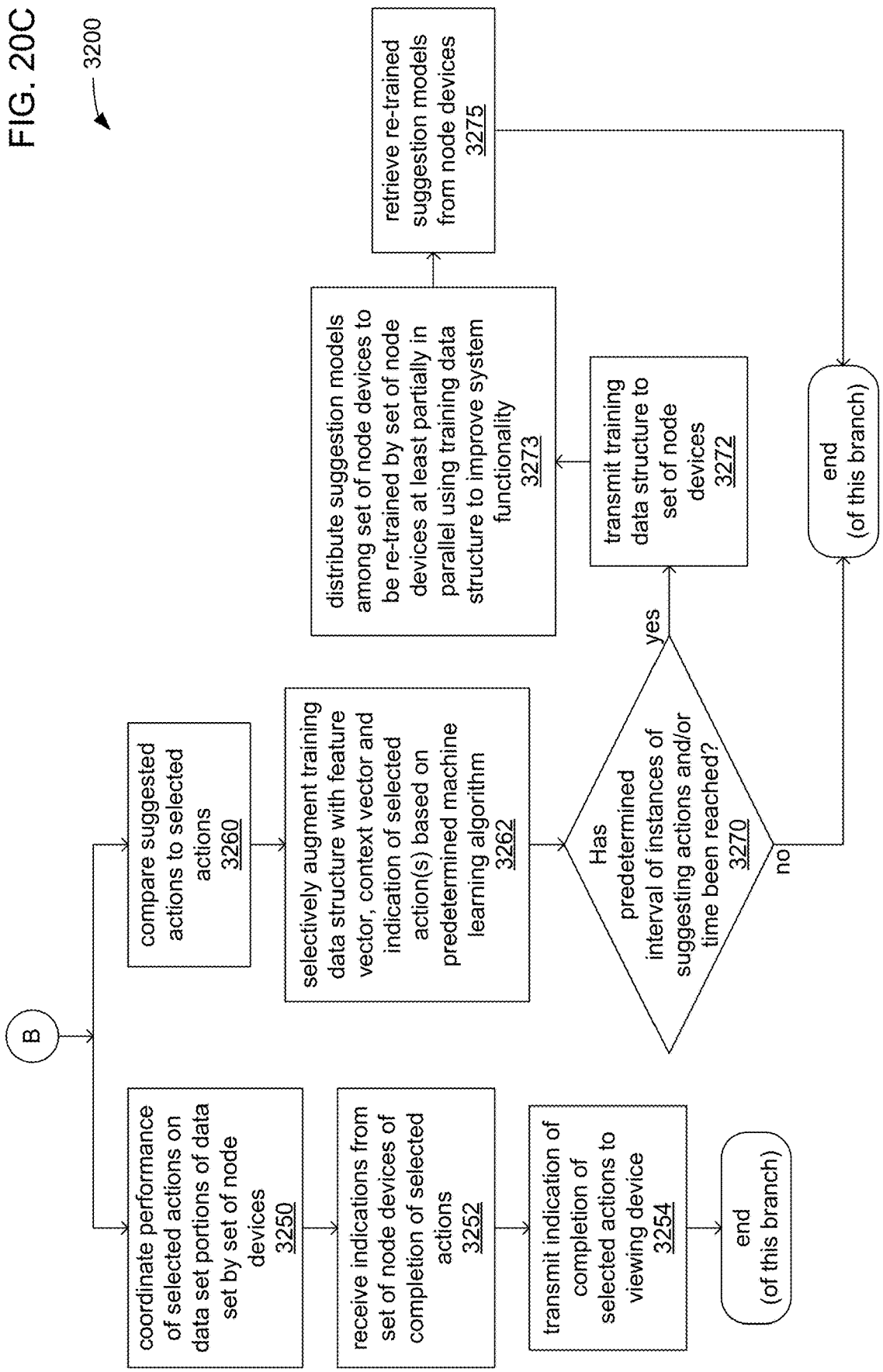

FIGS. 20A, 20B and 20C, together, illustrate an example embodiment of a logic flow 3200. The logic flow 3200 may be representative of some or all of the operations executed by one or more embodiments described herein. More specifically, the logic flow 3200 may illustrate operations performed by the processor 2550 in executing the control routine 2540, and/or performed by other component(s) of the coordinating device 2500. Alternatively, the logic flow 3200 may illustrate operations performed by the processor 2350 in executing the control routine 2340, and/or performed by other component(s) of a node device 2300 that is performing the functions of the coordinating device 2500.

At 3210, a processor of a coordinating device of a distributed processing system (e.g., the processor 2550 of the coordinating device 2500 of the distributed processing system 2000) may receive, via a network, an indication of the availability (e.g., arrival) of a data set that is to be subjected to one or more data preparation actions (e.g., via the network 2999, an indication of availability of a data set 2130). As has been discussed, the indication of availability may be received from various sources, including and not limited to, the one or more storage devices in which the data set is stored (e.g., the one or more storage devices 2100) or a viewing device operated by a user who provides descriptive information concerning the data set that is needed to search for and retrieve it.

At 3212, the processor may also receive indications of the context of the data set. As has been discussed, there may be multiple sources of context information concerning a data set, including from among the information received from the viewing device as part of the request to access it, from the one or more storage devices, from another device via the network, etc. Accordingly, at 3214, the processor may retrieve further indications of contextual aspects of the data set from the one or more storage devices. At 3216, the processor may select and/or generate a context vector for the data set for inclusion in an operating data structure based on the gathered indications of contextual aspects of the data set.

At 3220, the processor may at least coordinate the distribution of data set portions (e.g., the data set portions 2131) of the data set among a set of node devices selected to perform feature detection, and may transmit the existing set of feature routines to each node device of the set of node devices at 3221 to enable each to perform feature detection on data set portions of the data set at least partially in parallel. As the set of node devices perform feature detection, at 3223, the processor may receive indications from the set of node devices of features that have been detected in each of the data set portions. As has been discussed, the processor may engage in, or at least coordinate, exchanges of indications among the set of node devices of features that have been detected to support instances in which the detection of one feature has a dependency on the detection of another feature by what may be a different a node device. At 3225, the processor may generate a feature vector for the data set for inclusion in the operating data structure based on the received indications of detected features.

At 3230, the processor may transmit the operating data structure with the newly generated context and feature vectors for the data set therein to each of the node devices of the set of node devices. At 3231, the processor may distribute the set of suggestion models among the set of node devices to enable their use with the operating data structure to determine what data preparation operations (i.e., what actions) are to be suggested to be performed on the data set. At 3233, the processor may receive indications of what subset of the set of data preparation operations to suggest be performed on the data set, and at 3235, may generate a suggested selections data indicative of that subset based on those received indications.

At 3240, the processor may transmit the suggested selections data to a viewing device (e.g., the viewing device 2700) to enable a presentation of the suggested subset of data preparation operations to be made to a user of the viewing device. At 3242, the processor may receive, from the viewing device, an observed selections data that is indicative of a subset of the set of data preparation operations that the user selected for performance on the data set.

At 3250, the processor may coordinate the performance of the selected subset of data preparation operations on the data set by the set of node devices. As previously discussed, it may be the processor is able to coordinate such a performance by the set of node devices using the data set portions that were already earlier distributed thereamong for feature detection, and/or may be able to coordinate such a performance to be at least partially in parallel among the set of node devices. At 3252, the processor may receive indications of completion of the data preparation operations from the set of node devices, and may transmit an indication of such completion to the viewing device at 3254.

At 3260, and at least partially in parallel with the performance of the selected subset of data preparation operations on the data set at 3250, the processor may compare the selected subset of data preparation objects (as selected by the user) to the suggested subset of data preparation operations (as suggested to the user). At 3262, based on the results of that comparison and/or based on whatever type of machine learning algorithm (or portion thereof) that may be selected to control the occurrences of any additions being made to the training data structure (e.g., the training data structure 2310), the processor may or may not augment the training data structure with the combination of the feature vector, the context vector and indication(s) of what data preparation operations were selected by the user.

At 3270, the processor may check whether a predetermined interval of time and/or interval of a quantity of times that a suggested subset of data preparation operations has been generated. If not, then at 3272, the processor may transmit the training data structure to each of the node devices of the set of node devices. At 3273, the processor may distribute the set of suggestion models among the set of node devices to enable a re-training of the set of suggestion models by the set of node devices based on the training data structure. At 3275, the processor may retrieve the set of newly re-trained suggestion models from the set of node devices.

In various embodiments, each of the processors 2150, 2350, 2550 and 2750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

In various embodiments, each of the control routines 2140, 2340, 2540 and 2740, including the components of which each is composed, may be selected to be operative on whatever type of processor or processors that are selected to implement applicable ones of the processors 2150, 2350, 2550 and/or 2750 within each one of the devices 2100, 2300, 2500 and/or 2700, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2150, 2350, 2550 and/or 2750. Where one or more device drivers are included, those device drivers may provide support for any of a variety of other components, whether hardware or software components, of the devices 2100, 2300, 2500 and/or 2700.

In various embodiments, each of the storages 2160, 2360, 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2160 in embodiments in which the one or more of the storage devices 2100 store data sets 2130 may be implemented with a redundant array of independent discs (RAID) of a RAID level selected to provide fault tolerant storage.

In various embodiments, each of the input device(s) 2710 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, each of the display(s) 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input device(s) 2810, respectively, may be incorporated therein as touch-sensitive components thereof.

In various embodiments, each of the network interfaces 2190, 2390, 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, one or more of the network interfaces 2290, 2490, 2590 and/or 2890 may be implemented with multiple copper-based or fiber-optic based network interface ports to provide redundant and/or parallel pathways in exchanging one or more of the portions of data of the data sets 2130, one or more of the metadata portions 2336, and/or one or more of the normalized metadata portions 2436.

In various embodiments, the division of processing and/or storage resources among the federated devices 1500, and/or the API architectures employed to support communications between the federated devices and other devices may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
  receive update data comprising a feature routine, wherein the feature routine comprises executable instructions to detect a structural feature of a data set from among a pre-selected set of structural features or a data feature of a data value of the data set from among a pre-selected set of data features;
  coordinate a performance of a distribution of a set of training data set portions of a training data set among a set of processor cores;
  provide a set of feature routines to each processor core of the set of processor cores to enable each processor core of the set of processor cores to execute instructions of each feature routine to detect a structural feature of a corresponding training data set portion of the set of training data set portions or a data feature of data values of the corresponding training data set portion;
  receive indications of detected structural features and detected data features of the set of training data set portions from the set of processor cores;
  generate, for the training data set, training metadata indicative of the detected structural features and detected data features of the set of training data set portions from the set of processor cores;
  provide the training metadata, a training context data and a set of action indications to each processor core of the set of processor cores, wherein:
    the training context data is indicative of a pre-selected set of contextual aspects; and
    the set of action indications is indicative of a subset of data preparation operations of a set of data preparation operations to be suggested to be performed on the training data set based on the training metadata and the training context data;
  distribute a set of suggestion models among the set of processor cores to provide each processor core of the set of processor cores with a different suggestion model from among the set of suggestion models, and to enable the set of processor cores to re-train the set of suggestion models, wherein:
    each suggestion model comprises a pre-selected type of model previously trained to determine whether to suggest that a corresponding data preparation operation of the set of data preparation actions be performed on a data set based on corresponding metadata and context data;
    the corresponding metadata is indicative of detected structural features and data features of the data set; and
    the corresponding context data is indicative of contextual aspects of the data set;
  receive, from each processor core, a corresponding suggestion model of the set of suggestion models after the re-training; and
  store the received suggestion models as replacements for the set of suggestion models.

2. The apparatus of claim 1, wherein:
  space is allocated within the training metadata to store a separate indication of whether each structural feature of the set of structural features or data feature of the set of data features that is detected in the training data by a corresponding feature routine of the set of feature routines; and
  the processor is caused to perform operations comprising:
    determine whether the structural feature or data feature detected by the received feature routine comprises a structural feature that is already among the set of structural features or a data feature that is already among the set of data features; and
    in response to a determination that the structural feature or data feature detected by the received feature routine comprises a new structural feature that is not already among the set of structural features or a new data feature that is not already among the set of data features, perform operations comprising:
      store the received feature routine as an addition to the set of feature routines prior to the provision of the set of feature routines to each processor core of the set of processor cores to detect structural features and data features of the training data set; and
      allocate another space in the training metadata to store a separate indication of whether the new structural feature or new data feature is detected in the training data.

3. The apparatus of claim 2, wherein the processor is caused to, in response to a determination that the structural feature or data feature detected by the received feature routine comprises a structural feature that is already among the set of structural features or a data feature that is already among the set of data features, replace a corresponding feature routine among the set of feature routines that detects the structural feature or data feature with the received feature routine prior to the provision of the set of feature routines to the set of processor cores to detect features of the training data set.

4. The apparatus of claim 1, wherein:
  for each data preparation operation of the set of data preparation operations, space is allocated within the set of action indications for a corresponding subset of action indications;
  for each subset of action indications, each action indication corresponds to a different combination of training data set and context data;
  the update data comprises a suggestion model; and
  the processor is caused to perform operations comprising:
    determine whether the data preparation operation that corresponds to the received suggestion model comprises a data preparation operation that is already among the set of data preparation operations; and
    in response to a determination that the corresponding data preparation operation comprises a new data preparation operation that is not already among the set of data preparation operations, perform operations comprising:
      store the suggestion model as an addition to the set of suggestion models prior to the distribution of the set of suggestion models among the set of processor cores to enable re-training of the set of suggestion models; and allocate another space within the set of action indications for another subset of action indications that corresponds to the data preparation operation that corresponds to the received suggestion model.

5. The apparatus of claim 4, wherein the processor is caused to, in response to a determination that the corresponding data preparation operation comprises a data preparation operation that is already among the set of data preparation operations, replace a corresponding suggestion model among the set of suggestion models that determines whether to suggest the data preparation operation prior to the distribution of the set of suggestion models among the set of processor cores to enable re-training of the set of suggestion models.

6. The apparatus of claim 1, wherein:
at least one suggestion model of the set of suggestion models comprises neural network configuration data that comprises an indication of at least one of a quantity of neurons, a quantity of rows of neurons, a set of connections among neurons, a trigger function to be implemented by at least one neuron, weights and biases of the trigger function; and use of the at least one model by at least one processor core of the set of processor cores to determine whether to suggest that the corresponding data preparation operation be performed on the data set comprises use of the configuration data by the at least one processor core to configure a neural network to implement a set of classifiers.

7. The apparatus of claim 6, wherein the re-training of the at least one suggestion model comprises use, by the at least one processor core, of at least a combination of the training metadata, the training context data and a subset of action indications of the set of action indications that corresponds to the corresponding data preparation action to perform backpropagation on the neural network to change at least one of the weights or the biases.

8. The apparatus of claim 1, wherein:
the set of processor cores is distributed among a set of node devices;
the processor is caused to perform operations comprising:
receive indications of availability of each node device of a plurality of node devices; and
select the set of node devices from among the plurality of node devices based on the received indications of availability;
the coordination of the performance of distribution of the set of training data set portions of the training data set among the set of processor cores comprises a coordination of a performance of a distribution of the set of training data set portions among the set of node devices from at least one storage device through a network;
the provision of the set of feature routines to each processor core of the set of processor cores comprises transmission of the set of feature routines to each node device of the set of node devices;
the provision of the training metadata, the training context data and the set of action indications to each processor core of the set of processor cores comprises transmission of the training metadata, the training context data and the set of action indications to each node device of the set of node devices; and
the distribution of the set of suggestion models among the set of processor cores comprises the distribution of the set of suggestion models among the set of node devices to provide each node device of the set of node devices with a different suggestion model from among the set of suggestion models.

9. The apparatus of claim 8, wherein the processor is caused to perform operations comprising:
receive an indication of availability of the data set, wherein the indication of availability of the data set comprises an indication of at least one of a contextual aspect of the data set from among the set of contextual aspects, a structural feature of the data set from among the set of structural features, or a data feature of a data value of the data set from among the set of data features;
coordinate a performance of a distribution of a set of data set portions of the data set among the set of node devices;
transmit the set of feature routines to each node device of the set of node devices to enable each node device of the set of node devices to detect a structural feature of a corresponding data set portion of the set of data set portions or a data feature of data values of the corresponding data set portion;
receive indications of detected structural features and detected data features of the set of data set portions from the set of node devices;
generate, for the data set, metadata indicative of the detected structural features and the detected data features;
generate, for the data set, context data indicative of the set of contextual aspects of the data set;
transmit the metadata and context data to each node device of the set of node devices;
distribute the set of suggestion models among the set of node devices to provide each node device of the set of node devices with a different suggestion model from among the set of suggestion models, and to enable the set of node devices to employ the set of suggestion models to derive a suggested subset of data preparation operations of a set of data preparation operations to be suggested to be performed on the data set;
receive indications of the suggested subset from the set of node devices;
transmit an indication of the suggested subset to a viewing device to enable a presentation of the suggested subset;
receive, from the viewing device, an indication of a selected subset of the set of data preparation operations selected to be performed;
compare the selected subset to the suggested subset to determine whether there is a difference between the suggested and selected subsets; and
in response to a determination that there is a difference between the suggested and selected subsets, and in preparation for the re-training of the set of suggestion models, perform operations comprising:
store the metadata as an addition to the training metadata;
store the context data as an addition to the training context data; and
store an indication of the selected subset as an addition to the set of action indications.

10. The apparatus of claim 1, wherein:
the pre-selected set of contextual aspects comprises at least one of:
an indication of an identity of a source of the data set;
an indication of a location associated with the source;
an indication of an industry associated with the source;

an indication of a time or date of receipt of the data set;
an indication of a user of a device from which a request is received to access the data set;
an indication of a location associated with the user;
an indication of an industry associated with the user; or
an indication of a time or date of receipt of the request from the user to access the data set;

the pre-selected set of structural features comprises at least one of:
an indication of a size of the data set;
an indication of a time or date of generation of the data set;
an indication of a language of the data set;
an indication of an organization of data values within the data set; or
an indication of a number of dimensions of indexing of the data set; and the pre-selected set of data features comprises at least one of:
an indication of at least one data type within the data set;
an indication of at least one data format within the data set; or
an indication of a minimum, a maximum, a mean or an average of a data value of the data set.

11. A computer-program product tangibly embodied in a non-transitory machine-readable storage medium, the computer-program product including instructions operable to cause a processor to perform operations comprising:
receive update data comprising a feature routine, wherein the feature routine comprises executable instructions to detect a structural feature of a data set from among a pre-selected set of structural features or a data feature of a data value of the data set from among a pre-selected set of data features;
coordinate a performance of a distribution of a set of training data set portions of a training data set among a set of processor cores;
provide a set of feature routines to each processor core of the set of processor cores to enable each processor core of the set of processor cores to execute instructions of each feature routine to detect a structural feature of a corresponding training data set portion of the set of training data set portions or a data feature of data values of the corresponding training data set portion;
receive indications of detected structural features and detected data features of the set of training data set portions from the set of processor cores;
generate, for the training data set, training metadata indicative of the detected structural features and detected data features of the set of training data set portions from the set of processor cores;
provide the training metadata, a training context data and a set of action indications to each processor core of the set of processor cores, wherein:
the training context data is indicative of a pre-selected set of contextual aspects; and
the set of action indications is indicative of a subset of data preparation operations of a set of data preparation operations to be suggested to be performed on the training data set based on the training metadata and the training context data;
distribute a set of suggestion models among the set of processor cores to provide each processor core of the set of processor cores with a different suggestion model from among the set of suggestion models, and to enable the set of processor cores to re-train the set of suggestion models, wherein:
each suggestion model comprises a pre-selected type of model previously trained to determine whether to suggest that a corresponding data preparation operation of the set of data preparation actions be performed on a data set based on corresponding metadata and context data;
the corresponding metadata is indicative of detected structural features and data features of the data set; and
the corresponding context data is indicative of contextual aspects of the data set;
receive, from each processor core, a corresponding suggestion model of the set of suggestion models after the re-training; and
store the received suggestion models as replacements for the set of suggestion models.

12. The computer-program product of claim 11, wherein:
space is allocated within the training metadata to store a separate indication of whether each structural feature of the set of structural features or data feature of the set of data features that is detected in the training data by a corresponding feature routine of the set of feature routines; and
the processor is caused to perform operations comprising:
determine whether the structural feature or data feature detected by the received feature routine comprises a structural feature that is already among the set of structural features or a data feature that is already among the set of data features; and
in response to a determination that the structural feature or data feature detected by the received feature routine comprises a new structural feature that is not already among the set of structural features or a new data feature that is not already among the set of data features, perform operations comprising:
store the received feature routine as an addition to the set of feature routines prior to the provision of the set of feature routine to each processor core of the set of processor cores to detect structural features and data features of the training data set; and
allocate another space in the training metadata to store a separate indication of whether the new structural feature or new data feature is detected in the training data.

13. The computer-program product of claim 12, wherein the processor is caused to, in response to a determination that the structural feature or data feature detected by the received feature routine comprises a structural feature that is already among the set of structural features or a data feature that is already among the set of data features, replace a corresponding feature routine among the set of feature routines that detects the structural feature or data feature with the received feature routine prior to the provision of the set of feature routines to the set of processor cores to detect features of the training data set.

14. The computer-program product of claim 11, wherein:
for each data preparation operation of the set of data preparation operations, space is allocated within the set of action indications for a corresponding subset of action indications;
for each subset of action indications, each action indication corresponds to a different combination of training data set and context data;

the update data comprises a suggestion model; and
the processor is caused to perform operations comprising:
  determine whether the data preparation operation that corresponds to the received suggestion model comprises a data preparation operation that is already among the set of data preparation operations; and
  in response to a determination that the corresponding data preparation operation comprises a new data preparation operation that is not already among the set of data preparation operations, perform operations comprising:
    store the suggestion model as an addition to the set of suggestion models prior to the distribution of the set of suggestion models among the set of processor cores to enable re-training of the set of suggestion models; and
    allocate another space within the set of action indications for another subset of action indications that corresponds to the data preparation operation that corresponds to the received suggestion model.

15. The apparatus of claim 14, wherein the processor is caused to, in response to a determination that the corresponding data preparation operation comprises a data preparation operation that is already among the set of data preparation operations, replace a corresponding suggestion model among the set of suggestion models that determines whether to suggest the data preparation operation prior to the distribution of the set of suggestion models among the set of processor cores to enable re-training of the set of suggestion models.

16. The computer-program product of claim 11, wherein:
at least one suggestion model of the set of suggestion models comprises neural network configuration data that comprises an indication of at least one of a quantity of neurons, a quantity of rows of neurons, a set of connections among neurons, a trigger function to be implemented by at least one neuron, weights and biases of the trigger function; and
use of the at least one model by at least one processor core of the set of processor cores to determine whether to suggest that the corresponding data preparation operation be performed on the data set comprises use of the configuration data by the at least one processor core to configure a neural network to implement a set of classifiers.

17. The computer-program product of claim 16, wherein the re-training of the at least one suggestion model comprises use, by the at least one processor core, of at least a combination of the training metadata, the training context data and a subset of action indications of the set of action indications that corresponds to the corresponding data preparation action to perform backpropagation on the neural network to change at least one of the weights or the biases.

18. The computer-program product of claim 11, wherein:
the set of processor cores is distributed among a set of node devices;
the processor is caused to perform operations comprising:
  receive indications of availability of each node device of a plurality of node devices; and
  select the set of node devices from among the plurality of node devices based on the received indications of availability;
the coordination of the performance of distribution of the set of training data set portions of the training data set among the set of processor cores comprises a coordination of a performance of a distribution of the set of training data set portions among the set of node devices from at least one storage device through a network;
the provision of the set of feature routines to each processor core of the set of processor cores comprises transmission of the set of feature routines to each node device of the set of node devices;
the provision of the training metadata, the training context data and the set of action indications to each processor core of the set of processor cores comprises transmission of the training metadata, the training context data and the set of action indications to each node device of the set of node devices; and
the distribution of the set of suggestion models among the set of processor cores comprises the distribution of the set of suggestion models among the set of node devices to provide each node device of the set of node devices with a different suggestion model from among the set of suggestion models.

19. The computer-program product of claim 18, wherein the processor is caused to perform operations comprising:
receive an indication of availability of the data set, wherein the indication of availability of the data set comprises an indication of at least one of a contextual aspect of the data set from among the set of contextual aspects, a structural feature of the data set from among the set of structural features, or a data feature of a data value of the data set from among the set of data features;
coordinate a performance of a distribution of a set of data set portions of the data set among the set of node devices;
transmit the set of feature routines to each node device of the set of node devices to enable each node device of the set of node devices to detect a structural feature of a corresponding data set portion of the set of data set portions or a data feature of data values of the corresponding data set portion;
receive indications of detected structural features and detected data features of the set of data set portions from the set of node devices;
generate, for the data set, metadata indicative of the detected structural features and the detected data features;
generate, for the data set, context data indicative of the set of contextual aspects of the data set;
transmit the metadata and context data to each node device of the set of node devices;
distribute the set of suggestion models among the set of node devices to provide each node device of the set of node devices with a different suggestion model from among the set of suggestion models, and to enable the set of node devices to employ the set of suggestion models to derive a suggested subset of data preparation operations of a set of data preparation operations to be suggested to be performed on the data set;
receive indications of the suggested subset from the set of node devices;
transmit an indication of the suggested subset to a viewing device to enable a presentation of the suggested subset;
receive, from the viewing device, an indication of a selected subset of the set of data preparation operations selected to be performed;
compare the selected subset to the suggested subset to determine whether there is a difference between the suggested and selected subsets; and
in response to a determination that there is a difference between the suggested and selected subsets, and in preparation for the re-training of the set of suggestion models, perform operations comprising:
store the metadata as an addition to the training metadata;
store the context data as an addition to the training context data; and
store an indication of the selected subset as an addition to the set of action indications.

20. The computer-program product of claim 11, wherein:
the pre-selected set of contextual aspects comprises at least one of:
an indication of an identity of a source of the data set;
an indication of a location associated with the source;
an indication of an industry associated with the source;
an indication of a time or date of receipt of the data set;
an indication of a user of a device from which a request is received to access the data set;
an indication of a location associated with the user;
an indication of an industry associated with the user; or
an indication of a time or date of receipt of the request from the user to access the data set;
the pre-selected set of structural features comprises at least one of:
an indication of a size of the data set;
an indication of a time or date of generation of the data set;
an indication of a language of the data set;
an indication of an organization of data values within the data set; or
an indication of a number of dimensions of indexing of the data set; and
the pre-selected set of data features comprises at least one of:
an indication of at least one data type within the data set;
an indication of at least one data format within the data set; or
an indication of a minimum, a maximum, a mean or an average of a data value of the data set.

21. A computer-implemented method comprising:
receiving, by a processor, update data comprising a feature routine, wherein the feature routine comprises executable instructions to detect a structural feature of a data set from among a pre-selected set of structural features or a data feature of a data value of the data set from among a pre-selected set of data features;
coordinating, by the processor, a performance of a distribution of a set of training data set portions of a training data set among a set of processor cores;
providing, by the processor, a set of feature routines to each processor core of the set of processor cores to enable each processor core of the set of processor cores to execute instructions of each feature routine to detect a structural feature of a corresponding training data set portion of the set of training data set portions or a data feature of data values of the corresponding training data set portion;
receiving, by the processor, indications of detected structural features and detected data features of the set of training data set portions from the set of processor cores;
generating, by the processor, for the training data set, training metadata indicative of the detected structural features and detected data features of the set of training data set portions from the set of processor cores;
providing, by the processor, the training metadata, a training context data and a set of action indications to each processor core of the set of processor cores, wherein:
the training context data is indicative of a pre-selected set of contextual aspects; and
the set of action indications is indicative of a subset of data preparation operations of a set of data preparation operations to be suggested to be performed on the training data set based on the training metadata and the training context data;
distributing, by the processor, a set of suggestion models among the set of processor cores to provide each processor core of the set of processor cores with a different suggestion model from among the set of suggestion models, and to enable the set of processor cores to re-train the set of suggestion models, wherein:
each suggestion model comprises a pre-selected type of model previously trained to determine whether to suggest that a corresponding data preparation operation of the set of data preparation actions be performed on a data set based on corresponding metadata and context data;
the corresponding metadata is indicative of detected structural features and data features of the data set; and
the corresponding context data is indicative of contextual aspects of the data set;
receiving, by the processor and from each processor core, a corresponding suggestion model of the set of suggestion models after the re-training; and
storing the received suggestion models as replacements for the set of suggestion models.

22. The computer-implemented method of claim 21, wherein:
space is allocated within the training metadata to store a separate indication of whether each structural feature of the set of structural features or data feature of the set of data features that is detected in the training data by a corresponding feature routine of the set of feature routines; and
the method further comprises:
determining, by the processor, whether the structural feature or data feature detected by the received feature routine comprises a structural feature that is already among the set of structural features or a data feature that is already among the set of data features; and
in response to a determination that the structural feature or data feature detected by the received feature routine comprises a new structural feature that is not already among the set of structural features or a new data feature that is not already among the set of data features, performing operations comprising:
storing the received feature routine as an addition to the set of feature routines prior to the provision of the set of feature routine to each processor core of the set of processor cores to detect structural features and data features of the training data set; and
allocating another space in the training metadata to store a separate indication of whether the new structural feature or new data feature is detected in the training data.

23. The computer-implemented method of claim 22, further comprising, in response to a determination that the structural feature or data feature detected by the received feature routine comprises a structural feature that is already among the set of structural features or a data feature that is already among the set of data features, replacing a corresponding feature routine among the set of feature routines that detects the structural feature or data feature with the received feature routine prior to the provision of the set of feature routines to the set of processor cores to detect features of the training data set.

24. The computer-implemented method of claim 21, wherein:
   for each data preparation operation of the set of data preparation operations, space is allocated within the set of action indications for a corresponding subset of action indications;
   for each subset of action indications, each action indication corresponds to a different combination of training data set and context data;
   the update data comprises a suggestion model; and
   the method further comprises:
      determining, by the processor, whether the data preparation operation that corresponds to the received suggestion model comprises a data preparation operation that is already among the set of data preparation operations; and
      in response to a determination that the corresponding data preparation operation comprises a new data preparation operation that is not already among the set of data preparation operations, performing operations comprising:
         storing the suggestion model as an addition to the set of suggestion models prior to the distribution of the set of suggestion models among the set of processor cores to enable re-training of the set of suggestion models; and
         allocating another space within the set of action indications for another subset of action indications that corresponds to the data preparation operation that corresponds to the received suggestion model.

25. The computer-implemented method of claim 24, further comprising, in response to a determination that the corresponding data preparation operation comprises a data preparation operation that is already among the set of data preparation operations, replacing a corresponding suggestion model among the set of suggestion models that determines whether to suggest the data preparation operation prior to the distribution of the set of suggestion models among the set of processor cores to enable re-training of the set of suggestion models.

26. The computer-implemented method of claim 21, wherein:
   at least one suggestion model of the set of suggestion models comprises neural network configuration data that comprises an indication of at least one of a quantity of neurons, a quantity of rows of neurons, a set of connections among neurons, a trigger function to be implemented by at least one neuron, weights and biases of the trigger function; and
   use of the at least one model by at least one processor core of the set of processor cores to determine whether to suggest that the corresponding data preparation operation be performed on the data set comprises use of the configuration data by the at least one processor core to configure a neural network to implement a set of classifiers.

27. The computer-implemented method of claim 26, wherein the re-training of the at least one suggestion model comprises use, by the at least one processor core, of at least a combination of the training metadata, the training context data and a subset of action indications of the set of action indications that corresponds to the corresponding data preparation action to perform backpropagation on the neural network to change at least one of the weights or the biases.

28. The computer-implemented method of claim 21, wherein:
   the set of processor cores is distributed among a set of node devices;
   the method further comprises:
      receiving, by the processor, indications of availability of each node device of a plurality of node devices; and
      selecting, by the processor, the set of node devices from among the plurality of node devices based on the received indications of availability;
   the coordination of the performance of distribution of the set of training data set portions of the training data set among the set of processor cores comprises a coordination of a performance of a distribution of the set of training data set portions among the set of node devices from at least one storage device through a network;
   the provision of the set of feature routines to each processor core of the set of processor cores comprises transmission of the set of feature routines to each node device of the set of node devices;
   the provision of the training metadata, the training context data and the set of action indications to each processor core of the set of processor cores comprises transmission of the training metadata, the training context data and the set of action indications to each node device of the set of node devices; and
   the distribution of the set of suggestion models among the set of processor cores comprises the distribution of the set of suggestion models among the set of node devices to provide each node device of the set of node devices with a different suggestion model from among the set of suggestion models.

29. The computer-implemented method of claim 28, further comprising:
   receiving, by the processor, an indication of availability of the data set, wherein the indication of availability of the data set comprises an indication of at least one of a contextual aspect of the data set from among the set of contextual aspects, a structural feature of the data set from among the set of structural features, or a data feature of a data value of the data set from among the set of data features;
   coordinating, by the processor and through a network, a performance of a distribution of a set of data set portions of the data set among the set of node devices;
   transmitting, by the processor, the set of feature routines to each node device of the set of node devices to enable each node device of the set of node devices to detect a structural feature of a corresponding data set portion of the set of data set portions or a data feature of data values of the corresponding data set portion;
   receiving, by the processor, indications of detected structural features and detected data features of the set of data set portions from the set of node devices;
   generating, by the processor, for the data set, metadata indicative of the detected structural features and the detected data features;
   generating, by the processor, for the data set, context data indicative of the set of contextual aspects of the data set;

transmitting, by the processor, the metadata and context data to each node device of the set of node devices;

distributing, by the processor, the set of suggestion models among the set of node devices to provide each node device of the set of node devices with a different suggestion model from among the set of suggestion models, and to enable the set of node devices to employ the set of suggestion models to derive a suggested subset of data preparation operations of a set of data preparation operations to be suggested to be performed on the data set;

receiving, by the processor, indications of the suggested subset from the set of node devices;

transmitting, by the processor and by the network, an indication of the suggested subset to a viewing device to enable a presentation of the suggested subset;

receiving, by the processor, and via the network from the viewing device, an indication of a selected subset of the set of data preparation operations selected to be performed;

comparing, by the processor, the selected subset to the suggested subset to determine whether there is a difference between the suggested and selected subsets; and in response to a determination that there is a difference between the suggested and selected subsets, and in preparation for the re-training of the set of suggestion models, performing operations comprising:
   storing the metadata as an addition to the training metadata;
   storing the context data as an addition to the training context data; and
   storing an indication of the selected subset as an addition to the set of action indications.

30. The computer-implemented method of claim 21, wherein:
   the pre-selected set of contextual aspects comprises at least one of:
      an indication of an identity of a source of the data set;
      an indication of a location associated with the source;
      an indication of an industry associated with the source;
      an indication of a time or date of receipt of the data set;
      an indication of a user of a device from which a request is received to access the data set;
      an indication of a location associated with the user;
      an indication of an industry associated with the user; or
      an indication of a time or date of receipt of the request from the user to access the data set;
   the pre-selected set of structural features comprises at least one of:
      an indication of a size of the data set;
      an indication of a time or date of generation of the data set;
      an indication of a language of the data set;
      an indication of an organization of data values within the data set; or
      an indication of a number of dimensions of indexing of the data set; and
   the pre-selected set of data features comprises at least one of:
      an indication of at least one data type within the data set;
      an indication of at least one data format within the data set; or
      an indication of a minimum, a maximum, a mean or an average of a data value of the data set.

* * * * *